US011297326B2

(12) United States Patent
Zhang et al.

(10) Patent No.: US 11,297,326 B2
(45) Date of Patent: Apr. 5, 2022

(54) METHOD AND APPARATUS FOR PREDICTING MOTION INFORMATION OF PICTURE BLOCK, ENCODER, AND DECODER

(71) Applicant: HUAWEI TECHNOLOGIES CO., LTD., Guangdong (CN)

(72) Inventors: Na Zhang, Shenzhen (CN); Jicheng An, Shenzhen (CN); Jianhua Zheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/907,660

(22) Filed: Jun. 22, 2020

(65) Prior Publication Data
US 2020/0396462 A1 Dec. 17, 2020

Related U.S. Application Data

(63) Continuation of application No. PCT/CN2018/107094, filed on Sep. 21, 2018.

(30) Foreign Application Priority Data

Dec. 23, 2017 (CN) .......................... 201711411690.X

(51) Int. Cl.
*H04N 19/139* (2014.01)
*H04N 19/105* (2014.01)
(Continued)

(52) U.S. Cl.
CPC ......... *H04N 19/139* (2014.11); *H04N 19/105* (2014.11); *H04N 19/176* (2014.11); *H04N 19/52* (2014.11); *H04N 19/521* (2014.11)

(58) Field of Classification Search
CPC .. H04N 19/139; H04N 19/105; H04N 19/176; H04N 19/52; H04N 19/521
(Continued)

(56) References Cited

U.S. PATENT DOCUMENTS

2013/0107958 A1* 5/2013 Shimada .............. H04N 19/593
375/240.15
2014/0334547 A1 11/2014 Knee et al.
(Continued)

FOREIGN PATENT DOCUMENTS

CN 101610413 A 12/2009
CN 102474621 A 5/2012
(Continued)

OTHER PUBLICATIONS

Benjamin Brass et al. Block Merging for Quadtree-Based Partitioning in HEVC, Proc. of SPIE vol. 8499, 2012. total 9 pages.
(Continued)

*Primary Examiner* — Jared Walker

(57) ABSTRACT

A method for predicting motion information of a picture block and a related product is provided. The method includes: determining a candidate motion information list of a current picture block, where the candidate motion information list includes at least one combined candidate motion information, one combined candidate motion information is obtained by weighting P candidate motion information by using corresponding weighting factors; determining target motion information in the candidate motion information list; and predicting motion information of the current picture block based on the target motion information.

21 Claims, 18 Drawing Sheets

(51) Int. Cl.
  *H04N 19/176* (2014.01)
  *H04N 19/52* (2014.01)
  *H04N 19/513* (2014.01)

(58) Field of Classification Search
  CPC .... H04N 19/159; H04N 19/577; H04N 19/61; H04N 19/573; H04N 19/593; H04N 19/70
  See application file for complete search history.

(56) References Cited

U.S. PATENT DOCUMENTS

| | | | |
|---|---|---|---|
| 2017/0280159 A1 | 9/2017 | Xu et al. | |
| 2017/0295370 A1 | 10/2017 | Xu et al. | |
| 2018/0310017 A1* | 10/2018 | Chen | H04N 19/593 |
| 2018/0324454 A1* | 11/2018 | Lin | H04N 19/159 |

FOREIGN PATENT DOCUMENTS

| | | |
|---|---|---|
| CN | 103152562 A | 6/2013 |
| CN | 103765896 A | 4/2014 |
| CN | 103916673 A | 7/2014 |
| CN | 104160706 A | 11/2014 |
| CN | 107079161 A | 8/2017 |
| CN | 107079164 A | 8/2017 |
| CN | 108353184 A | 7/2018 |
| JP | 2012533225 A | 12/2012 |
| JP | 2013018369 A | 1/2013 |
| JP | 2013098745 A | 5/2013 |
| JP | 2015508952 A | 3/2015 |
| JP | 2016036186 A | 3/2016 |
| WO | 2016175549 A1 | 11/2016 |
| WO | 2017076221 A1 | 5/2017 |
| WO | 2017105097 A1 | 6/2017 |
| WO | 2017197146 A1 | 11/2017 |
| WO | 2017204532 A1 | 11/2017 |

OTHER PUBLICATIONS

Bin Li et al. Non-SCCE1: Unification of intra BC and inter modes, Joint Collaborative Team on Video Coding (JCT-VC) of Itu-T SG 16 WP 3 and ISO/IEC JTC 1/SC 29/WG 11, JCTVC-R0100-v2, 18th Meeting: Sapporo, JP, Jun. 30-Jul. 9, 2014, XP030116357, total 28 pages.

Rajan Joshi et al. High Efficiency Video Coding (HEVC) Screen Content Coding: Draft 1, Joint Collaborative Team on Video Coding (JCT-VC) of ITU-T SG 16 WP 3 and ISO/IEC JTC 1/SC 29/WG 11, JCTVC-R1005, 18th Meeting: Sapporo, JP, Jun. 30-Jul. 9, 2014, XP030116693, total 358 pages.

* cited by examiner

Original merge candidate list

| Merge_idx | L0 | L1 |
|---|---|---|
| 0 | mvL0_A, ref0 | mvL1_A, ref1 |
| 1 | mvL0_B, ref0 | mvL1_B, ref1 |
| 2 | – | mvL1_C, ref1 |

Merge candidate list in which combined weighted candidate motion information is added

| Merge_idx | L0 | L1 |
|---|---|---|
| 0 | mvL0_A, ref0 | mvL1_A, ref1 |
| 1 | mvL0_B, ref0 | mvL1_B, ref1 |
| 2 | – | mvL1_C, ref1 |
| 3 | (mvL0_A + mvL0_B)/2, ref0 | (mvL1_A + mvL1_B)/2, ref1 |
| 4 | mvL0_A, ref0 | (mvL1_A + mvL1_C)/2, ref1 |
| 5 | mvL0_B, ref0 | (mvL1_B + mvL1_C)/2, ref1 |

Original merge candidate list

| Merge_idx | L0 | L1 |
|---|---|---|
| 0 | mvL0_A, ref0' | mvL1_A, ref1' |
| 1 | mvL0_B, ref0 | mvL1_B, ref1 |
| 2 | -- | mvL1_C, ref1 |
| | | |

Merge candidate list in which combined weighted candidate motion information is added

| Merge_idx | L0 | L1 |
|---|---|---|
| 0 | mvL0_A, ref0' | mvL1_A, ref1' |
| 1 | mvL0_B, ref0 | mvL1_B, ref1 |
| 2 | -- | mvL1_C, ref1 |
| 3 | (mvL0_A' + mvL0_B)/2, ref0 | (mvL1_A' + mvL1_B)/2, ref1 |
| 4 | mvL0_A, ref0' | (mvL1_A' + mvL1_C)/2, ref1 |
| 5 | mvL0_B, ref0 | (mvL1_B + mvL1_C)/2, ref1 |

Note: MV with ' indicates a scaled candidate motion vector

FIG. 8B

Original merge candidate predictive motion vector list

| Merge_idx | L0 | L1 |
|---|---|---|
| 0 | mvL0_A, ref0 | - |
| 1 | - | mvL1_B, ref0 |
| 2 | mvL0_A, ref0 | mvL1_B, ref0 |
| 3 | - | - |
| 4 | - | - |

Add a zero motion vector

Candidate predictive motion vector list after the "0" motion vector is added

| Merge_idx | L0 | L1 |
|---|---|---|
| 0 | mvL0_A, ref0 | - |
| 1 | - | mvL1_B, ref0 |
| 2 | mvL0_A, ref0 | mvL1_B, ref0 |
| 3 | (0, 0), ref0 | (0, 0), ref0 |
| 4 | (0, 0), ref1 | (0, 0), ref1 |

|  | Random Access Main 10 | | | | | Low delay P Main 10 | | | | |
|---|---|---|---|---|---|---|---|---|---|---|
|  | Y | U | V | EncT | DecT | Y | U | V | EncT | DecT |
| Class A1 | −0.17% | −0.10% | −0.06% | 100% | 99% | | | | | |
| Class A2 | −0.44% | −0.14% | −0.20% | 100% | 100% | | | | | |
| Class B | −0.55% | −0.27% | −0.37% | 100% | 100% | −1.65% | −0.48% | −0.64% | 102% | 98% |
| Class C | −0.22% | −0.26% | −0.06% | 100% | 100% | −1.46% | −1.08% | −1.24% | 102% | 99% |
| Class D | −0.49% | −0.22% | −0.34% | 100% | 100% | −1.55% | −1.44% | −1.05% | 103% | 99% |
| Class E | | | | | | −1.32% | −0.63% | −1.06% | 100% | 97% |
| Overall (Ref) | −0.38% | −0.20% | −0.21% | 100% | 100% | −1.52% | −0.90% | −0.97% | 102% | 98% |
| Class F (optional) | −0.13% | 0.02% | −0.14% | 100% | 100% | −0.39% | −0.21% | −0.66% | 100% | 97% |

FIG. 16

METHOD AND APPARATUS FOR PREDICTING MOTION INFORMATION OF PICTURE BLOCK, ENCODER, AND DECODER

CROSS-REFERENCE TO RELATED APPLICATIONS

This application is a continuation of International Application No. PCT/CN2018/107094, filed on Sep. 21, 2018, which claims priority to Chinese Patent Application No. 201711411690.X, filed on Dec. 23, 2017. The disclosures of the aforementioned applications are hereby incorporated by reference in their entireties.

TECHNICAL FIELD

This application relates to the field of video picture encoding and decoding, and in particular, to a method and an apparatus for predicting motion information of a picture block, an encoder, and a decoder.

BACKGROUND

By using video compression technologies, such as MPEG-2, MPEG-4, ITU-TH.263, ITU-TH.264/MPEG-4 Part 10 (advanced video coding (advanced video coding, AVC)), the ITU-TH.265 high efficiency video coding (high efficiency video coding, HEVC) standard, and video compression technologies described in extended parts of the standards, devices can efficiently transmit and receive digital video information. Generally, a picture of a video sequence is divided into picture blocks for encoding or decoding.

In the video compression technology, to reduce or remove redundant information in a video sequence, spatial prediction (intra prediction, intra prediction) and/or temporal prediction (inter prediction, inter prediction) based on a picture block are/is introduced. Inter prediction modes may include but are not limited to a merge mode (Merge Mode) and a non-merge mode (for example, an advanced motion vector prediction mode (AMVP mode)). In the inter prediction modes, inter prediction is performed by using a multi-motion information contention method.

In an inter prediction process, a candidate motion information list (referred to as a candidate list for short) including a plurality of groups of motion information (also referred to as a plurality of pieces of candidate motion information) is introduced. For example, an encoder may predict motion information (for example, a motion vector) of a current to-be-encoded picture block by selecting a group of appropriate candidate motion information from the candidate list, to obtain an optimal reference picture block (namely, a prediction block) of the current to-be-encoded picture block. In an intra prediction process, a candidate list including a plurality of groups of motion information (also referred to as block vectors) is sometimes introduced.

However, regardless of the merge mode or the non-merge mode, a maximum candidate quantity of pieces of candidate motion information in the candidate list is limited. Once available candidate motion information is insufficient, a default value (for example, a zero vector) is added to the candidate list as candidate motion information, to satisfy a requirement of the maximum candidate quantity, and an index identifier is assigned to each group of candidate motion information. It can be learned that this practice may cause relatively low reference meaning of some candidate motion information in the candidate list, and further cause relatively low accuracy of motion vector prediction to some extent, and consequently encoding and decoding performance is affected.

SUMMARY

Embodiments of this application provide a method and an apparatus for predicting motion information of a picture block, a corresponding encoder, and a corresponding decoder, to improve motion vector prediction accuracy, thereby improving encoding and decoding performance.

According to a first aspect, an embodiment of this application provides a method for predicting motion information of a picture block, where the motion information is used for intra prediction or inter prediction, and the method includes: determining a candidate motion information list of a current picture block, where the candidate motion information list includes at least one piece of combined candidate motion information, first combined candidate motion information in the at least one piece of combined candidate motion information is obtained by weighting P pieces of candidate motion information (which may also be referred to as P groups of candidate predictive motion information) by using corresponding weighting factors, P is an integer greater than or equal to 2, and weighting factors $w_{pi}$ for at least two of the P pieces of candidate motion information are respectively values greater than 0 and less than 1; determining target motion information in the candidate motion information list; and predicting motion information of the current picture block based on the target motion information. It should be understood that a sum of the weighting factors for the P pieces of candidate motion information is 1. Preferably, the weighting factor $w_{pi}$ for each of the P pieces of candidate motion information may be a value greater than 0 and less than 1.

For example, the P pieces of candidate motion information that are used to obtain the first combined candidate motion information through weighting processing may be P pieces of candidate motion information whose reference picture indexes are the same as an index of a target reference picture; or may be P pieces of candidate motion information regardless of whether reference pictures are the same, for example, reference picture indexes of some candidate motion information are the same as the index of the target reference picture, and reference picture indexes of some candidate motion information are different from the index of the target reference picture. Alternatively, the P pieces of candidate motion information that are provided in this embodiment of this application and that are used to obtain the first combined candidate motion information through weighting processing may be P pieces of candidate motion information whose reference picture indexes are the same, or may be P pieces of candidate motion information whose reference picture indexes are not completely the same.

It can be learned that one or more pieces of combined candidate motion information can be constructed through weighting processing, so that more candidate motion information used for reference can be found as much as possible, thereby enriching candidate motion information, and reducing or avoiding, to some extent, padding of the candidate motion information list with zero vector candidate motion information. For example, for a same encoding and decoding application scenario, the candidate motion information list may be padded with a plurality of zero vectors before the technical solution of this application is introduced. However, after the technical solution of this application is introduced, no zero vector may need to be padded or zero vectors that are to be padded may be reduced. This improves motion vector prediction accuracy to some extent, thereby improving encoding and decoding performance.

In addition, it should be understood that the current picture block (referred to as a current block for short) herein may be understood as a current encoding block (coding block) or a current decoding block (coding block).

In addition, it should be understood that the determining target motion information in the candidate motion information list may be understood as selecting, from the candidate motion information list, optimal motion information (optimal predictive motion information) used for the current picture block.

In addition, it should be understood that, in this embodiment of this application, the P pieces of candidate motion information on which weighting processing is performed (or weighting is to be performed) may be P pieces of original candidate motion information that are previously obtained, or P pieces of non-original candidate motion information that are previously obtained, or P pieces of candidate motion information that are previously obtained and that include original candidate motion information and non-original candidate motion information, or P pieces of candidate motion information that have been placed in the candidate motion information list, or P pieces of candidate motion information that are before being placed in the candidate motion information list. This is not limited in this embodiment of this application.

In addition, it should be understood that the candidate motion information list that is determined or constructed in this embodiment of this application and that is used to predict the motion information of the current picture block may include one or more pieces of combined candidate motion information and one or more pieces of original candidate motion information, or the candidate motion information list may include only one or more pieces of combined candidate motion information, or the candidate motion information list may include one or more pieces of combined candidate motion information and candidate motion information obtained in another manner. This is not limited in this embodiment of this application.

In addition, it should be understood that the candidate motion information list that is determined or constructed in this embodiment of this application may include one or more types of motion information, for example, one or more of time domain motion information (motion information in a time domain direction), inter-view motion information (motion information in an inter-view direction), and/or intra motion information. This is not limited in this embodiment of this application.

In addition, it should be noted that the candidate motion information in the candidate motion information list in this embodiment of this application may include a motion vector MV and reference picture indication information. Certainly, the candidate motion information may alternatively include one or both of the motion vector MV and the reference picture indication information. For example, when an encoder side and a decoder side agree on a reference picture together, the candidate motion information may include only the motion vector MV. The motion vector usually includes a horizontal component offset and a vertical component offset. For example, (x, y) is used to represent the MV, x represents a position offset in a horizontal direction, and y represents a position offset in a vertical direction. The reference picture indication information may include but is not limited to a reference picture list and a reference picture index corresponding to the reference picture list. The reference picture index is used to identify a reference picture to which a motion vector in the corresponding reference picture list (RefPicList0 or RefPicList1) points. A picture may be referred to as a frame, and the reference picture may be referred to as a reference frame.

It should be understood that the method in this embodiment of this application may be performed by an apparatus for predicting motion information of a picture block, for example, a video encoder, a video decoder, or an electronic device having a video encoding and decoding function, and specifically, for example, an intra prediction unit or an inter prediction unit in a video encoder, or an intra prediction unit or a motion compensation unit in a video decoder.

With reference to the first aspect, in some implementations of the first aspect, the at least one piece of combined candidate motion information further includes second combined candidate motion information, the second combined candidate motion information is obtained by weighting M pieces of candidate motion information by using corresponding weighting factors, M is an integer greater than or equal to 2, and weighting factors $w_{mi}$ for at least two of the M pieces of candidate motion information are respectively values greater than 0 and less than 1. For example, an index identifier of at least one piece of candidate motion information in P index identifiers of the P pieces of candidate motion information is different from an index identifier of at least one piece of candidate motion information in M index identifiers of the M pieces of candidate motion information. It should be understood that a sum of the weighting factors for the M pieces of candidate motion information is 1.

It can be learned that the index identifiers of the M pieces of candidate motion information used to obtain the second combined candidate motion information through weighting processing and the index identifiers of the P pieces of candidate motion information used to obtain the first combined candidate motion information through weighting processing that are provided in this embodiment of this application may correspond to a plurality of pieces of candidate motion information that are completely different from each other, or may correspond to a plurality of pieces of candidate motion information that are partially different from each other. Therefore, this embodiment of this application provides a plurality of weighting combination manners, thereby further improving flexibility and integrity of constructing the candidate motion information list.

With reference to the first aspect, in some implementations of the first aspect, each of the P pieces of candidate motion information includes a motion vector corresponding to a first reference list and a reference picture index corresponding to the first reference list; and/or a motion vector corresponding to a second reference list and a reference picture index corresponding to the second reference list; and $P_1$ reference picture indexes that are in the P pieces of candidate motion information and that correspond to the first reference list are the same, or $P_1$ reference picture indexes that are in the P pieces of candidate motion information and that correspond to the first reference list are the same as an index of a first target reference picture; or $P_2$ reference picture indexes that are in the P pieces of candidate motion information and that correspond to the second reference list are the same, or $P_2$ reference picture indexes that are in the P pieces of candidate motion information and that correspond to the second reference list are the same as an index of a second target reference picture, where $1 < P_1 \leq P$, $1 < P_2 \leq P$, and $P_1$ or $P_2$ is an integer greater than or equal to 2.

It can be learned that, in the P pieces of candidate motion information that are provided in this embodiment of this application and that are used to obtain the first combined candidate motion information through weighting processing, candidate motion information whose reference picture index is different from the index of the target reference picture may not be considered. For example, it is assumed that there are three pieces of candidate motion information, reference picture indexes of two of the three pieces of candidate motion information are the same as the index of the target reference picture, and a reference picture index of another piece of candidate motion information is different from the index of the target reference picture. The two pieces of candidate motion information whose reference picture indexes are the same as the index of the target reference picture may be weighted to obtain the combined candidate motion information, and the candidate motion information whose reference picture index is different from the index of the target reference picture is not used for weighting. Alternatively, once candidate motion information whose reference picture index is different from the index of the target reference picture exists, a motion vector in the candidate motion information may be first scaled, to obtain a motion vector that points to the target reference picture.

Alternatively, in another implementation, if the P pieces of candidate motion information include candidate motion information whose reference picture index is different from the index of the target reference picture, the P pieces of candidate motion information are not used for weighting.

With reference to the first aspect, in some implementations of the first aspect, the first combined candidate motion information includes: weighted values of $P_1$ candidate motion vectors that are in the P pieces of candidate motion information and that correspond to the first reference list, and/or weighted values of $P_2$ candidate motion vectors that are in the P pieces of candidate motion information and that correspond to the second reference list, where $1<P_1 \leq P$, $1<P_2 \leq P$, $P_1$ or $P_2$ is an integer greater than or equal to 2, and weighting factors $w_{pi}$ for at least two of the $P_1$ or $P_2$ candidate motion vectors are respectively values greater than 0 and less than 1. It should be understood that a sum of weighting factors for the $P_1$ candidate motion vectors is 1, and a sum of weighting factors for the $P_2$ candidate motion vectors is 1.

It should be understood that, in an example, each of the P pieces of candidate motion information may include the motion vector corresponding to the first reference list and a reference frame index corresponding to the first reference list, or the motion vector corresponding to the second reference list and a reference frame index corresponding to the second reference list, or a combination thereof. In other words, each of the P pieces of candidate motion information may include motion information used in a forward prediction direction, motion information used in a backward prediction direction, or a combination thereof. The motion information used in the forward prediction direction may include an index of a first reference picture corresponding to the first reference picture list and a motion vector that points to the first reference picture corresponding to the index of the first reference picture; and the motion information used in the backward prediction direction may include an index of a second reference picture corresponding to the second reference picture list and a motion vector that points to the second reference picture corresponding to the index of the second reference picture.

With reference to the first aspect, in some implementations of the first aspect, each of the M pieces of candidate motion information includes a motion vector corresponding to the first reference list and a reference picture index corresponding to the first reference list; and/or a motion vector corresponding to the second reference list and a reference picture index corresponding to the second reference list; and $M_1$ reference picture indexes that are in the M pieces of candidate motion information and that correspond to the first reference list are the same, or $M_1$ reference picture indexes that are in the M pieces of candidate motion information and that correspond to the first reference list are the same as the index of the first target reference picture; or $M_2$ reference picture indexes that are in the M pieces of candidate motion information and that correspond to the second reference list are the same, or $M_2$ reference picture indexes that are in the M pieces of candidate motion information and that correspond to the second reference list are the same as the index of the second target reference picture, where $1<M_1 \leq M$, $1<M_2 \leq M$, and $M_1$ or $M_2$ is an integer greater than or equal to 2.

It can be learned that, in the M pieces of candidate motion information that are provided in this embodiment of this application and that are used to obtain the second combined candidate motion information through weighting processing, candidate motion information whose reference picture index is different from the index of the target reference picture may not be considered. Alternatively, once candidate motion information whose reference picture index is different from the index of the target reference picture exists, a motion vector in the candidate motion information may be first scaled, to obtain a motion vector that points to the target reference picture.

Alternatively, in another implementation, if the M pieces of candidate motion information include candidate motion information whose reference picture index is different from the index of the target reference picture, the M pieces of candidate motion information are not used for weighting.

With reference to the first aspect, in some implementations of the first aspect, the second combined candidate motion information includes: weighted values of $M_1$ candidate motion vectors that are in the M pieces of candidate motion information and that correspond to the first reference list, and/or weighted values of $M_2$ candidate motion vectors that are in the M pieces of candidate motion information and that correspond to the second reference list, where $1<M_1 \leq M$, $1<M_2 \leq M$, $M_1$ or $M_2$ is an integer greater than or equal to 2, and weighting factors $w_{mi}$ for at least two of the $M_1$ or $M_2$ candidate motion vectors are respectively values greater than 0 and less than 1. It should be understood that a sum of weighting factors for the $M_1$ candidate motion vectors is 1, and a sum of weighting factors for the $M_2$ candidate motion vectors is 1.

It should be understood that each of the M pieces of candidate motion information may include the motion vector corresponding to the first reference list and a reference frame index corresponding to the first reference list, or the motion vector corresponding to the second reference list and a reference frame index corresponding to the second reference list, or a combination thereof. In other words, each of the M pieces of candidate motion information may include motion information used in a forward prediction direction, motion information used in a backward prediction direction, or a combination thereof, where the motion information used in the forward prediction direction may include an index of a first reference picture corresponding to the first reference picture list and a motion vector that points to the first reference picture corresponding to the index of the first reference picture; and the motion information used in the backward prediction direction may include an index of a second reference picture corresponding to the second reference picture list and a motion vector that points to the second reference picture corresponding to the index of the second reference picture.

With reference to the first aspect, in some implementations of the first aspect, the P pieces of candidate motion information include first candidate motion information corresponding to a first index identifier and second candidate motion information corresponding to a second index identifier, the first index identifier (also referred to as a first index value) is less than the second index identifier (also referred to as a second index value), and correspondingly a weighting factor for the first candidate motion information is greater than or equal to a weighting factor for the second candidate motion information.

Optionally, if a length of the candidate motion information list is greater than 2, the P pieces of candidate motion information in the candidate motion information list include the first candidate motion information corresponding to the first index identifier and the second candidate motion information corresponding to the second index identifier, a quantity of bits occupied by the first index identifier is less than a quantity of bits occupied by the second index identifier, and correspondingly the weighting factor for the first candidate motion information is greater than or equal to the weighting factor for the second candidate motion information.

It should be understood that, a value relationship between the weighting factor for the first candidate motion information and the weighting factor for the second candidate motion information may be determined based on a value relationship between the first index identifier and the second index identifier (or may be determined based on arrangement positions of the first index identifier and the second index identifier in the candidate motion information list). If the first index identifier is less than the second index identifier (or the first index identifier is arranged before the second index identifier), the weighting factor for the first candidate motion information is greater than or equal to the weighting factor for the second candidate motion information.

In addition, it should be understood that if the weighting factors for all the P pieces of candidate motion information are the same, and the sum of the weighting factors for the P pieces of candidate motion information is 1, that the P pieces of candidate motion information are weighted to obtain the first combined candidate motion information may be understood as that an average value of the P pieces of candidate motion information is calculated to obtain the first combined candidate motion information.

It can be learned that in this embodiment of this application, the weighting factor is flexibly determined based on a value relationship between one or more index identifiers that one-to-one correspond to one or more pieces of candidate motion information. A weighting factor (also referred to as a weight) for candidate motion information with a stronger correlation is larger, thereby further improving motion vector prediction accuracy.

With reference to the first aspect, in some implementations of the first aspect, the M pieces of candidate motion information include third candidate motion information corresponding to a third index identifier and fourth candidate motion information corresponding to a fourth index identifier, the third index identifier is less than the fourth index identifier, and correspondingly a weighting factor for the third candidate motion information is greater than or equal to a weighting factor for the fourth candidate motion information.

Optionally, if a length of the candidate motion information list is greater than 2, the M pieces of candidate motion information in the candidate motion information list include the third candidate motion information corresponding to the third index identifier and the fourth candidate motion information corresponding to the fourth index identifier, a quantity of bits occupied by the third index identifier is less than a quantity of bits occupied by the fourth index identifier, and correspondingly a weighting factor for the third candidate motion information is greater than or equal to a weighting factor for the fourth candidate motion information.

It should be understood that, a value relationship between the weighting factor for the third candidate motion information and the weighting factor for the fourth candidate motion information may be determined based on a value relationship between the third index identifier and the fourth index identifier (or may be determined based on arrangement positions of the third index identifier and the fourth index identifier in the candidate motion information list). If the third index identifier is less than the fourth index identifier (or the third index identifier is arranged before the fourth index identifier), the weighting factor for the third candidate motion information is greater than or equal to the weighting factor for the fourth candidate motion information.

In addition, it should be understood that if the weighting factors for all the M pieces of candidate motion information are the same, and the sum of the weighting factors for the M pieces of candidate motion information is 1, that the M pieces of candidate motion information are weighted to obtain the second combined candidate motion information may be understood as that an average value of the M pieces of candidate motion information is calculated to obtain the second combined candidate motion information.

It can be learned that in this embodiment of this application, the weighting factor is flexibly determined based on a value relationship between one or more index identifiers that one-to-one correspond to one or more pieces of candidate motion information. A weighting factor (also referred to as a weight) for candidate motion information with a stronger correlation is larger, thereby further improving motion vector prediction accuracy.

With reference to the first aspect, in some implementations of the first aspect, the P pieces of candidate motion information are P pieces of original candidate motion information, for example, P pieces of original candidate motion information in the candidate motion information list; or the P pieces of candidate motion information are (P−X) pieces of original candidate motion information and X pieces of non-original candidate motion information, for example, (P−X) pieces of original candidate motion information and X pieces of non-original candidate motion information in the candidate motion information list, where X is a positive integer less than or equal to P.

With reference to the first aspect, in some implementations of the first aspect, the M pieces of candidate motion information are M pieces of original candidate motion information, for example, M pieces of original candidate motion information in the candidate motion information list; or the M pieces of candidate motion information are (M−Y) pieces of original candidate motion information and Y pieces of non-original candidate motion information, for example, (M−Y) pieces of original candidate motion information and Y pieces of non-original candidate motion information in the candidate motion information list, where Y is a positive integer less than or equal to M.

With reference to the first aspect, in some implementations of the first aspect, the original candidate motion information includes motion information of one or more space domain reference blocks of the current picture block, motion information of one or more time domain reference blocks of the current picture block, and/or motion information of one or more inter-view reference blocks of the current picture block; and the non-original candidate motion information includes scaled candidate motion information, the first combined candidate motion information, the second combined candidate motion information, combined bi-predictive candidate motion information, and/or zero motion information, where each scaled candidate motion information includes a motion vector that points to a first target reference frame and that is in the first reference list, and/or a motion vector that points to a second target reference frame and that is in the second reference list.

It should be noted that the space domain reference block herein is a reference block related to a space domain of the current picture block, and may include one or more space domain reference blocks that are in a picture in which the current picture block is located and that are adjacent to the current picture block, and/or one or more space domain reference blocks that are in a picture in which the current picture block is located and that are not adjacent to the current picture block. In an example, the one or more space domain reference blocks that are in the picture in which the current picture block is located and that are adjacent to the current picture block include a fourth space domain adjacent block A0 located on the lower left side of the current picture block, a first space domain adjacent block A1 located on the left side of the current picture block, a third space domain adjacent block B0 located on the upper right side of the current picture block, a second space domain adjacent block B1 located on the upper side of the current picture block, or a fifth space domain adjacent block B2 located on the upper left side of the current picture block.

It should be noted that the time domain reference block herein is a reference block related to a time domain of the current picture block, and may include one or more space domain reference blocks that are in a reference picture and that are adjacent to a co-located block (co-located block), and/or one or more sub-blocks in the co-located block, where the co-located block is a picture block that is in the reference picture and whose size, shape, and coordinates are the same as those of the current picture block, or the co-located block is a picture block that is in the reference picture, that deviates from a specified position of the current picture block by an offset, and whose size and shape are the same as those the current picture block. The reference picture herein is a reconstructed picture. Specifically, the reference picture herein is a reference picture in one or more reference picture lists, for example, may be a reference picture corresponding to a specified reference picture index in a specified reference picture list, or may be a reference picture at a head position in a default reference picture list. This is not limited in this application. In an example, the time domain reference block includes a lower-right space domain adjacent block H that is of the co-located block (co-located block) and that is in the current picture block, an upper-left middle block C0 of the co-located block, a lower-right middle block C3 of the co-located block, an upper-left block TL of the co-located block, or a lower-right block BR of the co-located block.

It should be noted that the inter-view reference block herein is a reference block related to viewpoints of the current picture block, and may include one or more space domain reference blocks that are in a reference picture and that are adjacent to a corresponding block, and/or one or more sub-blocks in the corresponding block, where the corresponding block is a picture block that is in the reference picture and whose size, shape, and coordinates are the same as those of the current picture block, or the corresponding block is a picture block (to be specific, obtained through positioning by using a disparity vector) that is in the reference picture, that deviates from a specified position of the current picture block by an offset, and whose size and shape are the same as those of the current picture block. The reference picture herein is a reconstructed picture. Specifically, the reference picture herein is a reference picture that is at a reference point and that is at a moment the same as or different from a moment of a current picture. This is not limited in this application.

It should be noted that, a reference block is a determined motion vector picture block (also refers to a coded picture block or a decoded picture block).

It should be noted that the combined bi-predictive candidate motion information herein is candidate motion information of a bi-predictive type that is obtained by combining candidate motion information in different prediction directions in two groups of original candidate motion information included in the candidate motion information list. The combination herein may be understood as combining original candidate motion information in a forward prediction direction in one group of original candidate motion information and original candidate motion information in a backward prediction direction in another group of original candidate motion information, to obtain a group of newly constructed candidate motion information of the bi-predictive type.

With reference to the first aspect, in some implementations of the first aspect, the scaled candidate motion information is obtained by using the following method:

determining the first target reference frame that is of the current picture block and that corresponds to the first reference list and/or the second target reference frame that is of the current picture block and that corresponds to the second reference list;

determining whether a reference picture that is included in the candidate motion information and that corresponds to the first reference list is the same as the first target reference frame, and/or whether a reference picture that is included in the candidate motion information and that corresponds to the second reference list is the same as the second target reference frame; and if the reference picture that is included in the candidate motion information and that corresponds to the first reference list is different from the first target reference frame, scaling, based on a time domain distance or an inter-view distance, the motion vector that is included in the candidate motion information and that corresponds to the first reference picture list, to obtain the motion vector that points to the first target reference frame; and/or if the reference picture that is included in the candidate motion information and that corresponds to the second reference list is different from the second target reference frame, scaling, based on a time domain distance or an inter-view distance, the motion vector that is included in the candidate motion information and that corresponds to the second reference picture list, to obtain the motion vector that points to the second target reference frame.

In an example, the first target reference frame is a reference frame that corresponds to the first reference list and that is of most frequently used candidate motion information in the candidate motion information list, or a reference frame that corresponds to the first reference list and that is of candidate motion information having a smallest index identifier in the candidate motion information list; alternatively, the second target reference frame is a reference frame that corresponds to the second reference list and that is of most frequently used candidate motion information in the candidate motion information list, or a reference frame that corresponds to the second reference list and that is of candidate motion information having a smallest index identifier in the candidate motion information list.

In another example, there are four original merge candidates in the candidate motion information list; and correspondingly the first target reference picture is a reference picture that corresponds to the first reference list and that is of a most frequently used original merge candidate in the original merge candidates in the candidate motion information list, or a reference picture that corresponds to the first reference list and that is of an original merge candidate having a smallest reference picture index identifier in the original merge candidates in the candidate motion information list, or a reference picture that corresponds to the first reference list and that is of an original merge candidate having a smallest index identifier in the original merge candidates in the candidate motion information list; or the second target reference picture is a reference picture that corresponds to the second reference list and that is of a most frequently used original merge candidate in the original merge candidates in the candidate motion information list, or a reference picture that corresponds to the second reference list and that is of an original merge candidate having a smallest reference picture index identifier in the original merge candidates in the candidate motion information list, or a reference picture that corresponds to the second reference list and that is of an original merge candidate having a smallest index identifier in the original merge candidates in the candidate motion information list.

In still another example, if a quantity of pieces of candidate motion information in the candidate motion information list is less than or equal to a preset quantity R, the first target reference picture is a reference picture that corresponds to the first reference list and that is of most frequently used candidate motion information in the candidate motion information in the candidate motion information list, or a reference picture that corresponds to the first reference list and that is of candidate motion information having a smallest reference picture index identifier in the candidate motion information in the candidate motion information list, or a reference picture that corresponds to the first reference list and that is of candidate motion information having a smallest index identifier in the candidate motion information in the candidate motion information list; or if a quantity of pieces of candidate motion information in the candidate motion information list is greater than a preset quantity R (for example, 4), the first target reference picture is a reference picture that corresponds to the first reference list and that is of most frequently used candidate motion information in the first R pieces of candidate motion information in the candidate motion information list, or a reference picture that corresponds to the first reference list and that is of candidate motion information having a smallest reference picture index identifier in the first R pieces of candidate motion information in the candidate motion information list, or a reference picture that corresponds to the first reference list and that is of candidate motion information having a smallest index identifier in the first R pieces of candidate motion information in the candidate motion information list.

In addition, if a quantity of pieces of candidate motion information in the candidate motion information list is less than or equal to a preset quantity R, the second target reference picture is a reference picture that corresponds to the second reference list and that is of most frequently used candidate motion information in the candidate motion information in the candidate motion information list, or a reference picture that corresponds to the second reference list and that is of candidate motion information having a smallest reference picture index identifier in the candidate motion information in the candidate motion information list, or a reference picture that corresponds to the second reference list and that is of candidate motion information having a smallest index identifier in the candidate motion information in the candidate motion information list; or if a quantity of pieces of candidate motion information in the candidate motion information list is greater than a preset quantity R, the second target reference picture is a reference picture that corresponds to the second reference list and that is of most frequently used candidate motion information in the first R pieces of candidate motion information in the candidate motion information list, or a reference picture that corresponds to the second reference list and that is of candidate motion information having a smallest reference picture index identifier in the first R pieces of candidate motion information in the candidate motion information list, or a reference picture that corresponds to the second reference list and that is of candidate motion information having a smallest index identifier in the first R pieces of candidate motion information in the candidate motion information list.

In yet another example, the first target reference picture is a reference picture that corresponds to the first reference list and that is of most frequently used candidate motion information in the P or M pieces of candidate motion information to be combined, or a reference picture that corresponds to the first reference list and that is of candidate motion information having a smallest reference picture index identifier in the P or M pieces of candidate motion information, or a reference picture that corresponds to the first reference list and that is of candidate motion information having a smallest index identifier in the P or M pieces of candidate motion information; and/or the second target reference picture is a reference picture that corresponds to the second reference list and that is of most frequently used candidate motion information in the P or M pieces of candidate motion information to be combined, or a reference picture that corresponds to the second reference list and that is of candidate motion information having a smallest reference picture index identifier in the P or M pieces of candidate motion information, or a reference picture that corresponds to the second reference list and that is of candidate motion information having a smallest index identifier in the P or M pieces of candidate motion information.

It should be understood that if all the candidate motion information on which weighting processing is performed (or weighting is to be performed) is the intra motion information, scaling processing does not need to be performed in advance; or if the candidate motion information on which weighting processing is performed includes the motion information in the time domain direction and/or the motion information in the inter-view direction, scaling processing needs to be performed in advance.

It can be learned that, before weighting processing is performed, a motion vector that points to a reference frame different from the target reference frame is preprocessed, so that the motion vector is scaled to the motion vector that points to the target reference frame, thereby further improving motion vector prediction effectiveness.

With reference to the first aspect, in some implementations of the first aspect, a quantity of bits occupied by an index identifier of the combined candidate motion information is greater than or equal to a quantity of bits occupied by an index identifier of the original candidate motion information.

It can be learned that, the index identifier of the combined candidate motion information is set to an index identifier with a relatively large quantity of bits, thereby facilitating compatibility with an existing process of constructing the candidate motion information list.

With reference to the first aspect, in some implementations of the first aspect, the quantity of bits occupied by the index identifier of the combined candidate motion information is less than or equal to the quantity of bits occupied by the index identifier of the original candidate motion information.

It can be learned that in some intra or inter prediction modes, encoding and decoding efficiency based on the combined candidate motion information is higher than encoding and decoding efficiency based on the original candidate motion information, so that a probability that the combined candidate motion information is the target motion information is relatively high. Therefore, the index identifier of the combined candidate motion information may be set to an index identifier with a relatively small quantity of bits, thereby helping reducing bit overheads of video transmission.

With reference to the first aspect, in some implementations of the first aspect, the predicting motion information of the current picture block based on the target motion information includes: using the target motion information as the motion information of the current picture block.

With reference to the first aspect, in some implementations of the first aspect, the motion information includes a motion vector prediction, and the predicting motion information of the current picture block based on the target motion information includes: parsing a bitstream to obtain a motion vector prediction difference of the current picture block; and using a sum of the motion vector prediction in the target motion information and the motion vector prediction difference as a motion vector of the current picture block.

With reference to the first aspect, in some implementations of the first aspect, the method is used to encode the current picture block, and the determining target motion information includes: determining the target motion information in the candidate motion information list, where a rate-distortion cost for encoding the current picture block by using the target motion information is the minimum; or the method is used to decode the current picture block, and the determining target motion information includes: determining, in the candidate motion information list, target motion information indicated by a fifth index identifier, where the fifth index identifier is used to indicate the target motion information in the candidate motion information list. It should be understood that the fifth index identifier may be one of the foregoing first, second, third, or fourth index identifier, or may be an index identifier different from the foregoing first, second, third, or fourth index identifier.

It should be noted that if the candidate motion information list includes only one piece of candidate motion information, the unique candidate motion information is determined as the target motion information.

It can be learned that the method for predicting motion information of a picture block in this embodiment of this application is not only applicable to a merge (Merge) prediction mode and/or an advanced motion vector prediction (advanced motion vector prediction, AMVP) mode, but also applicable to another mode in which the motion information of the current picture block is predicted by using the motion information of the space domain reference block, the motion information of the time domain reference block, and/or the motion information of the inter-view reference block, thereby improving encoding and decoding performance.

A second aspect of this application provides an apparatus for predicting motion information of a picture block, where the motion information is used for intra prediction or inter prediction, and the apparatus includes: a candidate motion information list determining unit, configured to determine a candidate motion information list of a current picture block, where the candidate motion information list includes at least one piece of combined candidate motion information, first combined candidate motion information in the at least one piece of combined candidate motion information is obtained by weighting P pieces of candidate motion information by using corresponding weighting factors, P is an integer greater than or equal to 2, and weighting factors $w_{pi}$ for at least two of the P pieces of candidate motion information are respectively values greater than 0 and less than 1; a target motion information determining unit, configured to determine target motion information in the candidate motion information list; and a prediction unit, configured to predict motion information of the current picture block based on the target motion information. It should be understood that a sum of the weighting factors for the P pieces of candidate motion information is 1. Preferably, the weighting factor $w_{pi}$ for each of the P pieces of candidate motion information may be a value greater than 0 and less than 1.

The current picture block (referred to as a current block for short) herein may be understood as a current encoding block or a current decoding block.

It should be noted that the candidate motion information list includes one or more types of candidate motion information, for example, one or more of time domain motion information (also referred to as motion information in a time domain direction), inter-view motion information (also referred to as motion information in an inter-view direction), and/or intra motion information.

With reference to the second aspect, in some implementations of the second aspect, the at least one piece of combined candidate motion information further includes second combined candidate motion information, the second combined candidate motion information is obtained by weighting M pieces of candidate motion information by using corresponding weighting factors, M is an integer greater than or equal to 2, and weighting factors $w_{mi}$ for at least two of the M pieces of candidate motion information are respectively values greater than 0 and less than 1. For example, an index identifier of at least one piece of candidate motion information in P index identifiers of the P pieces of candidate motion information is different from an index identifier of at least one piece of candidate motion information in M index identifiers of the M pieces of candidate motion information. It should be understood that a sum of the weighting factors for the M pieces of candidate motion information is 1.

With reference to the second aspect, in some implementations of the second aspect, each of the P pieces of candidate motion information includes a motion vector corresponding to a first reference list and a reference picture index corresponding to the first reference list; and/or a motion vector corresponding to a second reference list and a reference picture index corresponding to the second reference list; and $P_1$ reference picture indexes that are in the P pieces of candidate motion information and that correspond to the first reference list are the same, or $P_1$ reference picture indexes that are in the P pieces of candidate motion information and that correspond to the first reference list are the same as an index of a first target reference picture; or $P_2$ reference picture indexes that are in the P pieces of candidate motion information and that correspond to the second reference list are the same, or $P_2$ reference picture indexes that are in the P pieces of candidate motion information and that correspond to the second reference list are the same as an index of a second target reference picture, where $1<P_1 \leq P$, $1<P_2 \leq P$, and $P_1$ or $P_2$ is an integer greater than or equal to 2.

It can be learned that, in the P pieces of candidate motion information that are provided in this embodiment of this application and that are used to obtain the first combined candidate motion information through weighting processing, candidate motion information whose reference picture index is different from the index of the target reference picture may not be considered. Alternatively, once candidate motion information whose reference picture index is different from the index of the target reference picture exists, a motion vector in the candidate motion information needs to be first scaled, to obtain a motion vector that points to the target reference picture.

With reference to the second aspect, in some implementations of the second aspect, the first combined candidate motion information includes: weighted values of $P_1$ candidate motion vectors that are in the P pieces of candidate motion information and that correspond to the first reference list, and/or weighted values of $P_2$ candidate motion vectors that are in the P pieces of candidate motion information and that correspond to the second reference list, where $1<P_1 \leq P$, $1<P_2 \leq P$, $P_1$ or $P_2$ is an integer greater than or equal to 2, and weighting factors $w_{pi}$ for at least two of the $P_1$ or $P_2$ candidate motion vectors are respectively values greater than 0 and less than 1. It should be understood that a sum of weighting factors for the $P_1$ candidate motion vectors is 1, and a sum of weighting factors for the $P_2$ candidate motion vectors is 1.

With reference to the second aspect, in some implementations of the second aspect, each of the M pieces of candidate motion information includes a motion vector corresponding to the first reference list and a reference picture index corresponding to the first reference list; and/or a motion vector corresponding to the second reference list and a reference picture index corresponding to the second reference list; and $M_1$ reference picture indexes that are in the M pieces of candidate motion information and that correspond to the first reference list are the same, or $M_1$ reference picture indexes that are in the M pieces of candidate motion information and that correspond to the first reference list are the same as the index of the first target reference picture; or $M_2$ reference picture indexes that are in the M pieces of candidate motion information and that correspond to the second reference list are the same, or $M_2$ reference picture indexes that are in the M pieces of candidate motion information and that correspond to the second reference list are the same as the index of the second target reference picture, where $1<M_1 \leq M$, $1<M_2 \leq M$, and $M_1$ or $M_2$ is an integer greater than or equal to 2.

It can be learned that, in the M pieces of candidate motion information that are provided in this embodiment of this application and that are used to obtain the second combined candidate motion information through weighting processing, candidate motion information whose reference picture index is different from the index of the target reference picture may not be considered. Alternatively, once candidate motion information whose reference picture index is different from the index of the target reference picture exists, a motion vector in the candidate motion information needs to be first scaled, to obtain a motion vector that points to the target reference picture.

With reference to the second aspect, in some implementations of the second aspect, the second combined candidate motion information includes: weighted values of $M_1$ candidate motion vectors that are in the M pieces of candidate motion information and that correspond to the first reference list, and/or weighted values of $M_2$ candidate motion vectors that are in the M pieces of candidate motion information and that correspond to the second reference list, where $1<M_1 \leq M$, $1<M_2 \leq M$, $M_1$ or $M_2$ is an integer greater than or equal to 2, and weighting factors $w_{mi}$ for at least two of the $M_1$ or $M_2$ candidate motion vectors are respectively values greater than 0 and less than 1. It should be understood that a sum of weighting factors for the $M_1$ candidate motion vectors is 1, and a sum of weighting factors for the $M_2$ candidate motion vectors is 1.

With reference to the second aspect, in some implementations of the second aspect, the P pieces of candidate motion information include first candidate motion information corresponding to a first index identifier and second candidate motion information corresponding to a second index identifier, the first index identifier is less than the second index identifier, and correspondingly, a weighting factor for the first candidate motion information is greater than or equal to a weighting factor for the second candidate motion information.

With reference to the second aspect, in some implementations of the second aspect, the M pieces of candidate motion information include third candidate motion information corresponding to a third index identifier and fourth candidate motion information corresponding to a fourth index identifier, the third index identifier is less than the fourth index identifier, and correspondingly, a weighting factor for the third candidate motion information is greater than or equal to a weighting factor for the fourth candidate motion information.

With reference to the second aspect, in some implementations of the second aspect, the P pieces of candidate motion information are P pieces of original candidate motion information; or the P pieces of candidate motion information are (P−X) pieces of original candidate motion information and X pieces of non-original candidate motion information, where X is a positive integer less than or equal to P.

With reference to the second aspect, in some implementations of the second aspect, the M pieces of candidate motion information are M pieces of original candidate motion information; or the M pieces of candidate motion information are (M−Y) pieces of original candidate motion information and Y pieces of non-original candidate motion information, where Y is a positive integer less than or equal to M.

With reference to the second aspect, in some implementations of the second aspect, the original candidate motion information includes motion information of one or more space domain reference blocks of the current picture block, motion information of one or more time domain reference blocks of the current picture block, and/or motion information of one or more inter-view reference blocks of the current picture block; and the non-original candidate motion information includes scaled candidate motion information, the first combined candidate motion information, the second combined candidate motion information, combined bi-predictive candidate motion information, and/or zero motion information, where each scaled candidate motion information includes a motion vector that points to the first target reference frame and that is in the first reference list, and/or a motion vector that points to the second target reference frame and that is in the second reference list.

With reference to the second aspect, in some implementations of the second aspect, the scaled candidate motion information is obtained by the candidate motion information list determining unit by performing the following steps:

determining the first target reference frame that is of the current picture block and that corresponds to the first reference list and/or the second target reference frame that is of the current picture block and that corresponds to the second reference list;

determining whether a reference picture that is included in the candidate motion information and that corresponds to the first reference list is the same as the first target reference frame, and/or whether a reference picture that is included in the candidate motion information and that corresponds to the second reference list is the same as the second target reference frame; and if the reference picture that is included in the candidate motion information and that corresponds to the first reference list is different from the first target reference frame, scaling, based on a time domain distance or an inter-view distance, the motion vector that is included in the candidate motion information and that corresponds to the first reference picture list, to obtain the motion vector that points to the first target reference frame; and/or if the reference picture that is included in the candidate motion information and that corresponds to the second reference list is different from the second target reference frame, scaling, based on a time domain distance or an inter-view distance, the motion vector that is included in the candidate motion information and that corresponds to the second reference picture list, to obtain the motion vector that points to the second target reference frame.

In an example, the first target reference frame is a reference frame that corresponds to the first reference list and that is of most frequently used candidate motion information in the candidate motion information list, or a reference frame that corresponds to the first reference list and that is of candidate motion information having a smallest index identifier in the candidate motion information list; alternatively, the second target reference frame is a reference frame that corresponds to the second reference list and that is of most frequently used candidate motion information in the candidate motion information list, or a reference frame that corresponds to the second reference list and that is of candidate motion information having a smallest index identifier in the candidate motion information list.

In another example, there are four original merge candidates in the candidate motion information list; and correspondingly the first target reference picture is a reference picture that corresponds to the first reference list and that is of a most frequently used original merge candidate in the original merge candidates in the candidate motion information list, or a reference picture that corresponds to the first reference list and that is of an original merge candidate having a smallest reference picture index identifier in the original merge candidates in the candidate motion information list, or a reference picture that corresponds to the first reference list and that is of an original merge candidate having a smallest index identifier in the original merge candidates in the candidate motion information list; or the second target reference picture is a reference picture that corresponds to the second reference list and that is of a most frequently used original merge candidate in the original merge candidates in the candidate motion information list, or a reference picture that corresponds to the second reference list and that is of an original merge candidate having a smallest reference picture index identifier in the original merge candidates in the candidate motion information list, or a reference picture that corresponds to the second reference list and that is of an original merge candidate having a smallest index identifier in the original merge candidates in the candidate motion information list.

In still another example, in terms of determining the first target reference picture that is of the current picture block and that corresponds to the first reference list, the candidate motion information list determining unit is specifically configured to:

if a quantity of pieces of candidate motion information in the candidate motion information list is less than or equal to a preset quantity R, determine that the first target reference picture is a reference picture that corresponds to the first reference list and that is of most frequently used candidate motion information in the candidate motion information in the candidate motion information list, or a reference picture that corresponds to the first reference list and that is of candidate motion information having a smallest reference picture index identifier in the candidate motion information in the candidate motion information list, or a reference picture that corresponds to the first reference list and that is of candidate motion information having a smallest index identifier in the candidate motion information in the candidate motion information list; or if a quantity of pieces of candidate motion information in the candidate motion information list is greater than a preset quantity R (for example, 4), determine that the first target reference picture is a reference picture that corresponds to the first reference list and that is of most frequently used candidate motion information in the first R pieces of candidate motion information in the candidate motion information list, or a reference picture that corresponds to the first reference list and that is of candidate motion information having a smallest reference picture index identifier in the first R pieces of candidate motion information in the candidate motion information list, or a reference picture that corresponds to the first reference list and that is of candidate motion information having a smallest index identifier in the first R pieces of candidate motion information in the candidate motion information list.

In addition, in terms of determining the second target reference picture that is of the current picture block and that corresponds to the second reference list, the candidate motion information list determining unit is specifically configured to:

if a quantity of pieces of candidate motion information in the candidate motion information list is less than or equal to a preset quantity R, determine that the second target reference picture is a reference picture that corresponds to the second reference list and that is of most frequently used candidate motion information in the candidate motion information in the candidate motion information list, or a reference picture that corresponds to the second reference list and that is of candidate motion information having a smallest reference picture index identifier in the candidate motion information in the candidate motion information list, or a reference picture that corresponds to the second reference list and that is of candidate motion information having a smallest index identifier in the candidate motion information in the candidate motion information list; or if a quantity of pieces of candidate motion information in the candidate motion information list is greater than a preset quantity R, determine that the second target reference picture is a reference picture that corresponds to the second reference list and that is of most frequently used candidate motion information in the first R pieces of candidate motion information in the candidate motion information list, or a reference picture that corresponds to the second reference list and that is of candidate motion information having a smallest reference picture index identifier in the first R pieces of candidate motion information in the candidate motion information list, or a reference picture that corresponds to the second reference list and that is of candidate motion information having a smallest index identifier in the first R pieces of candidate motion information in the candidate motion information list.

In yet another example, in terms of determining the first target reference picture that is of the current picture block and that corresponds to the first reference list and/or the second target reference picture that is of the current picture block and that corresponds to the second reference list, the candidate motion information list determining unit is specifically configured to:

determine that the first target reference picture is a reference picture that corresponds to the first reference list and that is of most frequently used candidate motion information in the P or M pieces of candidate motion information to be combined, or a reference picture that corresponds to the first reference list and that is of candidate motion information having a smallest reference picture index identifier in the P or M pieces of candidate motion information, or a reference picture that corresponds to the first reference list and that is of candidate motion information having a smallest index identifier in the P or M pieces of candidate motion information; and/or determine that the second target reference picture is a reference picture that corresponds to the second reference list and that is of most frequently used candidate motion information in the P or M pieces of candidate motion information to be combined, or a reference picture that corresponds to the second reference list and that is of candidate motion information having a smallest reference picture index identifier in the P or M pieces of candidate motion information, or a reference picture that corresponds to the second reference list and that is of candidate motion information having a smallest index identifier in the P or M pieces of candidate motion information.

With reference to the second aspect, in some implementations of the second aspect, a quantity of bits occupied by an index identifier of the combined candidate motion information is greater than or equal to a quantity of bits occupied by an index identifier of the original candidate motion information.

With reference to the second aspect, in some implementations of the second aspect, the quantity of bits occupied by the index identifier of the combined candidate motion information is less than or equal to the quantity of bits occupied by the index identifier of the original candidate motion information.

With reference to the second aspect, in some implementations of the second aspect, the prediction unit is specifically configured to use the target motion information as the motion information of the current picture block.

With reference to the second aspect, in some implementations of the second aspect, the motion information includes a motion vector prediction, and the prediction unit is specifically configured to: parse a bitstream to obtain a motion vector difference of the current picture block; and use a sum of the motion vector prediction in the target motion information and the motion vector prediction difference as a motion vector of the current picture block.

With reference to the second aspect, in some implementations of the second aspect, the apparatus is configured to encode the current picture block, and the target motion information determining unit is specifically configured to determine the target motion information in the candidate motion information list, where a rate-distortion cost for encoding the current picture block by using the target motion information is the minimum; or the apparatus is configured to decode the current picture block, and the target motion information determining unit is specifically configured to determine, in the candidate motion information list, target motion information indicated by a fifth index identifier, where the fifth index identifier is used to indicate the target motion information in the candidate motion information list.

It should be noted that if the candidate motion information list includes only one piece of candidate motion information, the unique candidate motion information is determined as the target motion information.

A third aspect of this application provides an apparatus for predicting motion information of a picture block, where the motion information is used for intra prediction or inter prediction, and the apparatus includes a processor and a memory coupled to the processor, where the processor is configured to: determine a candidate motion information list of a current picture block, where the candidate motion information list includes at least one piece of combined candidate motion information, first combined candidate motion information in the at least one piece of combined candidate motion information is obtained by weighting P pieces of candidate motion information by using corresponding weighting factors, P is an integer greater than or equal to 2, and weighting factors $w_{pi}$ for at least two of the P pieces of candidate motion information are respectively values greater than 0 and less than 1; determine target motion information in the candidate motion information list; and predict motion information of the current picture block based on the target motion information. It should be understood that a sum of the weighting factors for the P pieces of candidate motion information is 1.

The current picture block (referred to as a current block for short) herein may be understood as a current encoding block or a current decoding block.

It should be noted that the candidate motion information list includes one or more types of candidate motion information, for example, one or more of time domain motion information (also referred to as motion information in a time domain direction), inter-view motion information (also referred to as motion information in an inter-view direction), and/or intra motion information.

With reference to the third aspect, in some implementations of the third aspect, the at least one piece of combined candidate motion information further includes second combined candidate motion information, the second combined candidate motion information is obtained by weighting M pieces of candidate motion information by using corresponding weighting factors, M is an integer greater than or equal to 2, and weighting factors $w_{mi}$ for at least two of the M pieces of candidate motion information are respectively values greater than 0 and less than 1. For example, an index identifier of at least one piece of candidate motion information in P index identifiers of the P pieces of candidate motion information is different from an index identifier of at least one piece of candidate motion information in M index identifiers of the M pieces of candidate motion information.

It should be understood that a sum of the weighting factors for the M pieces of candidate motion information is 1.

With reference to the third aspect, in some implementations of the third aspect, each of the P pieces of candidate motion information includes a motion vector corresponding to a first reference list and a reference picture index corresponding to the first reference list; and/or a motion vector corresponding to a second reference list and a reference picture index corresponding to the second reference list; and $P_1$ reference picture indexes that are in the P pieces of candidate motion information and that correspond to the first reference list are the same, or $P_1$ reference picture indexes that are in the P pieces of candidate motion information and that correspond to the first reference list are the same as an index of a first target reference picture; or $P_2$ reference picture indexes that are in the P pieces of candidate motion information and that correspond to the second reference list are the same, or $P_2$ reference picture indexes that are in the P pieces of candidate motion information and that correspond to the second reference list are the same as an index of a second target reference picture, where $1<P_1\leq P$, $1<P_2\leq P$, and $P_1$ or $P_2$ is an integer greater than or equal to 2.

It can be learned that, in the P pieces of candidate motion information that are provided in this embodiment of this application and that are used to obtain the first combined candidate motion information through weighting processing, candidate motion information whose reference picture index is different from the index of the target reference picture may not be considered. Alternatively, once candidate motion information whose reference picture index is different from the index of the target reference picture exists, a motion vector in the candidate motion information needs to be first scaled, to obtain a motion vector that points to the target reference picture.

With reference to the third aspect, in some implementations of the third aspect, the first combined candidate motion information includes: weighted values of $P_1$ candidate motion vectors that are in the P pieces of candidate motion information and that correspond to the first reference list, and/or weighted values of $P_2$ candidate motion vectors that are in the P pieces of candidate motion information and that correspond to the second reference list, where $1<P_1\leq P$, $1<P_2\leq P$, $P_1$ or $P_2$ is an integer greater than or equal to 2, and weighting factors $w_{pi}$ for at least two of the $P_1$ or $P_2$ candidate motion vectors are respectively values greater than 0 and less than 1. It should be understood that a sum of weighting factors for the $P_1$ candidate motion vectors is 1, and a sum of weighting factors for the $P_2$ candidate motion vectors is 1.

With reference to the third aspect, in some implementations of the third aspect, each of the M pieces of candidate motion information includes a motion vector corresponding to the first reference list and a reference picture index corresponding to the first reference list; and/or a motion vector corresponding to the second reference list and a reference picture index corresponding to the second reference list; and $M_1$ reference picture indexes that are in the M pieces of candidate motion information and that correspond to the first reference list are the same, or $M_1$ reference picture indexes that are in the M pieces of candidate motion information and that correspond to the first reference list are the same as the index of the first target reference picture; or $M_2$ reference picture indexes that are in the M pieces of candidate motion information and that correspond to the second reference list are the same, or $M_2$ reference picture indexes that are in the M pieces of candidate motion information and that correspond to the second reference list are the same as the index of the second target reference picture, where $1<M_1\leq M$, $1<M_2\leq M$, and $M_1$ or $M_2$ is an integer greater than or equal to 2.

It can be learned that, in the M pieces of candidate motion information that are provided in this embodiment of this application and that are used to obtain the second combined candidate motion information through weighting processing, candidate motion information whose reference picture index is different from the index of the target reference picture may not be considered. Alternatively, once candidate motion information whose reference picture index is different from the index of the target reference picture exists, a motion vector in the candidate motion information needs to be first scaled, to obtain a motion vector that points to the target reference picture.

With reference to the third aspect, in some implementations of the third aspect, the second combined candidate motion information includes: weighted values of $M_1$ candidate motion vectors that are in the M pieces of candidate motion information and that correspond to the first reference list, and/or weighted values of $M_2$ candidate motion vectors that are in the M pieces of candidate motion information and that correspond to the second reference list, where $1<M_1\leq M$, $1<M_2\leq M$, $M_1$ or $M_2$ is an integer greater than or equal to 2, and weighting factors $w_{mi}$ for at least two of the $M_1$ or $M_2$ candidate motion vectors are respectively values greater than 0 and less than 1. It should be understood that a sum of weighting factors for the $M_1$ candidate motion vectors is 1, and a sum of weighting factors for the $M_2$ candidate motion vectors is 1.

With reference to the third aspect, in some implementations of the third aspect, the P pieces of candidate motion information include first candidate motion information corresponding to a first index identifier and second candidate motion information corresponding to a second index identifier, the first index identifier is less than the second index identifier, and a weighting factor for the first candidate motion information is greater than or equal to a weighting factor for the second candidate motion information.

With reference to the third aspect, in some implementations of the third aspect, the M pieces of candidate motion information include third candidate motion information corresponding to a third index identifier and fourth candidate motion information corresponding to a fourth index identifier, the third index identifier is less than the fourth index identifier, and a weighting factor for the third candidate motion information is greater than or equal to a weighting factor for the fourth candidate motion information.

With reference to the third aspect, in some implementations of the third aspect, the P pieces of candidate motion information are P pieces of original candidate motion information; or the P pieces of candidate motion information are (P−X) pieces of original candidate motion information and X pieces of non-original candidate motion information, where X is a positive integer less than or equal to P.

With reference to the third aspect, in some implementations of the third aspect, the M pieces of candidate motion information are M pieces of original candidate motion information; or the M pieces of candidate motion information are (M−Y) pieces of original candidate motion information and Y pieces of non-original candidate motion information, where Y is a positive integer less than or equal to M.

With reference to the third aspect, in some implementations of the third aspect, the original candidate motion information includes motion information of one or more space domain reference blocks of the current picture block, motion information of one or more time domain reference blocks of the current picture block, and/or motion information of one or more inter-view reference blocks of the current picture block; and the non-original candidate motion information includes scaled candidate motion information, the first combined candidate motion information, the second combined candidate motion information, combined bi-predictive candidate motion information, and/or zero motion information, where each scaled candidate motion information includes a motion vector that points to the first target reference frame and that is in the first reference list, and/or a motion vector that points to the second target reference frame and that is in the second reference list.

With reference to the third aspect, in some implementations of the third aspect, the scaled candidate motion information is obtained by the processor by performing the following steps:

determining the first target reference frame that is of the current picture block and that corresponds to the first reference list and/or the second target reference frame that is of the current picture block and that corresponds to the second reference list;

determining whether a reference picture that is included in the candidate motion information and that corresponds to the first reference list is the same as the first target reference frame, and/or whether a reference picture that is included in the candidate motion information and that corresponds to the second reference list is the same as the second target reference frame; and if the reference picture that is included in the candidate motion information and that corresponds to the first reference list is different from the first target reference frame, scaling, based on a time domain distance or an inter-view distance, the motion vector that is included in the candidate motion information and that corresponds to the first reference picture list, to obtain the motion vector that points to the first target reference frame; and/or if the reference picture that is included in the candidate motion information and that corresponds to the second reference list is different from the second target reference frame, scaling, based on a time domain distance or an inter-view distance, the motion vector that is included in the candidate motion information and that corresponds to the second reference picture list, to obtain the motion vector that points to the second target reference frame.

In an example, the first target reference frame is a reference frame that corresponds to the first reference list and that is of most frequently used candidate motion information in the candidate motion information list, or a reference frame that corresponds to the first reference list and that is of candidate motion information having a smallest index identifier in the candidate motion information list; alternatively, the second target reference frame is a reference frame that corresponds to the second reference list and that is of most frequently used candidate motion information in the candidate motion information list, or a reference frame that corresponds to the second reference list and that is of candidate motion information having a smallest index identifier in the candidate motion information list.

In another example, there are four original merge candidates in the candidate motion information list; and correspondingly, the first target reference picture is a reference picture that corresponds to the first reference list and that is of a most frequently used original merge candidate in the original merge candidates in the candidate motion information list, or a reference picture that corresponds to the first reference list and that is of an original merge candidate having a smallest reference picture index identifier in the original merge candidates in the candidate motion information list, or a reference picture that corresponds to the first reference list and that is of an original merge candidate having a smallest index identifier in the original merge candidates in the candidate motion information list; or the second target reference picture is a reference picture that corresponds to the second reference list and that is of a most frequently used original merge candidate in the original merge candidates in the candidate motion information list, or a reference picture that corresponds to the second reference list and that is of an original merge candidate having a smallest reference picture index identifier in the original merge candidates in the candidate motion information list, or a reference picture that corresponds to the second reference list and that is of an original merge candidate having a smallest index identifier in the original merge candidates in the candidate motion information list.

In still another example, if a quantity of pieces of candidate motion information in the candidate motion information list is less than or equal to a preset quantity R, the first target reference picture is a reference picture that corresponds to the first reference list and that is of most frequently used candidate motion information in the candidate motion information in the candidate motion information list, or a reference picture that corresponds to the first reference list and that is of candidate motion information having a smallest reference picture index identifier in the candidate motion information in the candidate motion information list, or a reference picture that corresponds to the first reference list and that is of candidate motion information having a smallest index identifier in the candidate motion information in the candidate motion information list; or if a quantity of pieces of candidate motion information in the candidate motion information list is greater than a preset quantity R (for example, 4), the first target reference picture is a reference picture that corresponds to the first reference list and that is of most frequently used candidate motion information in the first R pieces of candidate motion information in the candidate motion information list, or a reference picture that corresponds to the first reference list and that is of candidate motion information having a smallest reference picture index identifier in the first R pieces of candidate motion information in the candidate motion information list, or a reference picture that corresponds to the first reference list and that is of candidate motion information having a smallest index identifier in the first R pieces of candidate motion information in the candidate motion information list.

In addition, if a quantity of pieces of candidate motion information in the candidate motion information list is less than or equal to a preset quantity R, the second target reference picture is a reference picture that corresponds to the second reference list and that is of most frequently used candidate motion information in the candidate motion information in the candidate motion information list, or a reference picture that corresponds to the second reference list and that is of candidate motion information having a smallest reference picture index identifier in the candidate motion information in the candidate motion information list, or a reference picture that corresponds to the second reference list and that is of candidate motion information having a smallest index identifier in the candidate motion information in the candidate motion information list; or if a quantity of pieces of candidate motion information in the candidate motion information list is greater than a preset quantity R, the second target reference picture is a reference picture that corresponds to the second reference list and that is of most frequently used candidate motion information in the first R pieces of candidate motion information in the candidate motion information list, or a reference picture that corresponds to the second reference list and that is of candidate motion information having a smallest reference picture index identifier in the first R pieces of candidate motion information in the candidate motion information list, or a reference picture that corresponds to the second reference list and that is of candidate motion information having a smallest index identifier in the first R pieces of candidate motion information in the candidate motion information list.

In yet another example, the first target reference picture is a reference picture that corresponds to the first reference list and that is of most frequently used candidate motion information in the P or M pieces of candidate motion information to be combined, or a reference picture that corresponds to the first reference list and that is of candidate motion information having a smallest reference picture index identifier in the P or M pieces of candidate motion information, or a reference picture that corresponds to the first reference list and that is of candidate motion information having a smallest index identifier in the P or M pieces of candidate motion information; and/or the second target reference picture is a reference picture that corresponds to the second reference list and that is of most frequently used candidate motion information in the P or M pieces of candidate motion information to be combined, or a reference picture that corresponds to the second reference list and that is of candidate motion information having a smallest reference picture index identifier in the P or M pieces of candidate motion information, or a reference picture that corresponds to the second reference list and that is of candidate motion information having a smallest index identifier in the P or M pieces of candidate motion information.

With reference to the third aspect, in some implementations of the third aspect, a quantity of bits occupied by an index identifier of the combined candidate motion information is greater than or equal to a quantity of bits occupied by an index identifier of the original candidate motion information.

With reference to the third aspect, in some implementations of the third aspect, the quantity of bits occupied by the index identifier of the combined candidate motion information is less than or equal to the quantity of bits occupied by the index identifier of the original candidate motion information.

With reference to the third aspect, in some implementations of the third aspect, the processor is specifically configured to use the target motion information as the motion information of the current picture block.

With reference to the third aspect, in some implementations of the third aspect, the motion information includes a motion vector prediction, and the processor is specifically configured to: parse a bitstream to obtain a motion vector difference of the current picture block; and use a sum of the motion vector prediction in the target motion information and the motion vector difference as a motion vector of the current picture block.

With reference to the third aspect, in some implementations of the third aspect, the apparatus is configured to encode the current picture block, and the processor is specifically configured to determine the target motion information in the candidate motion information list, where a rate-distortion cost for encoding the current picture block by using the target motion information is the minimum; or the apparatus is configured to decode the current picture block, and the processor is specifically configured to determine, in the candidate motion information list, target motion information indicated by a fifth index identifier, where the fifth index identifier is used to indicate the target motion information in the candidate motion information list.

It should be noted that if the candidate motion information list includes only one piece of candidate motion information, the unique candidate motion information is determined as the target motion information.

A fourth aspect of this application provides a method for predicting motion information of a picture block, where the motion information is used for intra prediction or inter prediction, and the method includes: obtaining at least one piece of combined candidate motion information, where first combined candidate motion information in the at least one piece of combined candidate motion information is obtained by weighting P pieces of candidate motion information by using corresponding weighting factors, P is an integer greater than or equal to 2, and weighting factors $w_{pi}$ for at least two of the P pieces of candidate motion information are respectively values greater than 0 and less than 1; determining target motion information, where the target motion information is one piece of candidate motion information in the at least one piece of combined candidate motion information; and predicting motion information of a current picture block based on the target motion information. It should be understood that a sum of the weighting factors for the P pieces of candidate motion information is 1. Preferably, the weighting factor $w_{pi}$ for each of the P pieces of candidate motion information may be a value greater than 0 and less than 1.

The current picture block (referred to as a current block for short) herein may be understood as a current encoding block or a current decoding block.

In addition, it should be understood that, when the method is used to encode the current picture block, if one piece of combined candidate motion information is obtained, it is determined that the unique combined candidate motion information is the target motion information; or if more than one piece of combined candidate motion information is obtained, the target motion information is determined in the more than one piece of combined candidate motion information, where a rate-distortion cost for encoding the current picture block by using the target motion information is the minimum.

When the method is used to decode the current picture block, if one piece of combined candidate motion information is obtained, it is determined that the unique combined candidate motion information is the target motion information; or if more than one piece of combined candidate motion information is obtained, the target motion information indicated by identification information in a bitstream is determined in the more than one piece of combined candidate motion information.

With reference to the fourth aspect, in some implementations of the fourth aspect, the first combined candidate motion information includes: weighted values of $P_1$ candidate motion vectors that are in the P pieces of candidate motion information and that are used in a forward prediction direction; and/or weighted values of $P_2$ candidate motion vectors that are in the P pieces of candidate motion information and that are used in a backward prediction direction, where $1<P_1\leq P$, $1<P_2\leq P$, $P_1$ or $P_2$ is an integer greater than or equal to 2, and weighting factors $w_{pi}$ for at least two of the $P_1$ or $P_2$ candidate motion vectors are respectively values greater than 0 and less than 1. It should be understood that a sum of weighting factors for the $P_1$ candidate motion vectors is 1, and a sum of weighting factors for the $P_2$ candidate motion vectors is 1.

With reference to the fourth aspect, in some implementations of the fourth aspect, second combined candidate motion information includes: weighted values of $M_1$ candidate motion vectors that are in M pieces of candidate motion information and that are used in a forward prediction direction; and/or weighted values of $M_2$ candidate motion vectors that are in the M pieces of candidate motion information and that are used in a backward prediction direction, where $1<M_1\leq M$, $1<M_2\leq M$, $M_1$ or $M_2$ is an integer greater than or equal to 2, and weighting factors $w_{mi}$ for at least two of the $M_1$ or $M_2$ candidate motion vectors are respectively values greater than 0 and less than 1. It should be understood that a sum of weighting factors for the $M_1$ candidate motion vectors is 1, and a sum of weighting factors for the $M_2$ candidate motion vectors is 1.

With reference to the fourth aspect, in some implementations of the fourth aspect, the P pieces of candidate motion information include first candidate motion information corresponding to a first index identifier and second candidate motion information corresponding to a second index identifier, the first index identifier is less than the second index identifier, and a weighting factor for the first candidate motion information is greater than or equal to a weighting factor for the second candidate motion information.

With reference to the fourth aspect, in some implementations of the fourth aspect, the M pieces of candidate motion information include third candidate motion information corresponding to a third index identifier and fourth candidate motion information corresponding to a fourth index identifier, the third index identifier is less than the fourth index identifier, and a weighting factor for the third candidate motion information is greater than or equal to a weighting factor for the fourth candidate motion information.

With reference to the fourth aspect, in some implementations of the fourth aspect, the P pieces of candidate motion information are P pieces of original candidate motion information; or the P pieces of candidate motion information are (P−X) pieces of original candidate motion information and X pieces of non-original candidate motion information, where X is a positive integer less than or equal to P.

With reference to the fourth aspect, in some implementations of the fourth aspect, the M pieces of candidate motion information are M pieces of original candidate motion information; or the M pieces of candidate motion information are (M−Y) pieces of original candidate motion information and Y pieces of non-original candidate motion information, where Y is a positive integer less than or equal to M.

With reference to the fourth aspect, in some implementations of the fourth aspect, the original candidate motion information includes motion information of one or more space domain reference blocks of the current picture block, motion information of one or more time domain reference blocks of the current picture block, and/or motion information of one or more inter-view reference blocks of the current picture block; and the non-original candidate motion information includes scaled candidate motion information, the first combined candidate motion information, the second combined candidate motion information, combined bi-predictive candidate motion information, and/or zero motion information, where each scaled candidate motion information includes a motion vector that points to a first target reference frame and that is in a first reference list, and/or a motion vector that points to a second target reference frame and that is in a second reference list.

With reference to the fourth aspect, in some implementations of the fourth aspect, the scaled candidate motion information is obtained by using the following method:

determining the first target reference frame that is of the current picture block and that corresponds to the first reference list and/or the second target reference frame that is of the current picture block and that corresponds to the second reference list;

determining whether a reference picture that is included in the candidate motion information and that corresponds to the first reference list is the same as the first target reference frame, and/or whether a reference picture that is included in the candidate motion information and that corresponds to the second reference list is the same as the second target reference frame; and if the reference picture that is included in the candidate motion information and that corresponds to the first reference list is different from the first target reference frame, scaling, based on a time domain distance or an inter-view distance, the motion vector that is included in the candidate motion information and that corresponds to the first reference picture list, to obtain the motion vector that points to the first target reference frame; and/or if the reference picture that is included in the candidate motion information and that corresponds to the second reference list is different from the second target reference frame, scaling, based on a time domain distance or an inter-view distance, the motion vector that is included in the candidate motion information and that corresponds to the second reference picture list, to obtain the motion vector that points to the second target reference frame.

In an example, the first target reference frame is a reference frame that corresponds to the first reference list and that is of most frequently used candidate motion information in the candidate motion information list, or a reference frame that corresponds to the first reference list and that is of candidate motion information having a smallest index identifier in the candidate motion information list; alternatively, the second target reference frame is a reference frame that corresponds to the second reference list and that is of most frequently used candidate motion information in the candidate motion information list, or a reference frame that corresponds to the second reference list and that is of candidate motion information having a smallest index identifier in the candidate motion information list.

In another example, there are four original merge candidates in the candidate motion information list; and correspondingly, the first target reference picture is a reference picture that corresponds to the first reference list and that is of a most frequently used original merge candidate in the original merge candidates in the candidate motion information list, or a reference picture that corresponds to the first reference list and that is of an original merge candidate having a smallest reference picture index identifier in the original merge candidates in the candidate motion information list, or a reference picture that corresponds to the first reference list and that is of an original merge candidate having a smallest index identifier in the original merge candidates in the candidate motion information list; or the second target reference picture is a reference picture that corresponds to the second reference list and that is of a most frequently used original merge candidate in the original merge candidates in the candidate motion information list, or a reference picture that corresponds to the second reference list and that is of an original merge candidate having a smallest reference picture index identifier in the original merge candidates in the candidate motion information list, or a reference picture that corresponds to the second reference list and that is of an original merge candidate having a smallest index identifier in the original merge candidates in the candidate motion information list.

In still another example, if a quantity of pieces of candidate motion information in the candidate motion information list is less than or equal to a preset quantity R, the first target reference picture is a reference picture that corresponds to the first reference list and that is of most frequently used candidate motion information in the candidate motion information in the candidate motion information list, or a reference picture that corresponds to the first reference list and that is of candidate motion information having a smallest reference picture index identifier in the candidate motion information in the candidate motion information list, or a reference picture that corresponds to the first reference list and that is of candidate motion information having a smallest index identifier in the candidate motion information in the candidate motion information list; or if a quantity of pieces of candidate motion information in the candidate motion information list is greater than a preset quantity R (for example, 4), the first target reference picture is a reference picture that corresponds to the first reference list and that is of most frequently used candidate motion information in the first R pieces of candidate motion information in the candidate motion information list, or a reference picture that corresponds to the first reference list and that is of candidate motion information having a smallest reference picture index identifier in the first R pieces of candidate motion information in the candidate motion information list, or a reference picture that corresponds to the first reference list and that is of candidate motion information having a smallest index identifier in the first R pieces of candidate motion information in the candidate motion information list.

In addition, if a quantity of pieces of candidate motion information in the candidate motion information list is less than or equal to a preset quantity R, the second target reference picture is a reference picture that corresponds to the second reference list and that is of most frequently used candidate motion information in the candidate motion information in the candidate motion information list, or a reference picture that corresponds to the second reference list and that is of candidate motion information having a smallest reference picture index identifier in the candidate motion information in the candidate motion information list, or a reference picture that corresponds to the second reference list and that is of candidate motion information having a smallest index identifier in the candidate motion information in the candidate motion information list; or if a quantity of pieces of candidate motion information in the candidate motion information list is greater than a preset quantity R, the second target reference picture is a reference picture that corresponds to the second reference list and that is of most frequently used candidate motion information in the first R pieces of candidate motion information in the candidate motion information list, or a reference picture that corresponds to the second reference list and that is of candidate motion information having a smallest reference picture index identifier in the first R pieces of candidate motion information in the candidate motion information list, or a reference picture that corresponds to the second reference list and that is of candidate motion information having a smallest index identifier in the first R pieces of candidate motion information in the candidate motion information list.

In yet another example, the first target reference picture is a reference picture that corresponds to the first reference list and that is of most frequently used candidate motion information in the P or M pieces of candidate motion information to be combined, or a reference picture that corresponds to the first reference list and that is of candidate motion information having a smallest reference picture index identifier in the P or M pieces of candidate motion information, or a reference picture that corresponds to the first reference list and that is of candidate motion information having a smallest index identifier in the P or M pieces of candidate motion information; and/or the second target reference picture is a reference picture that corresponds to the second reference list and that is of most frequently used candidate motion information in the P or M pieces of candidate motion information to be combined, or a reference picture that corresponds to the second reference list and that is of candidate motion information having a smallest reference picture index identifier in the P or M pieces of candidate motion information, or a reference picture that corresponds to the second reference list and that is of candidate motion information having a smallest index identifier in the P or M pieces of candidate motion information.

With reference to the fourth aspect, in some implementations of the fourth aspect, the predicting motion information of a current picture block based on the target motion information includes: using the target motion information as the motion information of the current picture block.

With reference to the fourth aspect, in some implementations of the fourth aspect, the motion information includes a motion vector prediction, and the predicting motion information of a current picture block based on the target motion information includes: parsing a bitstream to obtain a motion vector prediction difference of the current picture block; and using a sum of the motion vector prediction in the target motion information and the motion vector prediction difference as a motion vector of the current picture block.

A fifth aspect of this application provides an apparatus for predicting motion information of a picture block, and the apparatus includes several functional units configured to implement the method according to any one of the fourth aspect or the implementations thereof. For example, the apparatus for predicting motion information of a picture block may include:

a motion information obtaining unit, configured to obtain at least one piece of combined candidate motion information, where first combined candidate motion information in the at least one piece of combined candidate motion information is obtained by weighting P pieces of candidate motion information by using corresponding weighting factors, P is an integer greater than or equal to 2, and weighting factors $w_{pi}$ for at least two of the P pieces of candidate motion information are respectively values greater than 0 and less than 1; a motion information determining unit, configured to determine target motion information, where the target motion information is one piece of candidate motion information in the at least one piece of combined candidate motion information; and a prediction unit, configured to predict motion information of a current picture block based on the target motion information.

It should be understood that a sum of the weighting factors for the P pieces of candidate motion information is 1. In addition, the current picture block (referred to as a current block for short) herein may be understood as a current encoding block or a current decoding block.

The apparatus for predicting motion information of a picture block is, for example, applied to a video encoding apparatus (a video encoder) or a video decoding apparatus (a video decoder).

A sixth aspect of this application provides an apparatus for predicting motion information of a picture block, where the motion information is used for intra prediction or inter prediction, and the apparatus includes a processor and a memory coupled to the processor, where the processor is configured to: obtain at least one piece of combined candidate motion information, where first combined candidate motion information in the at least one piece of combined candidate motion information is obtained by weighting P pieces of candidate motion information by using corresponding weighting factors, P is an integer greater than or equal to 2, and weighting factors $w_{pi}$ for at least two of the P pieces of candidate motion information are respectively values greater than 0 and less than 1; determine target motion information, where the target motion information is one piece of candidate motion information in the at least one piece of combined candidate motion information; and predict motion information of a current picture block based on the target motion information. It should be understood that a sum of the weighting factors for the P pieces of candidate motion information is 1.

The current picture block (referred to as a current block for short) herein may be understood as a current encoding block or a current decoding block.

A seventh aspect of this application provides a video encoder, where the video encoder is configured to encode a picture block, and includes:

an inter predictor (also referred to as an inter prediction unit), including the apparatus for predicting motion information of a picture block according to the second aspect, the third aspect, the fifth aspect, or the sixth aspect, where the inter predictor is configured to: predict motion information of a current picture block based on target motion information; and determine a prediction block of a current encoding block based on the motion information of the current picture block; an entropy encoder (also referred to as an entropy encoding unit), configured to encode an index identifier of the target motion information into a bitstream, where the index identifier is used to indicate the target motion information used for the current encoding block; and a reconstructor (also referred to as a reconstruction unit), configured to reconstruct the picture block based on the prediction block.

With reference to the seventh aspect, in some implementations of the seventh aspect, the inter predictor is further configured to select, from a plurality of pieces of candidate motion information included in a candidate motion information list, the target motion information used for the current encoding block, where a rate-distortion cost for encoding the current encoding block by using the selected target motion information is the minimum.

An eighth aspect of this application provides a video encoder, where the video encoder is configured to encode a picture block, and includes:

an intra predictor (also referred to as an intra prediction unit), including the apparatus for predicting motion information of a picture block according to the second aspect, the third aspect, the fifth aspect, or the sixth aspect, where the intra predictor is configured to: predict intra motion information of a current picture block based on target motion information; and determine an intra prediction block of a current encoding block based on the intra motion information of the current picture block; an entropy encoder (also referred to as an entropy encoding unit), configured to encode an index identifier of the target motion information into a bitstream, where the index identifier is used to indicate the target motion information used for the current encoding block; and a reconstructor (also referred to as a reconstruction unit), configured to reconstruct the picture block based on the intra prediction block.

With reference to the eighth aspect, in some implementations of the eighth aspect, the intra predictor is further configured to select, from a plurality of pieces of candidate motion information included in a candidate motion information list, the target motion information used for the current encoding block, where a rate-distortion cost for encoding the current encoding block by using the selected target motion information is the minimum.

A ninth aspect of this application provides a video decoder, where the video decoder is configured to decode a bitstream to obtain a picture block, and includes: an entropy decoder (also referred to as an entropy decoding unit), configured to decode the bitstream to obtain an index identifier, where the index identifier is used to indicate target motion information for a current decoding block; an inter predictor (also referred to as an inter prediction unit), including the apparatus for predicting motion information of a picture block according to the second aspect, the third aspect, the fifth aspect, or the sixth aspect, where the inter predictor is configured to: predict motion information of a current picture block based on the target motion information indicated by the index identifier, and determine a prediction block of the current decoding block based on the motion information of the current picture block; and a reconstructor (also referred to as a reconstruction unit), configured to reconstruct the picture block based on the prediction block.

A tenth aspect of this application provides a video decoder, where the video decoder is configured to decode a bitstream to obtain a picture block, and includes: an entropy decoder (also referred to as an entropy decoding unit), configured to decode the bitstream to obtain an index identifier, where the index identifier is used to indicate target motion information for a current decoding block; an intra predictor (also referred to as an intra prediction unit), including the apparatus for predicting motion information of a picture block according to the second aspect, the third aspect, the fifth aspect, or the sixth aspect, where the intra predictor is configured to: predict motion information of a current picture block based on the target motion information indicated by the index identifier, and determine a prediction block of the current decoding block based on the motion information of the current picture block; and a reconstructor (also referred to as a reconstruction unit), configured to reconstruct the picture block based on the prediction block.

An eleventh aspect of this application provides a computer-readable storage medium, where the computer-readable storage medium stores an instruction, and when the instruction is run on a computer, the computer is enabled to perform the method according to the first aspect, the fourth aspect, the sixteenth aspect, the eighteenth aspect, or the nineteenth aspect.

A twelfth aspect of this application provides a computer program product including an instruction. When the computer program product is run on a computer, the computer is enabled to perform the method according to the first aspect, the fourth aspect, the sixteenth aspect, the eighteenth aspect, or the nineteenth aspect.

A thirteenth aspect of this application provides an electronic device, including the video encoder according to the seventh aspect or the eighth aspect, the video decoder according to the ninth aspect or the tenth aspect, or the apparatus for predicting motion information of a picture block according to the second aspect, the third aspect, the fifth aspect, the sixth aspect, the seventeenth aspect, or the twentieth aspect.

A fourteenth aspect of this application provides an encoding device, including a nonvolatile memory and a processor that are coupled to each other, where the processor invokes program code stored in the memory to perform some or all steps of the method according to the first aspect, the fourth aspect, the sixteenth aspect, the eighteenth aspect, or the nineteenth aspect.

A fifteenth aspect of this application provides a decoding device, including a nonvolatile memory and a processor that are coupled to each other, where the processor invokes program code stored in the memory to perform some or all steps of the method according to the first aspect, the fourth aspect, the sixteenth aspect, the eighteenth aspect, or the nineteenth aspect.

A sixteenth aspect of this application provides a method for predicting motion information of a picture block, where the motion information is used for intra prediction or inter prediction, and the method includes: determining a first target reference picture that is of a current picture block and that corresponds to a first reference list and/or a second target reference picture that is of the current picture block and that corresponds to a second reference list; determining whether a reference picture that is included in P or (P−1) pieces of candidate motion information and that corresponds to the first reference list is the same as the first target reference picture; and/or whether a reference picture that is included in the P or (P−1) pieces of candidate motion information and that corresponds to the second reference list is the same as the second target reference picture; if the reference picture that is included in the P or (P−1) pieces of candidate motion information and that corresponds to the first reference picture, weighting, by using a corresponding weighting factor, a motion vector that is included in the P pieces of candidate motion information and that corresponds to the first reference picture list, to obtain a motion vector that is in first combined candidate motion information and that corresponds to the first reference picture list; and/or if the reference picture that is included in the P or (P−1) pieces of candidate motion information and that corresponds to the second reference list is the same as the second target reference picture, weighting, by using a corresponding weighting factor, a motion vector that is included in the P pieces of candidate motion information and that corresponds to the second reference picture list, to obtain a motion vector that is in the first combined candidate motion information and that corresponds to the second reference picture list; determining target motion information in a candidate motion information list of the current picture block, where the candidate motion information list includes the first combined candidate motion information; and predicting motion information of the current picture block based on the target motion information.

If the first target reference picture is a reference picture that corresponds to the first reference list and that is of candidate motion information having a smallest index identifier in the P pieces of candidate motion information, it is determined whether a reference picture that is included in the (P−1) pieces of candidate motion information and that corresponds to the first reference list is the same as the first target reference picture; or if the second target reference picture is a reference picture that corresponds to the second reference list and that is of candidate motion information having a smallest index identifier in the P pieces of candidate motion information, it is determined whether a reference picture that is included in the (P−1) pieces of candidate motion information and that corresponds to the second reference list is the same as the second target reference picture.

A seventeenth aspect of this application provides an apparatus for predicting motion information of a picture block, where the motion information is used for intra prediction or inter prediction, and the apparatus includes a processor and a memory coupled to the processor, where the processor is configured to: determine a first target reference picture that is of a current picture block and that corresponds to a first reference list and/or a second target reference picture that is of the current picture block and that corresponds to a second reference list; determine whether a reference picture that is included in P or (P−1) pieces of candidate motion information and that corresponds to the first reference list is the same as the first target reference picture; and/or whether a reference picture that is included in the P or (P−1) pieces of candidate motion information and that corresponds to the second reference list is the same as the second target reference picture; if the reference picture that is included in the P or (P−1) pieces of candidate motion information and that corresponds to the first reference list is the same as the first target reference picture, weight, by using a corresponding weighting factor, a motion vector that is included in the P pieces of candidate motion information and that corresponds to the first reference picture list, to obtain a motion vector that is in first combined candidate motion information and that corresponds to the first reference picture list; and/or if the reference picture that is included in the P or (P−1) pieces of candidate motion information and that corresponds to the second reference list is the same as the second target reference picture, weight, by using a corresponding weighting factor, a motion vector that is included in the P pieces of candidate motion information and that corresponds to the second reference picture list, to obtain a motion vector that is in the first combined candidate motion information and that corresponds to the second reference picture list; determine target motion information in a candidate motion information list of the current picture block, where the candidate motion information list includes the first combined candidate motion information; and predict motion information of the current picture block based on the target motion information.

If the first target reference picture is a reference picture that corresponds to the first reference list and that is of candidate motion information having a smallest index identifier in the P pieces of candidate motion information, it is determined whether a reference picture that is included in the (P−1) pieces of candidate motion information and that corresponds to the first reference list is the same as the first target reference picture; or if the second target reference picture is a reference picture that corresponds to the second reference list and that is of candidate motion information having a smallest index identifier in the P pieces of candidate motion information, it is determined whether a reference picture that is included in the (P−1) pieces of candidate motion information and that corresponds to the second reference list is the same as the second target reference picture.

An eighteenth aspect of this application provides a method for obtaining combined candidate motion information, where the method includes: determining a first target reference picture that is of a current picture block and that corresponds to a first reference list and/or a second target reference picture that is of the current picture block and that corresponds to a second reference list; determining whether a reference picture that is included in P or (P−1) pieces of candidate motion information and that corresponds to the first reference list is the same as the first target reference picture; and/or whether a reference picture that is included in the P or (P−1) pieces of candidate motion information and that corresponds to the second reference list is the same as the second target reference picture; if the reference picture that is included in the P or (P−1) pieces of candidate motion information and that corresponds to the first reference list is the same as the first target reference picture, weighting, by using a corresponding weighting factor, a motion vector that is included in the P pieces of candidate motion information and that corresponds to the first reference picture list, to obtain a motion vector that is in first combined candidate motion information and that corresponds to the first reference picture list; and/or if the reference picture that is included in the P or (P−1) pieces of candidate motion information and that corresponds to the second reference list is the same as the second target reference picture, weighting, by using a corresponding weighting factor, a motion vector that is included in the P pieces of candidate motion information and that corresponds to the second reference picture list, to obtain a motion vector that is in the first combined candidate motion information and that corresponds to the second reference picture list.

A nineteenth aspect of this application provides a method for predicting motion information of a picture block, where the motion information is used for intra prediction or inter prediction, and the method includes:

determining a first target reference picture that is of a current picture block and that corresponds to a first reference list and/or a second target reference picture that is of the current picture block and that corresponds to a second reference list;

weighting, by using a corresponding weighting factor, a motion vector that is included in P pieces of candidate motion information and that corresponds to the first reference picture list, to obtain a motion vector that is in first combined candidate motion information and that corresponds to the first reference picture list, where a reference picture that is included in the P pieces of candidate motion information and that corresponds to the first reference list is the same as the first target reference picture; and/or weighting, by using a corresponding weighting factor, a motion vector that is included in the P pieces of candidate motion information and that corresponds to the second reference picture list, to obtain a motion vector that is in the first combined candidate motion information and that corresponds to the second reference picture list, where a reference picture that is included in the P pieces of candidate motion information and that corresponds to the second reference list is the same as the second target reference picture;

determining target motion information in a candidate motion information list of the current picture block, where the candidate motion information list includes the first combined candidate motion information; and predicting motion information of the current picture block based on the target motion information.

A twentieth aspect of this application provides an apparatus for predicting motion information of a picture block, where the motion information is used for intra prediction or inter prediction, and the apparatus includes a processor and a memory coupled to the processor, where the processor is configured to: determine a first target reference picture that is of a current picture block and that corresponds to a first reference list and/or a second target reference picture that is of the current picture block and that corresponds to a second reference list;

weight, by using a corresponding weighting factor, a motion vector that is included in P pieces of candidate motion information and that corresponds to the first reference picture list, to obtain a motion vector that is in first combined candidate motion information and that corresponds to the first reference picture list, where a reference picture that is included in the P pieces of candidate motion information and that corresponds to the first reference list is the same as the first target reference picture; and/or weight, by using a corresponding weighting factor, a motion vector that is included in the P pieces of candidate motion information and that corresponds to the second reference picture list, to obtain a motion vector that is in the first combined candidate motion information and that corresponds to the second reference picture list, where a reference picture that is included in the P pieces of candidate motion information and that corresponds to the second reference list is the same as the second target reference picture;

determine target motion information in a candidate motion information list of the current picture block, where the candidate motion information list includes the first combined candidate motion information; and predict motion information of the current picture block based on the target motion information.

A twenty-first aspect of this application provides a method for predicting motion information of a picture block, where the motion information is used for intra prediction or inter prediction, and the method includes:

weighting, by using a corresponding weighting factor, a motion vector that is included in P pieces of candidate motion information and that corresponds to a first reference picture list, to obtain a motion vector that is in first combined candidate motion information and that corresponds to the first reference picture list; and/or weighting, by using a corresponding weighting factor, a motion vector that is included in the P pieces of candidate motion information and that corresponds to a second reference picture list, to obtain a motion vector that is in the first combined candidate motion information and that corresponds to the second reference picture list;

determining target motion information in a candidate motion information list of a current picture block, where the candidate motion information list includes the first combined candidate motion information; and predicting motion information of the current picture block based on the target motion information.

A twenty-second aspect of this application provides an apparatus for predicting motion information of a picture block, where the motion information is used for intra prediction or inter prediction, and the apparatus includes a processor and a memory coupled to the processor, where the processor is configured to: weight, by using a corresponding weighting factor, a motion vector that is included in P pieces of candidate motion information and that corresponds to a first reference picture list, to obtain a motion vector that is in first combined candidate motion information and that corresponds to the first reference picture list; and/or weight, by using a corresponding weighting factor, a motion vector that is included in the P pieces of candidate motion information and that corresponds to a second reference picture list, to obtain a motion vector that is in the first combined candidate motion information and that corresponds to the second reference picture list;

determine target motion information in a candidate motion information list of a current picture block, where the candidate motion information list includes the first combined candidate motion information; and predict motion information of the current picture block based on the target motion information.

It should be understood that, the technical solutions in the second aspect to the twenty-second aspect of this application are consistent with the technical solution in the first aspect of this application. Beneficial effects achieved by the various aspects and corresponding feasible implementations are similar, and details are not described again.

BRIEF DESCRIPTION OF DRAWINGS

To describe technical solutions in embodiments of this application or in the background more clearly, the following briefly describes the accompanying drawings required for describing the embodiments of this application or the background.

FIG. 8B is another example schematic diagram of adding combined candidate motion information to a merge mode candidate list according to an embodiment of this application;

FIG. 16 is a schematic diagram of a gain of encoding and decoding performance according to an embodiment of this application.

DESCRIPTION OF EMBODIMENTS

The following clearly and completely describes the technical solutions in the embodiments of this application with reference to the accompanying drawings in the embodiments of this application.

Figure 1:
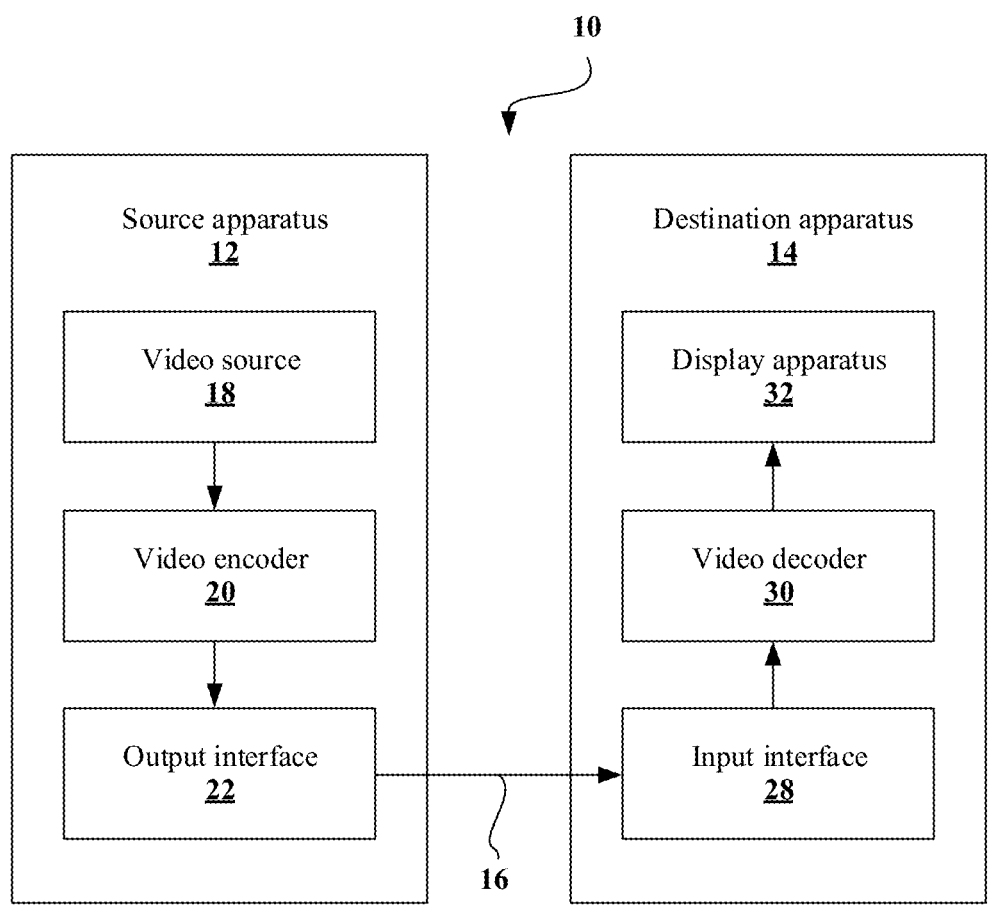
FIG. 1 is a schematic block diagram of a video encoding and decoding system according to an embodiment of this application.

FIG. 1 is a schematic block diagram of a video encoding and decoding system 10 according to an embodiment of this application. As shown in FIG. 1, the system 10 includes a source apparatus 12, and the source apparatus 12 generates coded video data to be decoded by a destination apparatus 14. The source apparatus 12 and the destination apparatus 14 may include any one of a wide range of apparatuses, including a desktop computer, a laptop computer, a tablet computer, a set-top box, a mobile phone such as a "smart" phone, a "smart" touch panel, a television, a camera, a display apparatus, a digital media player, a video game console, a video streaming transmission apparatus, or the like. In some applications, the source apparatus 12 and the destination apparatus 14 may be equipped for wireless communication.

The destination apparatus 14 may receive the to-be-decoded coded video data through a link 16. The link 16 may include any type of medium or apparatus capable of transmitting the coded video data from the source apparatus 12 to the destination apparatus 14. In a feasible implementation, the link 16 may include a communications medium enabling the source apparatus 12 to directly transmit the coded video data to the destination apparatus 14 in real time. The coded video data can be modulated according to a communication standard (for example, a wireless communication protocol) and transmitted to the destination apparatus 14. The communications medium may include any wireless or wired communications medium, for example, a radio frequency spectrum or one or more physical transmission cables. The communications medium may be a part of a packet-based network (for example, a local area network, a wide area network, or a global network of the internet). The communications medium may include a router, a switch, a base station, or any other device facilitating communication from the source apparatus 12 to the destination apparatus 14.

Alternatively, the coded data may be output to a storage apparatus 24 through an output interface 22. Similarly, the coded data may be accessed from the storage apparatus 24 through an input interface. The storage apparatus 24 may include any one of a plurality of dispersed or local access data storage media, for example, a hard disk drive, a Blu-ray disc, a DVD, a CD-ROM, a flash memory, a volatile or nonvolatile memory, or any other appropriate data storage medium configured to store the coded video data. In another feasible implementation, the storage apparatus 24 may correspond to a file server or another intermediate storage apparatus capable of storing the coded video data generated by the source apparatus 12. The destination apparatus 14 may access the stored video data from the storage apparatus 24 through streaming transmission or downloading. The file server may be any type of server capable of storing the coded video data and transmitting the coded video data to the destination apparatus 14. In a feasible implementation, the file server includes a website server, a file transfer protocol server, a network-attached storage apparatus, or a local disk drive. The destination apparatus 14 may access the coded video data through any standard data connection including an internet connection. The data connection may include a wireless channel (for example, a Wi-Fi connection), a wired connection (for example, a cable modem), or a combination thereof, that is suitable for accessing the coded video data stored in the file server. Transmission of the coded video data from the storage apparatus 24 may be streaming transmission, downloading transmission, or a combination thereof.

Technologies in this application are not necessarily limited to wireless applications or settings. The technologies can be applied to video decoding, to support any one of a plurality of multimedia applications, for example, over-the-air television broadcasting, cable television transmission, satellite television transmission, streaming video transmission (for example, through the internet), digital video encoding for storage on a data storage medium, decoding of a digital video stored on a data storage medium, or other applications. In some possible implementations, the system 10 may be configured to support unidirectional or bidirectional video transmission, to support applications such as streaming video transmission, video playing, video broadcasting, and/or videotelephony.

In a feasible implementation of FIG. 1, the source apparatus 12 may include a video source 18, a video encoder 20, and the output interface 22. In some applications, the output interface 22 may include a modulator/demodulator (a modem) and/or a transmitter. In the source apparatus 12, the video source 18 includes, for example, sources of a video capturing apparatus (for example, a video camera), a video archive including a previously captured video, a video feed-in interface for receiving a video from a video content provider, and/or a computer graphics system for generating computer graphics data as a source video, or a combination of the sources. In a feasible implementation, if the video source 18 is a video camera, the source apparatus 12 and the destination apparatus 14 may constitute a camera phone or a video phone. The technologies described in this application may be, for example, applied to video decoding, and may be applied to wireless and/or wired applications.

The video encoder 20 may encode a video that is captured, pre-captured, or generated by a computer. Coded video data may be directly transmitted to the destination apparatus 14 through the output interface 22 of the source apparatus 12. The coded video data may also (or alternatively) be stored on the storage apparatus 24 for subsequent access of the destination apparatus 14 or another apparatus for decoding and/or playing.

The destination apparatus 14 includes an input interface 28, a video decoder 30, and a display apparatus 32. In some applications, the input interface 28 may include a receiver and/or a modem. The input interface 28 of the destination apparatus 14 receives the coded video data through the link 16. The coded video data transmitted or provided to the storage apparatus 24 through the link 16 may include a plurality of syntax elements generated by the video encoder 20 for the video decoder 30 to decode the video data. These syntax elements may be included with the coded video data transmitted on the communications medium, stored in the storage medium or stored in the file server.

The display apparatus 32 may be integrated with the destination apparatus 14 or disposed outside the destination apparatus 14. In some possible implementations, the destination apparatus 14 may include an integrated display apparatus and also be configured to connect to an interface of an external display apparatus. In another feasible implementation, the destination apparatus 14 may be a display apparatus. Usually, the display apparatus 32 displays the decoded video data to a user, and may include any one of a plurality of display apparatuses, for example, a liquid crystal display, a plasma display, an organic light-emitting diode display, or a display apparatus of another type.

The video encoder 20 and the video decoder 30 may operate according to, for example, a next-generation video encoding and decoding compression standard (H.266) currently in development, and may comply with an H.266 test model (JEM). Alternatively, the video encoder 20 and the video decoder 30 may operate according to, the ITU-TH.265 standard, also referred to as the high efficiency video decoding standard, or another dedicated or industrial standard of the ITU-TH.264 standard, or an extension of these standards. The ITU-TH.264 standard is alternatively referred to as MPEG-4 Part 10, or advanced video coding (advanced video coding, AVC). However, the technologies of this application are not limited to any particular decoding standard. Other feasible implementations of the video compression standard include MPEG-2 and ITU-T H.263.

Although not shown in FIG. 1, in some aspects, the video encoder 20 and the video decoder 30 may be respectively integrated with an audio encoder and an audio decoder, and each may include an appropriate multiplexer-demultiplexer (MUX-DEMUX) unit or other hardware and software to encode both audio and a video in a common bitstream or a separate bitstream. If applicable, in some feasible implementations, the MUX-DEMUX unit may comply with the ITU H.223 multiplexer protocol or another protocol such as the user datagram protocol (UDP).

The video encoder 20 and the video decoder 30 may be implemented as any one of a plurality of appropriate encoder circuits, for example, one or more microprocessors, digital signal processors (DSP), application-specific integrated circuits (ASIC), field-programmable gate arrays (FPGA), discrete logic, software, hardware, firmware, or any combination thereof. When the technologies are partially implemented by software, an apparatus may store an instruction of the software in an appropriate non-transitory computer-readable medium, and execute the instruction in a form of hardware by using one or more processors, to implement the technologies of this application. Each of the video encoder 20 and the video decoder 30 may be included in one or more encoders or decoders, and either of the video encoder 20 or the video decoder 30 may be integrated into a corresponding apparatus as a part of a combined encoder/decoder (CODEC).

In this application, for example, the video encoder 20 may "signal" particular information to another apparatus such as the video decoder 30. However, it should be understood that the video encoder 20 may associate particular syntax elements with various coded parts of the video data, to signal information. In other words, the video encoder 20 may store the particular syntax elements in header information of the various coded parts of the video data, to "signal" data. In some applications, the syntax elements may be encoded and stored (for example, stored in a storage system 34 or a file server 36) before being received and decoded by the video decoder 30. Therefore, the term "signal" may mean, for example, transmission of syntax data or other data used for decoding compressed video data, regardless of whether the transmission is performed in real time, nearly in real time, or within a time period. For example, the transmission may be performed when a syntax element is stored in a medium during encoding, and then the syntax element may be retrieved by a decoding apparatus at any time after being stored in the medium.

The JCT-VC developed the H.265 (HEVC) standard. HEVC standardization is based on an evolved model of a video decoding apparatus referred to as an HEVC test model (HM). The latest H.265 standard document is available at http://www.itu.int/rec/T-REC-H.265. The latest version of the standard document is H.265 (12/16), which is incorporated herein by reference in its entirety. The HM assumes that the video decoding apparatus has several additional capabilities compared with existing algorithms of ITU-TH.264/AVC. For example, H.264 provides nine intra prediction coding modes, while the HM can provide up to 35 intra prediction coding modes.

The JVET is committed to developing the H.266 standard. An H.266 standardization process is based on an evolved model of a video decoding apparatus that is referred to as an H.266 test model. H.266 algorithm descriptions are available at http://phenix.int-evry.fr/jvet, and the latest algorithm descriptions are included in JVET-F1001-v2. This algorithm description document is incorporated herein by reference in its entirety. In addition, reference software for a JEM test model is available at https://jvet.hhi.fraunhofer.de/svn/svn_HMJEMSoftware/, which is also incorporated herein by reference in its entirety.

Usually, in HM working model descriptions, a video frame or picture may be divided into a sequence of a tree block or a largest coding unit (largest coding unit, LCU) including both luma and chroma samples, where the LCU is also referred to as a CTU. A tree block has purposes similar to those of a macroblock in the H.264 standard. A slice includes several consecutive tree blocks in a decoding order. A video frame or picture may be partitioned into one or more slices. Each tree block can be split into coding units based on a quadtree. For example, a tree block acting as a root node of the quadtree may be split into four child nodes, and each child node may act as a parent node and be split into four other child nodes. A final non-splittable child node acting as a leaf node of the quadtree includes a decoding node, for example, a decoded video block. Syntax data associated with a decoded bitstream may define a maximum quantity of splittable times of the tree block, and may also define a minimum size of the decoding node.

The coding unit includes a decoding node, a prediction unit (prediction unit, PU), and a transform unit (transform unit, TU) associated with the decoding node. The CU has a size corresponding to a size of the decoding node, and needs to have a square shape. The size of the CU may range from 8×8 pixels to a maximum of 64×64 pixels or a larger tree block size. Each CU may include one or more PUs and one or more TUs. For example, syntax data associated with the CU may describe partitioning of the CU into one or more PUs. Partitioning modes may vary when the CU is skipped, or coded in a direct mode, an intra prediction mode, or an inter prediction mode. The PU may have a non-square shape after being partitioned. For example, the syntax data associated with the CU may also describe partitioning of the CU into one or more TUs based on the quadtree. The TU may have a square or non-square shape.

The HEVC standard allows TU-based transformation, and TUs may be different for different CUs. A size of the TU is usually set based on a size of a PU within a given CU defined for a partitioned LCU. However, a case may not always be like this. The size of the TU is usually the same as or smaller than the size of the PU. In some feasible implementations, a quadtree structure referred to as a "residual quadtree" (residual quadtree, RQT) may be used to divide a residual sample corresponding to the CU into smaller units. A leaf node of the RQT may be referred to as a TU. Pixel differences associated with the TU may be transformed to generate transform coefficients, and the transform coefficients may be quantized.

Usually, the PU includes data related to a prediction process. For example, when the PU is encoded in the intra mode, the PU may include data describing the intra prediction mode of the PU. In another feasible implementation, when the PU is encoded in the inter mode, the PU may include data defining a motion vector for the PU. For example, the data defining the motion vector of the PU may describe a horizontal component of the motion vector, a vertical component of the motion vector, a resolution (for example, one-fourth-pixel accuracy or one-eighth-pixel accuracy) of the motion vector, a reference picture to which the motion vector points, and/or a motion vector-reference picture list (for example, a list 0, a list 1, or a list C).

Usually, the TU performs transform and quantization processes. A given CU having one or more PUs may also include one or more TUs. After prediction, the video encoder 20 may calculate a residual value corresponding to the PU. The residual value includes a pixel difference, and the pixel difference may be transformed into a transform coefficient, and the transform coefficient is quantized, and subject to TU scanning to generate a serialized transform coefficient for entropy decoding. In this application, the term "video block" is usually used to indicate a decoding node of a CU. In some particular applications, in this application, the term "video block" may also be used to indicate a tree block including a decoding node, a PU, and a TU, for example, an LCU or a CU.

A video sequence usually includes a series of video frames or pictures. For example, a group of pictures (group of pictures, GOP) includes a series of video pictures, and one or more video pictures. The GOP may include syntax data in header information of the GOP, in header information of one or more of the pictures, or elsewhere, and the syntax data describes a quantity of pictures included in the GOP. Each slice of a picture may include slice syntax data describing an encoding mode of the corresponding picture. The video encoder 20 usually performs an operation on a video block in a video slice, to encode video data. The video block may correspond to the decoding node in the CU. A size of the video block may be fixed or changeable, and may vary according to a specified decoding standard.

In a feasible implementation, the HM supports prediction for a variety of PU sizes. It is assumed that a size of a particular CU is 2N×2N, and the HM supports intra prediction for a PU size of 2N×2N or N×N, and inter prediction for a symmetric PU size of 2N×2N, 2N×N, N×2N, or N×N. The HM also supports asymmetric partitioning for inter prediction for PU sizes such as 2N×nU, 2N×nD, nL×2N, and nR×2N. In asymmetric partitioning, the CU is not partitioned in one direction, and is partitioned into 25% and 75% in the other direction. A portion of the CU that corresponds to the 25% partition is indicated by an indicator including "n" followed by "U (Up)", "D (Down)", "L (Left)" or "R (Right)". Therefore, for example, "2N×nU" refers to 2N×2NCU horizontally partitioned with 2N×0.5NPU at the top and 2N×1.5NPU at the bottom.

In this application, "N×N" and "N multiplied by N" may be used interchangeably to indicate a pixel size of a video block in a vertical dimension and a horizontal dimension, for example, 16×16 pixels or 16 multiplied by 16 pixels. Usually, a 16×16 block has 16 pixels (y=16) in a vertical direction and 16 pixels (x=16) in a horizontal direction. Similarly, an N×N block has N pixels in the vertical direction and N pixels in the horizontal direction, where N indicates a non-negative integer. Pixels in a block may be arranged in rows and columns. In addition, in a block, a quantity of pixels in the horizontal direction and a quantity of pixels in the vertical direction may not need to be the same. For example, a block may include N×M pixels, where M is not necessarily equal to N.

After intra predictive or inter predictive decoding on the PU in the CU, the video encoder 20 may calculate residual data of the TU in the CU. The PU may include pixel data in space domain (also referred to as pixel domain), and the TU may include a coefficient in transform domain after transform (for example, discrete cosine transform (discrete cosine transform, DCT), integer transform, wavelet transform, or other conceptually similar transform) is applied to residual video data. The residual data may correspond to a pixel difference between pixels of a picture not coded and a predictor corresponding to the PU. The video encoder 20 may generate a TU including residual data of the CU, and then transform the TU to generate a transform coefficient of the CU.

After performing any transform to generate transform coefficients, the video encoder 20 may quantize the transform coefficients. Quantization is, for example, a process of quantizing the coefficients, to reduce an amount of data used for representing the coefficients and implement further compression. The quantization process can reduce a bit depth associated with some or all of the coefficients. For example, during quantization, an n-bit value may be reduced to an m-bit value, where n is greater than m.

The JEM model further improves a video picture coding structure. Specifically, a block coding structure referred to as a "quadtree plus binary tree" (QTBT) is introduced. Without using such concepts as CU, PU, and TU in the HEVC, the QTBT structure supports more flexible partitioned CU shapes. One CU may have a square or rectangular shape. Quadtree partitioning is first performed on one CTU, and binary tree partitioning is further performed on leaf nodes of a quadtree. In addition, there are two binary tree partitioning modes: symmetric horizontal partitioning and symmetric vertical partitioning. A leaf node of a binary tree is referred to as a CU. The CU in the JEM model cannot be further partitioned during prediction and transformation. In other words, a CU, PU, and TU in the JEM model have a same block size. In a JEM model in a current phase, a maximum size of the CTU is 256×256 luma pixels.

In some feasible implementations, the video encoder 20 may scan the quantized transform coefficient in a predefined scanning order to generate a serialized vector that can be entropy coded. In some other feasible implementations, the video encoder 20 may perform adaptive scanning. After scanning the quantized transform coefficient to form a one-dimensional vector, the video encoder 20 may entropy decode the one-dimensional vector through context-adaptive variable-length coding (CAVLC), context-adaptive binary arithmetic coding (CABAC), syntax-based context-adaptive binary arithmetic coding (SBAC), probability interval partitioning entropy (PIPE) coding, or another entropy coding method. The video encoder 20 may further entropy code the syntax elements associated with the coded video data for the video decoder 30 to decode the video data.

To perform CABAC, the video encoder 20 may assign a context in a context model to a to-be-transmitted symbol. The context may be related to whether an adjacent value of the symbol is non-zero. To perform CAVLC, the video encoder 20 may select a variable-length code of the to-be-transmitted symbol. A codeword in the variable-length code (VLC) may be constructed, so that a shorter code corresponds to a more probable symbol, and a longer code corresponds to a less probable symbol. In this way, compared with using equal-length codewords for all to-be-transmitted symbols, using of VLC can reduce a bit rate. A probability in CABAC can be determined based on the context assigned to the symbol.

In this embodiment of this application, the video encoder may perform inter prediction to reduce temporal redundancy between pictures. As described above, a CU may have one or more prediction units PUs depending on stipulation of different video compression coding and decoding standards. In other words, a plurality of PUs may belong to a CU, or the PU and the CU have a same size. In this specification, when the PU and the CU have a same size, a partition mode of the CU is no partition, or the CU is partitioned into one PU, and the PU is uniformly used for description. When the video encoder performs inter prediction, the video encoder may signal motion information for the PU to the video decoder. For example, the motion information for the PU may include: a reference picture index, a motion vector, and a prediction direction identifier. The motion vector may indicate displacement between a picture block (also referred to as a video block, a pixel block, a pixel set, or the like) of the PU and a reference block of the PU. The reference block of the PU may be a part similar to a reference picture of a picture block corresponding to the PU. The reference block may be located in a reference picture indicated by the reference picture index and the prediction direction identifier.

To reduce a quantity of coded bits required to represent the motion information for the PU, the video encoder may generate a candidate motion information list (referred to as a candidate list below) for each PU based on a process in a merge prediction mode or an advanced motion vector prediction mode. Each candidate in the candidate list for the PU may indicate one group of motion information. The motion information may include a motion vector MV and reference picture indication information. Certainly, the motion information may alternatively include one or both of the motion vector MV and the reference picture indication information. For example, when an encoder side and a decoder side agree on a reference picture together, the motion information may include only the motion vector MV. Motion information indicated by some candidates in the candidate list may be based on motion information for other PUs. If the candidate indicates motion information of one of a specified spatial candidate position (spatial candidate positions) or a temporal candidate position (temporal candidate positions), the candidate may be referred to as "original" candidate motion information in this application. For example, for a merge mode, also referred to as the merge prediction mode in this specification, there may be five original spatial candidate positions and one original temporal candidate position. In some examples, the video encoder may further generate additional or extra candidate motion information by using some means. For example, a zero motion vector is inserted as candidate motion information to generate extra candidate motion information. The extra candidate motion information is not considered as the original candidate motion information, and may be referred to as candidate motion information generated later or artificially in this application.

The technologies of this application usually include a technology for generating a candidate list on the video encoder and a technology for generating the same candidate list on the video decoder. The video encoder and the video decoder may generate the same candidate list by implementing a same technology for constructing the candidate list. For example, both the video encoder and the video decoder may construct lists including same quantities of candidates (for example, five candidates). The video encoder and the video decoder may first consider spatial candidates (for example, adjacent blocks in a same picture), then temporal candidates (for example, candidates in different pictures), and finally may consider artificially generated candidates until the expected quantity of candidates are added to the list. According to the technologies of this application, during candidate list construction, pruning operations may be performed for particular types of candidate motion information to remove repeated candidate motion information from the candidate list, while pruning operations may not be performed for other types of candidates to reduce decoder complexity. For example, for a set of spatial candidates and for a temporal candidate, a pruning operation may be performed to exclude a candidate with repeated motion information from a candidate list.

After generating the candidate list for the PU of the CU, the video encoder may select candidate motion information from the candidate list and output, in a bitstream, an index identifier indicating the selected candidate motion information. The selected candidate motion information may be motion information of a prediction block that most closely matches the PU that is being decoded. The index identifier may indicate a position of the candidate motion information selected from the candidate list. The video encoder may further generate, based on a reference block indicated by the motion information for the PU, a prediction block used for the PU. The motion information for the PU may be determined based on the selected candidate motion information. For example, in the merge mode, it is determined that the selected candidate motion information is the motion information for the PU. In the AMVP mode, the motion information for the PU may be determined based on a motion vector difference for the PU and the selected candidate motion information. The video encoder may generate one or more residual picture blocks (referred to as residual blocks) for the CU based on a predictive picture block (referred to as a prediction block) for the PU of the CU and an original picture block for the CU. Then, the video encoder may encode one or more residual blocks and output a bitstream.

The bitstream may include data used to identify the candidate motion information selected from the candidate list for the PU. The video decoder may determine the motion information for the PU based on the candidate motion information selected from the candidate list for the PU. The video decoder may identify, based on the motion information for the PU, one or more reference blocks for the PU. After identifying the one or more reference blocks for the PU, the video decoder may generate, based on the one or more reference blocks for the PU, the prediction block for the PU. The video decoder may reconstruct, based on the prediction block for the PU of the CU and the one or more residual picture blocks for the CU, a picture block for the CU.

For ease of explanation, in this application, the position or the picture block may be described as having various spatial relationships with the CU or the PU. Such descriptions may be explained as follows: The position or the picture block has various spatial relationships with the picture block associated with the CU or the PU. In addition, in this application, a PU that is being decoded by the video decoder may be referred to as a current PU, and may also be referred to as a current to-be-processed picture block; A CU that is being decoded by the video decoder may be referred to as a current CU. A picture that is being decoded by the video decoder may be referred to as a current picture. It should be understood that this application is applicable to a case in which a PU and a CU have a same size, or a case in which a PU is a CU, and a PU and a CU is uniformly represented by a PU.

As described briefly above, the video encoder 20 may use inter prediction to generate the prediction block and the motion information used for the PU of the CU. In some examples, the motion information for the PU may be the same as or similar to motion information for one or more adjacent PUs (for example, PUs whose picture blocks are spatially or temporally adjacent to the picture block corresponding to the PU). Because the adjacent PU often has similar motion information, the video encoder 20 may encode the motion information for the PU based on the motion information for the adjacent PU. Coding of the motion information for the PU based on the motion information for the adjacent PU may reduce the quantity of coded bits required in the bitstream for indicating the motion information for the PU.

The video encoder 20 may encode the motion information for the PU based on the motion information for the adjacent PU in various manners. For example, the video encoder 20 may indicate that the motion information for the PU is the same as the motion information for the adjacent PU. In this application, the merge mode may be used to indicate that the motion information for the PU is the same as or may be derived from the motion information for the adjacent PU. In another feasible implementation, the video encoder 20 may calculate a motion vector difference (Motion Vector Difference, MVD) for the PU. The MVD indicates a difference between the motion vector for the PU and a motion vector for the adjacent PU. The video encoder 20 may include the MVD instead of the motion vector for the PU in the motion information for the PU. In the bitstream, coded bits required for representing the MVD are less than coded bits required for representing the motion vector for the PU. In this application, the advanced motion vector prediction mode may be used to indicate that the decoder side is notified of the motion information for the PU by using the MVD and an index value for identifying a candidate (namely, candidate motion information).

To signal, in the merge mode or the AMVP mode, motion information for the PU to the decoder side, the video encoder 20 may generate a candidate list used for the PU. The candidate list may include one or more candidates (namely, one or more groups of candidate motion information). Each candidate in the candidate list for the PU indicates one group of motion information. One group of motion information may include a motion vector, a reference picture list, and a reference picture index corresponding to the reference picture list.

After generating the candidate list for the PU, the video encoder 20 may select one of a plurality of candidates from the candidate list for the PU. For example, the video encoder may compare each candidate with a PU being decoded and may select a candidate with a required rate-distortion cost. The video encoder 20 may output a candidate index for the PU. The candidate index may identify a position of the selected candidate in the candidate list.

In addition, the video encoder 20 may generate, based on the reference block indicated by the motion information for the PU, the prediction block for the PU. The motion information for the PU may be determined based on the candidate motion information selected from the candidate list for the PU.

When the video decoder 30 receives the bitstream, the video decoder 30 may generate a candidate list for each of the PUs of the CU. The candidate list generated by the video decoder 30 for the PU may be the same as the candidate list generated by the video encoder 20 for the PU. A syntax element obtained by parsing the bitstream may indicate the position of the candidate motion information selected from the candidate list for the PU. After generating the candidate list for the PU, the video encoder 30 may generate, based on the one or more reference blocks indicated by the motion information for the PU, a prediction block for the PU. The video decoder 30 may determine the motion information for the PU based on the candidate motion information selected from the candidate list for the PU. The video decoder 30 may reconstruct, based on the prediction block for the PU and the residual block for the CU, a picture block for the CU.

It should be understood that, in a feasible implementation, at the decoder side, construction of the candidate list is independent of parsing the bitstream to obtain the position of the selected candidate in the candidate list, and may be performed in any order or in parallel.

In another feasible implementation, at the decoder side, the bitstream is first parsed to obtain the position of the selected candidate in the candidate list, and the candidate list is constructed based on the position obtained through the parsing. In this implementation, it is not necessary to construct an entire candidate list, only a candidate list ended at the position obtained through the parsing needs to be constructed, to be specific, provided that the candidate at the position can be determined. For example, when it is obtained, by parsing the bitstream, that the selected candidate is a candidate whose index identifier is 3 in the candidate list, only a candidate list from index identifiers 0 to 3 needs to be constructed, and the candidate whose index identifier is 3 can be determined. This can achieve technical effects of reducing complexity and improving decoding efficiency.

Figure 2:
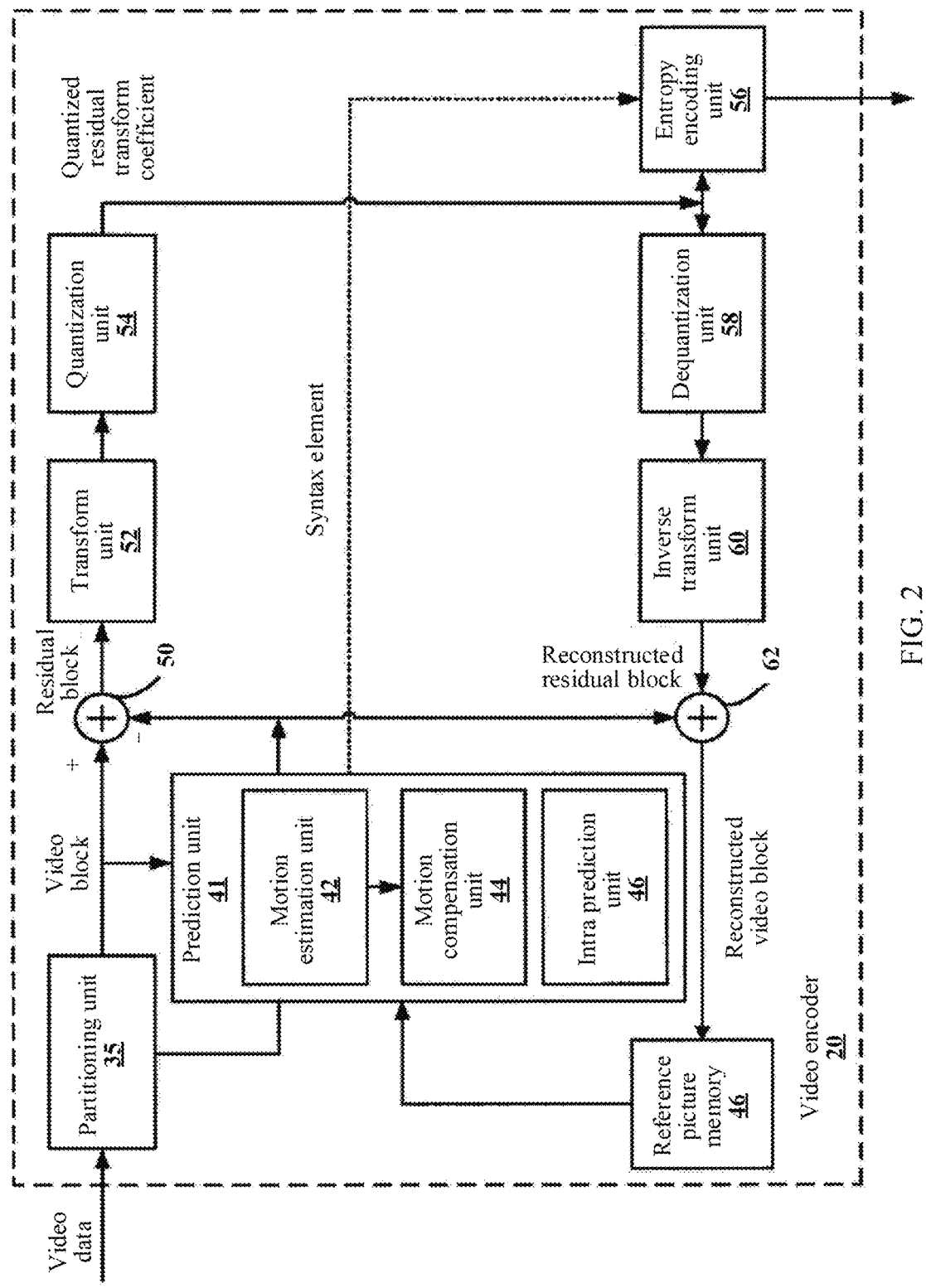
FIG. 2 is a schematic block diagram of a video encoder according to an embodiment of this application.

FIG. 2 is a schematic block diagram of a video encoder 20 according to an embodiment of this application. The video encoder 20 may perform intra decoding and inter decoding on a video block in a video slice. The intra decoding relies on spatial prediction to reduce or remove spatial redundancy of a video in a given video frame or picture. The inter-frame decoding relies on temporal prediction to reduce or remove temporal redundancy of a video in an adjacent frame or picture of a video sequence. An intra mode (I mode) may be any one of several space-based compression modes. An inter mode, such as unidirectional prediction (P mode) or bidirectional prediction (B mode), may be any one of several time-based compression modes.

In a feasible implementation of FIG. 2, the video encoder 20 includes a partitioning unit 35, a prediction unit 41, a reference picture memory 64, a summator 50, a transform processing unit 52, a quantization unit 54, and an entropy encoding unit 56. The prediction unit 41 includes an inter prediction unit (not shown) and an intra prediction unit 46. The inter prediction unit may include a motion estimation unit 42 and a motion compensation unit 44. For video block reconstruction, the video encoder 20 may further include an inverse quantization unit 58, an inverse transform unit 60, and a summator (also referred to as a reconstructor) 62. The video encoder 20 may further include a de-blocking filter (not shown in FIG. 2), to filter a block boundary, to remove blocking artifact from a reconstructed video. When necessary, the de-blocking filter usually filters output of the summator 62. In addition to the de-blocking filter, an additional loop filter (within or after a loop) may further be used.

As shown in FIG. 2, the video encoder 20 receives video data, and the partitioning unit 35 partitions the data into video blocks. Such partitioning may further include partitioning into slices, picture blocks, or other relatively large units, and (for example) video block partitioning based on quadtree structures of an LCU and a CU. For example, for the video encoder 20, components for encoding video blocks in a to-be-coded video slice are described. Usually, one slice may be partitioned into a plurality of video blocks (and may be partitioned into sets of video blocks that are referred to as picture blocks).

The prediction unit 41 may select one of a plurality of possible decoding modes, for example, one of a plurality of intra decoding modes or one of a plurality of inter decoding modes, of a current video block based on encoding quality and a cost calculation result (for example, a rate-distortion cost, RD cost). The prediction unit 41 may provide an intra decoded or inter decoded block to the summator 50 to generate residual block data, and provide the intra decoded or inter decoded block to the summator 62 to reconstruct a coded block and use the reconstructed coded block as a reference picture.

The inter prediction unit (such as the motion estimation unit 42 and the motion compensation unit 44) in the prediction unit 41 performs inter predictive decoding on the current video block relative to one or more prediction blocks of one or more reference pictures, to provide time compression. The motion estimation unit 42 is configured to determine an inter prediction mode for a video slice based on a preset mode of a video sequence. In the preset mode, the video slice in the sequence may be specified as a P slice, a B slice, or a GPB slice. The motion estimation unit 42 and the motion compensation unit 44 may be highly integrated, and are separately described herein for ease of understanding concepts. The motion estimation unit 42 performs motion estimation to generate a process of estimating a motion vector of the video block (also referred to as a picture block). For example, the motion vector may indicate displacement of a PU of the video block in a current video frame or picture relative to the prediction block in the reference picture.

A prediction block is a block in a PU that is found, based on a pixel difference, to be closely matched with a to-be-decoded video block, and the pixel difference may be determined based on a sum of absolute differences (SAD), a sum of squared differences (SSD), or other difference metrics. In some feasible implementations, the video encoder 20 may calculate a value of a sub-integer (sub-integer) pixel position of a reference picture stored in the reference picture memory 64. For example, the video encoder 20 may interpolate a value of one-fourth pixel position, one-eighth pixel position, or another fractional pixel position of the reference picture. Therefore, the motion estimation unit 42 may perform a motion search with respect to a full pixel position and a fractional pixel position, and output a motion vector with fractional pixel precision.

The motion estimation unit 42 calculates a motion vector for the PU of the video block in the inter decoded slice by comparing a position of the PU and a position of the prediction block in the reference picture. The reference picture may be selected from a first reference picture list (a list 0) or a second reference picture list (a list 1). Each list identifies one or more reference pictures stored in the reference picture memory 64. The motion estimation unit 42 sends the calculated motion vector to the entropy encoding unit 56 and the motion compensation unit 44.

Motion compensation performed by the motion compensation unit 44 may include extracting or generating of a prediction block based on the motion vector determined through motion estimation. After receiving the motion vector for the PU of the current video block, the motion compensation unit 44 may position a prediction block pointed to by the motion vector in one of the reference picture lists. The video encoder 20 subtracts a pixel value of the prediction block from a pixel value of the current video block being decoded, to obtain a residual video block, and obtain a pixel difference. The pixel difference forms block residual data, and may include a luma difference component and a chroma difference component. The summator 50 is one or more components performing the subtraction operation. The motion compensation unit 44 may further generate a syntax element associated with the video block and the video slice for a video decoder 30 to decode the video block in the video slice.

If the PU is in the B slice, a picture including the PU may be associated with the two reference picture lists referred to as the "list 0" and the "list 1". In some feasible implementations, a picture including the B slice may be associated with a list combination of the list 0 and the list 1.

In addition, if the PU is in the B slice, the motion estimation unit 42 may perform unidirectional prediction or bidirectional prediction for the PU. In some feasible implementations, bidirectional prediction is prediction respectively performed based on pictures in the reference picture lists: the list 0 and the list 1. In some other feasible implementations, bidirectional prediction is prediction respectively performed based on a reconstructed future frame and a reconstructed past frame of the current frame in a display order. When the motion estimation unit 42 performs unidirectional prediction for the PU, the motion estimation unit 42 may search the reference pictures in the list 0 or the list 1 for a reference block for the PU. Then, the motion estimation unit 42 may generate a reference frame index indicating a reference picture including the reference block in the list 0 or the list 1, and a motion vector indicating spatial displacement between the PU and the reference block. The motion estimation unit 42 may output the reference frame index, a prediction direction identifier, and the motion vector as motion information for the PU. The prediction direction identifier may indicate that the reference frame index indicates the reference picture in the list 0 or the list 1. For example, a prediction direction identifier 1 indicates the list 0, a prediction direction identifier 2 indicates the list 1, and a prediction direction identifier 3 indicates bidirectional prediction, namely, the list 0 and the list 1. The motion compensation unit 44 may generate a predictive picture block for the PU based on the reference block indicated by the motion information for the PU.

When the motion estimation unit 42 performs bidirectional prediction for the PU, the motion estimation unit 42 may search the reference pictures in the list 0 for a reference block for the PU, and may further search the reference pictures in the list 1 for another reference block for the PU. Then, the motion estimation unit 42 may generate reference indexes indicating reference pictures including the reference blocks in the list 0 and the list 1, and motion vectors indicating spatial displacement between the reference blocks and the PU. The motion estimation unit 42 may output the reference index and the motion vector for the PU as motion information for the PU. The motion compensation unit 44 may generate a predictive picture block for the PU based on the reference block indicated by the motion information for the PU.

In some feasible implementations, the motion estimation unit 42 does not output a complete set of motion information for the PU to the entropy encoding module 56. Instead, the motion estimation unit 42 may signal the motion information for the PU with reference to motion information for another PU. For example, the motion estimation unit 42 may determine that the motion information for the PU is greatly similar to motion information for an adjacent PU. In this implementation, the motion estimation unit 42 may indicate an indicator value in a syntax structure associated with the PU, and the indicator value indicates, to the video decoder 30, that the motion information for the PU is the same as or may be derived from the motion information for the adjacent PU. In another implementation, the motion estimation unit 42 may identify, from the syntax structure associated with the PU, a candidate associated with the adjacent PU and a motion vector difference (MVD). The MVD indicates a difference between the motion vector for the PU and the indicated candidate associated with the adjacent PU. The video decoder 30 may determine the motion vector for the PU by using the indicated candidate and the MVD.

As described above, the prediction unit 41 may generate a candidate list for each PU of a CU. One or more of the candidate lists may include one or more groups of original candidate motion information and one or more groups of additional candidate motion information derived from the original candidate motion information.

The intra prediction unit 46 in the prediction unit 41 may perform intra predictive decoding for a current video block relative to one or more adjacent blocks in a picture or slice that are the same as the current to-be-decoded block, to provide spatial compression. Therefore, as an alternative of inter prediction (as described above) performed by the motion estimation unit 42 and the motion compensation unit 44, the intra prediction unit 46 may perform intra prediction for the current block. Specifically, the intra prediction unit 46 may determine an intra prediction mode for encoding the current block. In some feasible implementations, the intra prediction unit 46 may (for example) use various intra prediction modes to encode the current block during encoding traversal, and the intra prediction unit 46 (or in some feasible implementations, a mode selection unit 40) may select an appropriate intra prediction mode from tested modes.

After the prediction unit 41 generates a prediction block of the current video block through inter prediction or intra prediction, the video encoder 20 subtracts the prediction block from the current video block, to obtain a residual video block. Residual video data in the residual block may be included in one or more TUs, and applied to the transform processing unit 52. The transform processing unit 52 applies transform, for example, discrete cosine transform (DCT) or other conceptually similar transform (for example, discrete sine transform DST) to transform the residual video data into residual transform coefficients. The transform processing unit 52 may transform the residual video data from a pixel domain to a transform domain (for example, a frequency domain).

The transform processing unit 52 may send the obtained transform coefficients to the quantization unit 54. The quantization unit 54 quantizes the transform coefficients to further reduce a bit rate. The quantization process can reduce a bit depth associated with some or all of the coefficients. A quantization degree may be modified by adjusting a quantization parameter. In some feasible implementations, the quantization unit 54 may then scan a matrix including the quantized transform coefficient. Alternatively, the entropy encoding unit 56 may perform the scanning.

After quantization, the entropy encoding unit 56 may entropy code the quantized transform coefficient. For example, the entropy encoding unit 56 may perform context-adaptive variable-length coding (CAVLC), context-adaptive binary arithmetic coding (CABAC), syntax-based context-adaptive binary arithmetic coding (SBAC), probability interval partitioning entropy (PIPE) coding, or another entropy coding method or technology. The entropy encoding unit 56 may further entropy code the motion vector and another syntax element of the currently decoded video slice. After being entropy coded by the entropy encoding unit 56, a coded bitstream may be transmitted to the video decoder 30 or archived for subsequent transmission or retrieval by the video decoder 30.

The entropy encoding unit 56 may encode information indicating, according to the technology in this application, the selected intra prediction mode. The video encoder 20 may include, in transmitted bitstream configuration data that may include a plurality of intra prediction mode index tables and a plurality of modified intra prediction mode index tables (also referred to as codeword mapping tables), definitions of encoding contexts of various blocks, and indications of an MPM, an intra prediction mode index table, and a modified intra prediction mode index table for each of the contexts.

The inverse quantization unit 58 and the inverse transform unit 60 respectively apply inverse quantization and inverse transform, to reconstruct a residual block in pixel domain to be subsequently used as a reference block of a reference picture. The motion compensation unit 44 may calculate the reconstructed block by summating the residual block and a prediction block of one of the reference pictures in one of the reference picture lists. The motion compensation unit 44 may also apply one or more interpolation filters to the reconstructed residual block, to calculate a sub-integer pixel value for motion estimation. The summator 62 summates the reconstructed residual block and a motion compensated prediction block generated by the motion compensation unit 44 to generate the reconstructed block, and the reconstructed block is stored in the reference picture memory 64 as the reference block. The reference block may be used by the motion estimation unit 42 and the motion compensation unit 44 as a reference block for performing inter prediction for a block in a subsequent video frame or picture.

It should be understood that other structural variants of the video encoder 20 can be used to encode a video stream. For example, for some picture blocks or picture frames, the video encoder 20 may directly quantize a residual signal without being processed by the transform unit 52, and correspondingly the residual signal does not need to be processed by the inverse transform unit 60. Alternatively, for some picture blocks or picture frames, the video encoder 20 does not generate residual data, and correspondingly does not require processing by the transform unit 52, the quantization unit 54, the inverse quantization unit 58, and the inverse transform unit 60. Alternatively, the quantization unit 54 and the dequantization unit 58 in the video encoder 20 may be combined.

Figure 3:
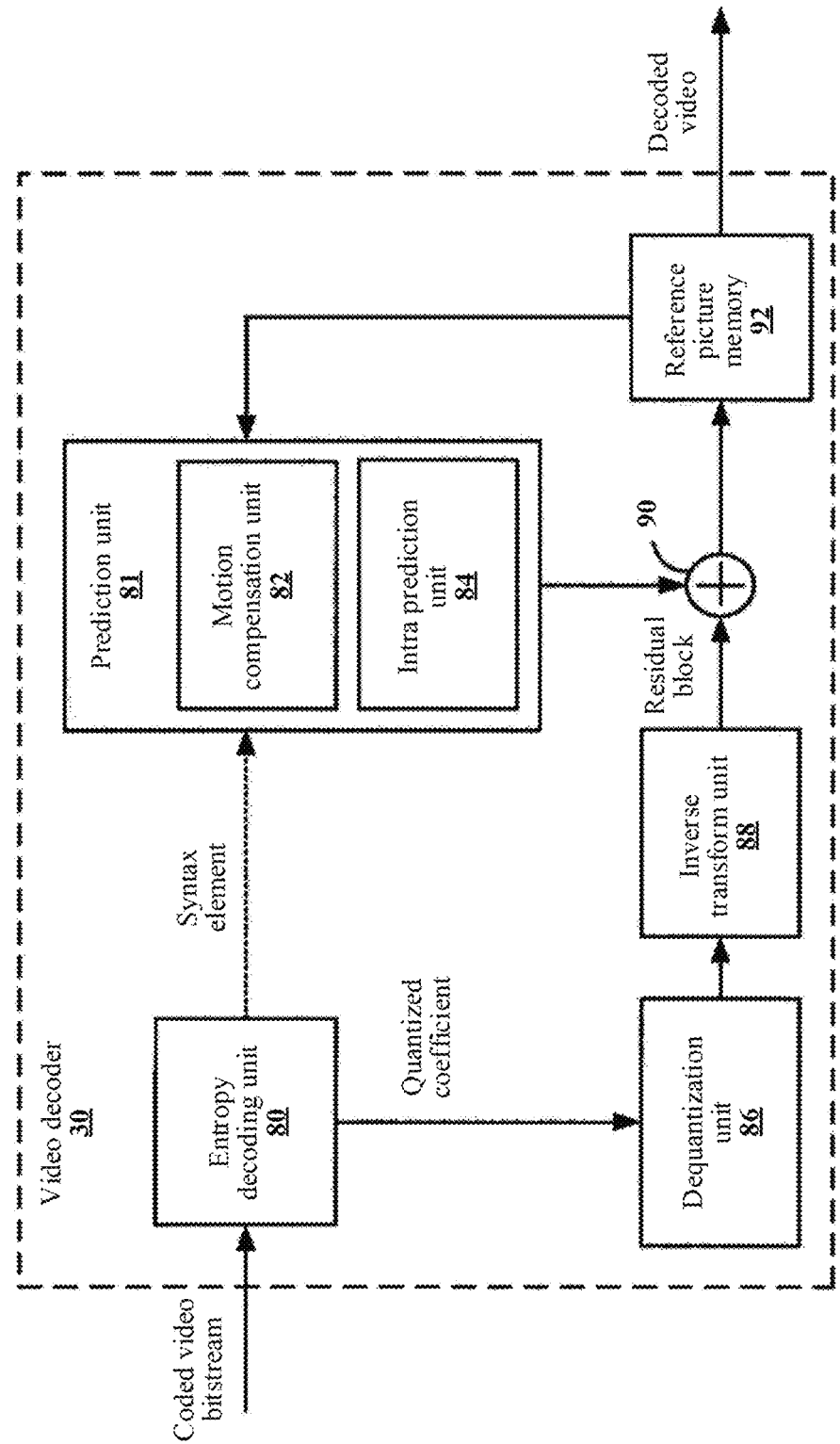
FIG. 3 is a schematic block diagram of a video decoder according to an embodiment of this application.

FIG. 3 is a schematic block diagram of the video decoder 30 according to an embodiment of this application. In a feasible implementation of FIG. 3, the video decoder 30 includes an entropy encoding unit 80, a prediction unit 81, an inverse quantization unit 86, an inverse transform unit 88, a summator 90 (namely, a reconstructor), and a reference picture memory 92. In a variant, the reference picture memory 92 may alternatively be disposed outside the video decoder 30. The prediction unit 81 includes an inter prediction unit (not shown) and an intra prediction unit 84. The inter prediction unit may be, for example, a motion compensation unit 82. In some feasible implementations, the video decoder 30 may perform an example inverse decoding procedure with respect to an encoding procedure performed by the video encoder 20 in FIG. 4A or FIG. 4B.

During decoding, the video decoder 30 receives, from the video encoder 20, a coded video bitstream indicating a video block of a coded video slice and associated syntax elements. The entropy encoding unit 80 of the video decoder 30 entropy decodes the bitstream, to generate a quantized coefficient, a motion vector, and other syntax elements. The entropy encoding unit 80 sends the motion vector and the other syntax elements to the prediction unit 81. The video decoder 30 may receive the syntax elements at a video slice level and/or a video block level.

When the video slice is decoded into an intra decoded (I) slice, the intra prediction unit 84 of the prediction unit 81 may generate prediction data of the video block of the current video slice based on a signaled intra prediction mode and data of a previously decoded block of a current frame or picture.

When the video picture is decoded into an inter decoded slice (for example, a B slice, a P slice, or a GPB slice), the motion compensation unit 82 of the prediction unit 81 generates a prediction block of the video block of the current video picture based on the motion vector and the other syntax elements that are received from the entropy encoding unit 80. The prediction block may be generated from one of reference pictures in one of reference picture lists. The video decoder 30 may use a default construction technology to construct the reference picture lists (a list 0 and a list 1) based on a reference picture stored in the reference picture memory 92.

The motion compensation unit 82 determines prediction information of the video block of the current video slice by parsing the motion vector and the other syntax elements, and uses the prediction information to generate the prediction block of the video block being decoded. For example, the motion compensation unit 82 uses some of the received syntax elements to determine a prediction mode (for example, intra prediction or inter prediction) for decoding the video block of the video slice, an inter prediction slice type (for example, a B slice, a P slice, or a GPB slice), construction information of one or more of the reference picture lists for the slice, a motion vector of each inter coded video block of the slice, an inter prediction status of each inter decoded video block of the slice, and other information for decoding the video block in the current video slice.

The motion compensation unit 82 may further perform interpolation by using an interpolation filter. The motion compensation unit 82 may use the interpolation filter used by the video encoder 20 during video block coding, to calculate an interpolation value of a sub-integer pixel of a reference block. In this application, the motion compensation unit 82 may determine, based on the received syntax elements, the interpolation filter used by the video encoder 20, and use the interpolation filter to generate the prediction block.

If a PU is encoded through inter prediction, the motion compensation unit 82 may generate a candidate list for the PU. The bitstream may include data for identifying a position of a selected candidate in the candidate list for the PU. After generating the candidate list for the PU, the motion compensation unit 82 may generate a predictive picture block for the PU based on one or more reference blocks indicated by motion information for the PU. The reference block of the PU may be in a time picture different from that of the PU. The motion compensation unit 82 may determine the motion information for the PU based on motion information selected from the candidate list for the PU.

The inverse quantization unit 86 performs inverse quantization (for example, dequantization) for a quantized transform coefficient provided in the bitstream and decoded by the entropy encoding unit 80. The inverse quantization process may include determining a quantization degree by using a quantization parameter calculated by the video encoder 20 for each video block in the video slice, and determining an inverse quantization degree to be applied. The inverse transform unit 88 applies inverse transform (for example, inverse DCT, inverse integer transform, or a conceptually similar inverse transform process) to the transform coefficient to generate a residual block in pixel domain.

After the motion compensation unit 82 generates the prediction block of the current video block based on the motion vector and the other syntax elements, the video decoder 30 summates the residual block from the inverse transform unit 88 and the corresponding prediction block generated by the motion compensation unit 82, to form the decoded video block. The summator 90 (namely, the reconstructor) is one or more components performing the summation operation. When necessary, a de-blocking filter may further be used to filter the decoded block to remove blocking artifact. Another loop filter (in a decoding loop or after a decoding loop) may further be used to smooth pixel transform, or video quality is improved in another manner. Then, the decoded video block in a given frame or picture is stored in the reference picture memory 92. The reference picture memory 92 stores a reference picture used for subsequent motion compensation. The reference picture memory 92 further stores a decoded video to be later presented on a display apparatus such as the display apparatus 32 in FIG. 1.

As described above, the technologies in this application relate to, for example, inter decoding. It should be understood that the technologies in this application may be implemented by any video decoder described in this application, and the video decoder includes (for example) the video encoder 20 and the video decoder 30 shown and described in FIG. 1 to FIG. 3. To be specific, in a feasible implementation, the prediction unit 41 described in FIG. 2 may perform a particular technology described below when inter prediction is performed during encoding on a block of video data. In another feasible implementation, the prediction unit 81 described in FIG. 3 may perform a particular technology described below when inter prediction is performed during decoding on a block of video data. Therefore, a reference to a general "video encoder" or "video decoder" may include the video encoder 20, the video decoder 30, or another video encoding unit or decoding unit.

It should be understood that other structural variants of the video decoder 30 can be used to decode the coded video bitstream. For example, for some picture blocks or picture frames, the entropy decoding unit 80 of the video decoder 30 does not decode the quantized coefficients, and correspondingly does not require processing by the inverse quantization unit 86 and the inverse transform unit 88.

Figure 4A:
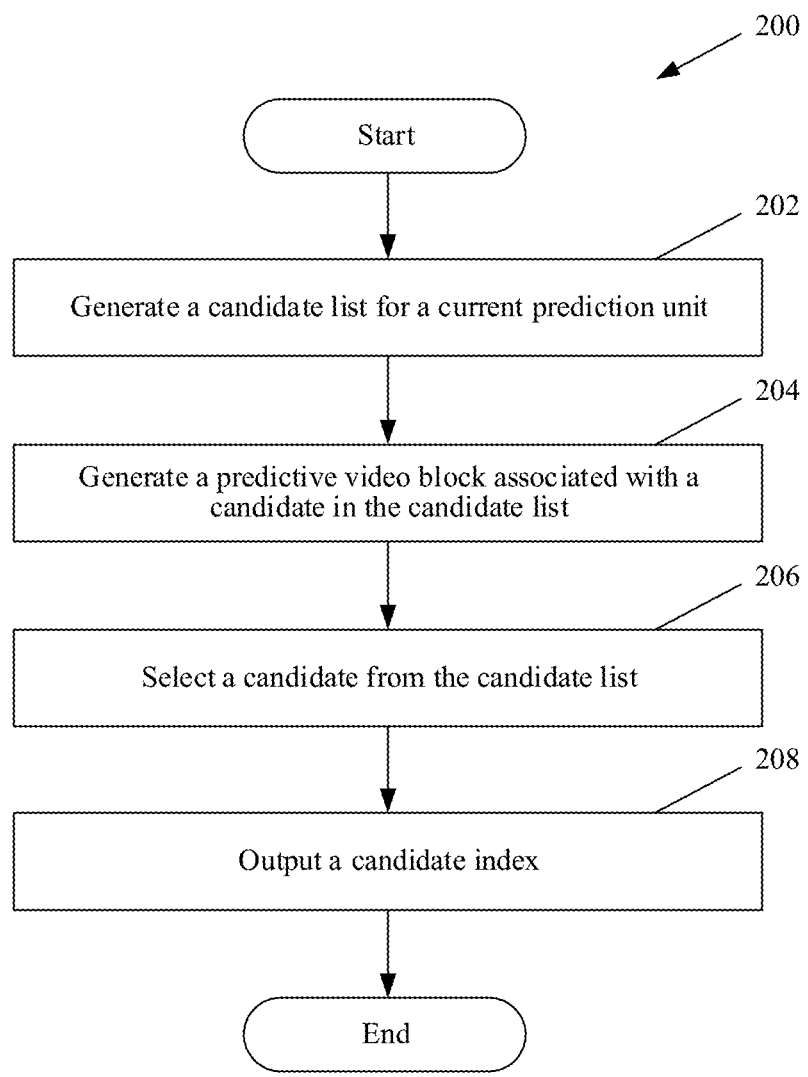
FIG. 4A is an example flowchart of an encoding method performed by a video encoder in a merge mode according to an embodiment of this application.

FIG. 4A is an example flowchart of a merge (Merge) mode according to an embodiment of this application. A video encoder (for example, the video encoder 20) may perform a merge operation 200. In another feasible implementation, the video encoder may perform a merge operation different from the merge operation 200. For example, in another feasible implementation, the video encoder may perform a merge operation, and the video encoder performs steps more or less than steps of the merge operation 200 or steps different from the steps of the merge operation 200. In another feasible implementation, the video encoder may perform the steps of merge operation 200 in different orders or in parallel. The encoder may further perform the merge operation 200 on a PU coded in a skip (skip) mode.

After the video encoder starts the merge operation 200, the video encoder may generate a candidate list for the current PU (202). The video encoder may generate a candidate list for the current PU in various manners. For example, the video encoder may generate, according to one of example technologies described below in FIG. 7 to FIG. 13, the candidate list for the current PU.

As described above, the candidate list for the current PU may include temporal candidate motion information (a temporal candidate for short). The temporal candidate motion information may indicate motion information for a corresponding time domain (co-located) PU. The co-located PU may be spatially located at a same position as the current PU in a picture frame, in a reference picture instead of a current picture. In this application, the reference picture that includes the corresponding time domain PU may be referred to as a related reference picture. In this application, a reference picture index of the related reference picture may be referred to as a related reference picture index. As described above, the current picture may be associated with one or more reference picture lists (for example, a list 0 and a list 1). The reference picture index may indicate the reference picture by indicating a position of the reference picture in a reference picture list. In some feasible implementations, the current picture may be associated with a combined reference picture list.

In some video encoders, the related reference picture index is a reference picture index that covers a PU at a reference index source position associated with the current PU. In these video encoders, the reference index source position associated with the current PU is adjacent to the left of the current PU or adjacent to the top of the current PU. In this application, if a picture block associated with a PU includes a particular position, the PU may "cover" the particular position.

However, there may be the following example: The reference index source position associated with the current PU is within a current CU. In these examples, a PU that covers the reference index source position associated with the current PU may be considered available if the PU is at the top or the left of the current CU. However, the video encoder may need to access motion information for another PU of the current CU to determine the reference picture including the co-located PU. Therefore, these video encoders may use motion information (for example, a reference picture index) for the PU of the current CU to generate a temporal candidate for the current PU. In other words, these video encoders may use the motion information for the PU belonging to the current CU to generate the temporal candidate. Therefore, the video encoder cannot generate, in parallel, candidate lists for the current PU and the PU that covers the reference index source position associated with the current PU.

According to the technologies of this application, the video encoder may explicitly set the related reference picture index without referring to a reference picture index of any other PU. In this way, the video encoder can generate, in parallel, candidate lists for the current PU and another PU of the current CU. Because the video encoder explicitly sets the related reference picture index, the related reference picture index is not based on motion information for any other PU of the current CU. In some feasible implementations in which the video encoder explicitly sets the related reference picture index, the video encoder may always set the related reference picture index to a fixed predefined preset reference picture index (for example, 0). In this manner, the video encoder may generate a temporal candidate based on motion information for a co-located PU in a reference frame indicated by the preset reference picture index, and the temporal candidate may be included in a candidate list of the current CU.

In a feasible implementation in which the video encoder explicitly sets the related reference picture index, the video encoder may explicitly signal the related reference picture index in a syntax structure (for example, a picture header, a slice header, an APS, or another syntax structure). In this feasible implementation, the video encoder may signal, to a decoder side, a related reference picture index for each LCU (namely, a CTU), a CU, a PU, a TU, or another type of sub-block. For example, the video encoder may signal that a related reference picture index for each PU of the CU is equal to "1".

In some feasible implementations, the related reference picture index may be set implicitly rather than explicitly. In these feasible implementations, the video encoder may generate, by using motion information for a PU in a reference picture indicated by a reference picture index of a PU that covers positions outside the current CU, each temporal candidate in the candidate list for the PU of the current CU, even if these positions are not strictly adjacent to the current PU.

After generating the candidate list for the current PU, the video encoder may generate a predictive picture block associated with a candidate in the candidate list (204). The video encoder may determine motion information for the current PU based on motion information of the indicated candidate and then generate a predictive picture block based on one or more reference blocks indicated by the motion information for the current PU, to generate the predictive picture block associated with the candidate. The video encoder may select one of candidates from the candidate list (206). The video encoder may select the candidate in various manners. For example, the video encoder may select one of the candidates based on analysis on a rate-distortion cost of each of predictive picture blocks associated with candidates.

After selecting the candidate, the video encoder may output an index of the candidate (208). The index may indicate a position of the selected candidate in the candidate list. In some feasible implementations, the index may be represented as "merge_idx".

Figure 4B:
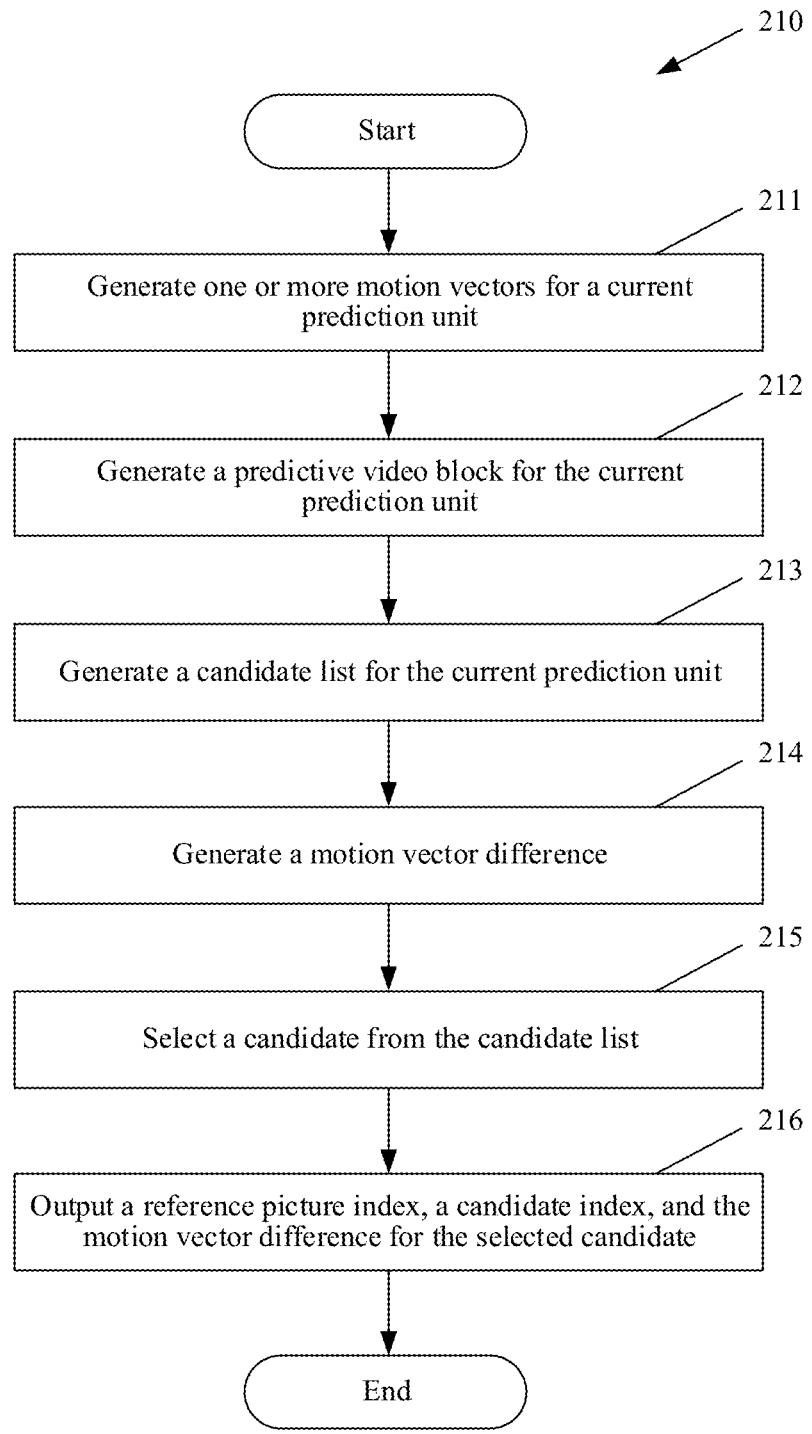
FIG. 4B is an example flowchart of an encoding method performed by a video encoder in an advanced motion vector prediction mode according to an embodiment of this application.

FIG. 4B is an example flowchart of an advanced motion vector prediction (AMVP) mode according to an embodiment of this application. A video encoder (for example, the video encoder 20) may perform an AMVP operation 210.

After the video encoder starts the AMVP operation 210, the video encoder may generate one or more motion vectors for a current PU (211). The video encoder may perform integer motion estimation and fraction motion estimation, to generate the motion vector for the current PU. As described above, a current picture may be associated with two reference picture lists (for example, a list 0 and a list 1). If unidirectional predication is performed on the current PU, the video encoder may generate a list-0 motion vector or a list-1 motion vector for the current PU. The list-0 motion vector may indicate spatial displacement between a picture block corresponding to the current PU and a reference block in a reference picture in the list 0. The list-1 motion vector may indicate spatial displacement between the picture block corresponding to the current PU and a reference block in a reference picture in the list 1. If bidirectional predication is performed on the current PU, the video encoder may generate a list-0 motion vector and a list-1 motion vector for the current PU.

After generating the one or more motion vectors for the current PU, the video encoder may generate a predictive picture block (referred to as a prediction block) for the current PU (212). The video encoder may generate, based on one or more reference blocks indicated by the one or more motion vectors for the current PU, the predictive picture block for the current PU.

In addition, the video encoder may generate a candidate list for the current PU (213). The video encoder may generate a candidate predictive motion vector list for the current PU in various manners. For example, the video encoder may generate the candidate list for the current PU according to one or more of feasible implementations described below with respect to FIG. 6A to FIG. 13. In some feasible implementations, when the video encoder generates the candidate list in the AMVP operation 210, the candidate predictive motion vector list may include two or three candidate predictive motion vectors. In contrast, when the video encoder generates the candidate predictive motion vector list in the merge operation, the candidate predictive motion vector list may include more candidate predictive motion vectors (for example, five or seven candidate predictive motion vectors).

After generating the candidate list for the current PU, the video encoder may generate one or more motion vector prediction residual values (also referred to as motion vector differences MVD) for each candidate predictive motion vector in the candidate list (214). The video encoder may determine a difference between a motion vector indicated by the candidate predictive motion vector and a corresponding motion vector for the current PU, to generate a motion vector difference for the candidate predictive motion vector.

If unidirectional predication is performed on the current PU, the video encoder may generate a single MVD for each candidate predictive motion vector. If bidirectional predication is performed on the current PU, the video encoder may generate two MVDs for each candidate predictive motion vector. A first MVD may indicate a difference between a motion vector indicated by the candidate predictive motion vector and a list-0 motion vector for the current PU. A second MVD may indicate a difference between the motion vector indicated by the candidate predictive motion vector and a list-1 motion vector for the current PU.

The video encoder may select one or more candidate predictive motion vectors from the candidate predictive motion vector list (215). The video encoder may select the one or more candidate predictive motion vectors in various manners. For example, the video encoder may select a candidate predictive motion vector matching, with a minimum error, an associated motion vector of a to-be-coded motion vector, and this can reduce a quantity of bits required for representing the motion vector difference for the candidate predictive motion vector.

After selecting the one or more candidate predictive motion vectors, the video encoder may output one or more reference picture indexes for the current PU, one or more candidate predictive motion vector indexes for the current PU, and one or more motion vector differences for the one or more selected candidate predictive motion vectors (216).

In an example in which the current picture is associated with the two reference picture lists (the list 0 and the list 1) and unidirectional prediction is performed on the current PU, the video encoder may output a reference picture index ("ref_idx_l0") for the list 0 or a reference picture index ("ref_idx_l1") for the list 1. The video encoder may further output a candidate predictive motion vector index ("mvp_l0_flag") indicating a position of the selected candidate predictive motion vector for the list-0 motion vector for the current PU in the candidate predictive motion vector list. The video encoder may alternatively output a candidate predictive motion vector index ("mvp_l1_flag") indicating a position of the selected candidate predictive motion vector for the list-1 motion vector for the current PU in the candidate predictive motion vector list. The video encoder may alternatively output an MVD for the list-0 motion vector or the list-1 motion vector for the current PU.

In an example in which the current picture is associated with the two reference picture lists (the list 0 and the list 1) and bidirectional prediction is performed on the current PU, the video encoder may output a reference picture index ("ref_idx_l0") for the list 0 and a reference picture index ("ref_idx_l1") for the list 1. The video encoder may further output a candidate predictive motion vector index ("mvp_l0_flag") indicating a position of the selected candidate predictive motion vector for the list-0 motion vector for the current PU in the candidate predictive motion vector list. The video encoder may alternatively output a candidate predictive motion vector index ("mvp_l1_flag") indicating a position of the selected candidate predictive motion vector for the list-1 motion vector for the current PU in the candidate predictive motion vector list. The video encoder may further output an MVD for the list-0 motion vector for the current PU or an MVD for the list-1 motion vector for the current PU.

Figure 5:
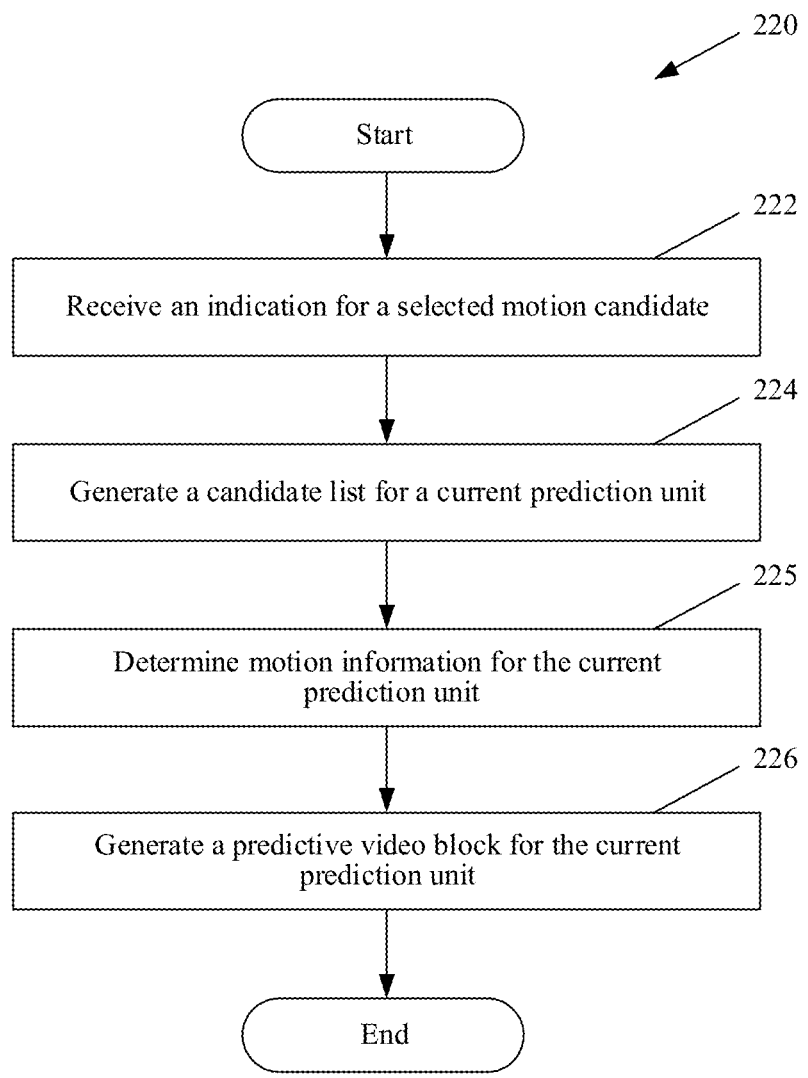
FIG. 5 is an example flowchart of motion compensation performed by a video decoder according to an embodiment of this application.

FIG. 5 is an example flowchart of motion compensation performed by a video decoder (for example, the video decoder 30) according to an embodiment of this application.

When the video decoder performs a motion compensation operation 220, the video decoder may receive an indication for a selected candidate for a current PU (222). For example, the video decoder may receive a candidate index indicating a position of the selected candidate in a candidate list for the current PU.

If motion information for the current PU is encoded in a merge mode and bidirectional prediction is performed on the current PU, the video decoder may receive a first candidate index and a second candidate index. The first candidate index indicates a position of a selected candidate of a list-0 motion vector for the current PU in the candidate list. The second candidate index indicates a position of a selected candidate of a list-1 motion vector for the current PU in the candidate list. In some feasible implementations, a single syntax element may be used to identify the two candidate indexes.

In addition, the video decoder may generate the candidate list for the current PU (224). The video decoder may generate the candidate list for the current PU in various manners. For example, the video decoder may generate the candidate list for the current PU by using technologies described below with reference to FIG. 6A, FIG. 6B to FIG. 10. When the video decoder generates a temporal candidate for the candidate list, the video decoder may explicitly or implicitly set a reference picture index for identifying a reference picture including a co-located PU, as described above with respect to FIG. 4A or FIG. 4B.

After generating the candidate list for the current PU, the video decoder may determine the motion information for the current PU based on motion information indicated by one or more selected candidates in the candidate list for the current PU (225). For example, if the motion information for the current PU is encoded in the merge mode, the motion information for the current PU may be the same as the motion information indicated by the selected candidate. If the motion information for the current PU is encoded in an AMVP mode, the video decoder may reconstruct one or more motion vectors for the current PU by using one or more motion vectors indicated by the selected candidate and one or more MVDs indicated in a bitstream. A reference picture index and a prediction direction identifier of the current PU may be the same as reference picture indexes and prediction direction identifiers of the one or more selected candidates. After determining the motion information for the current PU, the video decoder may generate, based on one or more reference blocks indicated by the motion information for the current PU, a predictive picture block for the current PU (226).

Figure 6A:
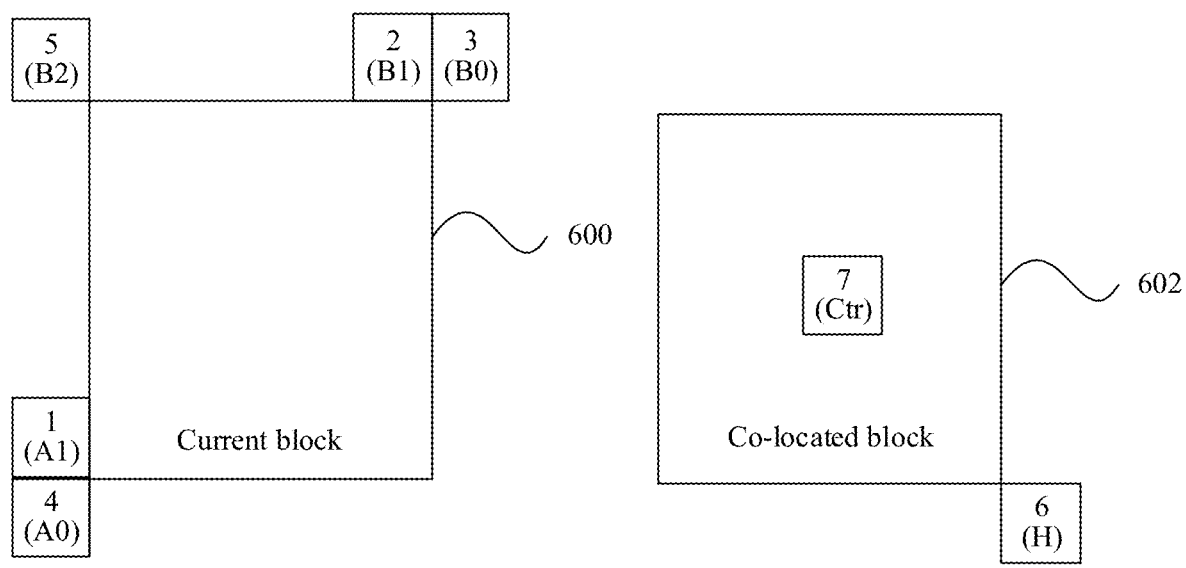
FIG. 6A and FIG. 6B each are an example schematic diagram of an encoding unit and a space domain reference block and a time domain reference block that are associated with the encoding unit according to an embodiment of this application.

FIG. 6A is an example schematic diagram of a coding unit (CU), a space domain adjacent picture block associated with the CU, and a time domain adjacent picture block associated with the CU according to an embodiment of this application.

FIG. 6A is a schematic diagram of a CU 600 and schematic candidate positions 1 to 10 associated with the CU 600. Candidate positions 1 to 5 indicate spatial candidates in a same picture as the CU 600. The candidate position 1 is located on the left of the CU 600. The candidate position 2 is located above the CU 600. The candidate position 3 is located on the upper right of the CU 600. The candidate position 4 is located on the lower left of the CU 600. The candidate position 5 is located on the upper left of the CU 600. Candidate positions 6 and 7 indicate temporal candidates associated with a co-located block 602 of the CU 600, and the co-located block is a picture block whose size, shape, and coordinates are the same as those of the CU 600 in a reference picture (namely, an adjacent coded picture). The candidate position 6 is located at the lower right corner of the co-located block 602. The candidate position 7 is located in the lower-right middle position of the co-located block 602, or in the upper left middle position of the co-located block 602. FIG. 6A is a schematic implementation of a candidate position that is provided to an inter prediction module (for example, specifically the motion estimation unit 42 or the motion compensation unit 82) to generate a candidate list. The candidate positions 1 to 5 in FIG. 6A are schematic implementations of a candidate position that is provided to an intra prediction module to generate a candidate list.

Figure 6B:
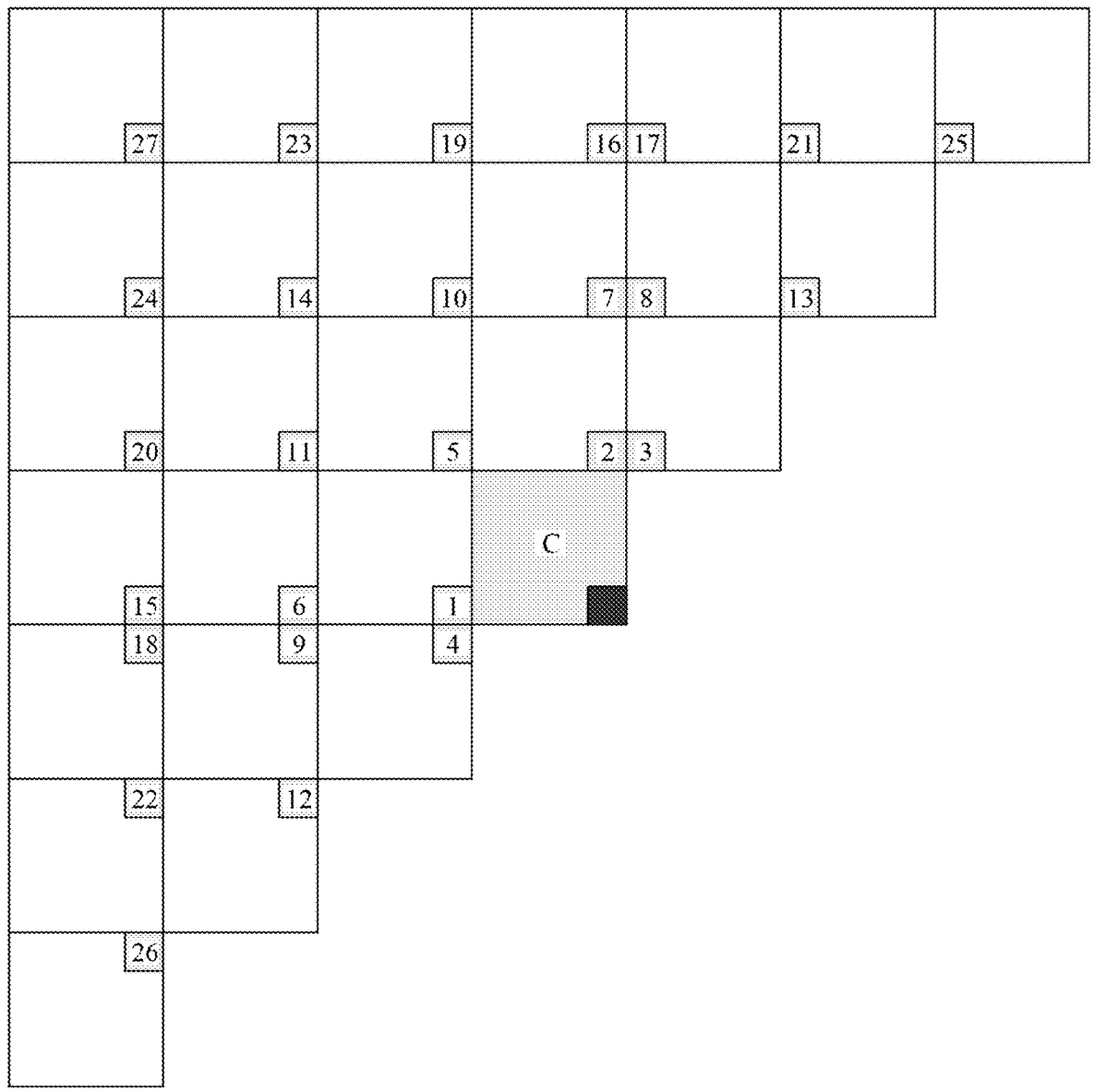

It should be noted that the spatial candidate position and the temporal candidate position in FIG. 6A are merely examples, and the candidate positions include but are not limited to the foregoing examples. In some feasible implementations, the spatial candidate position may further include, for example, a position that is within a preset distance from a to-be-processed picture block but is not adjacent to the to-be-processed picture block. For example, this type of position may be shown in 6 to 27 in FIG. 6B. It should be understood that FIG. 6B is an example schematic diagram of a coding unit and a space domain adjacent picture block associated with the coding unit according to an embodiment of this application. A position of a picture block that is located in a same picture frame as the to-be-processed picture block, that has been reconstructed when the to-be-processed picture block is processed, and that is not adjacent to the to-be-processed picture block also falls within a range of the spatial candidate position. Herein, such positions are referred to as space domain non-adjacent picture blocks. It should be understood that the spatial candidate may be selected from one or more positions shown in FIG. 6B.

Figure 6C:
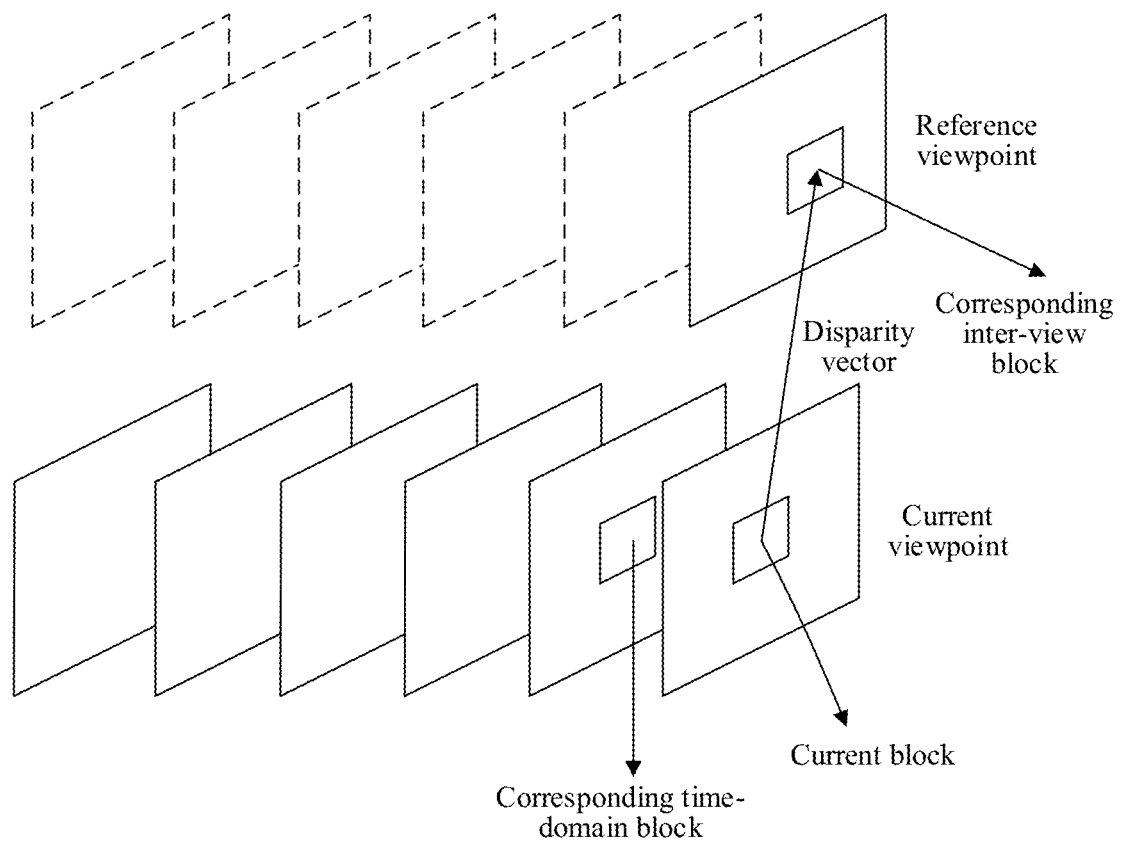
FIG. 6C is an example schematic diagram of an encoding unit and a corresponding inter-view block associated with the encoding unit according to an embodiment of this application.

In some feasible implementations, the candidate position may alternatively be, for example, selected from one or more positions shown in FIG. 6C, for example, an inter-view reference block shown in FIG. 6C.

A method for predicting motion information of a picture block in the embodiments of this application is not only applicable to a merge (Merge) prediction mode and/or an advanced motion vector prediction (advanced motion vector prediction, AMVP) mode, but also applicable to another mode in which motion information of a current picture block is predicted by using motion information of a space domain reference block, a time domain reference block and/or an inter-view reference block, thereby improving encoding and decoding performance.

Figure 7:
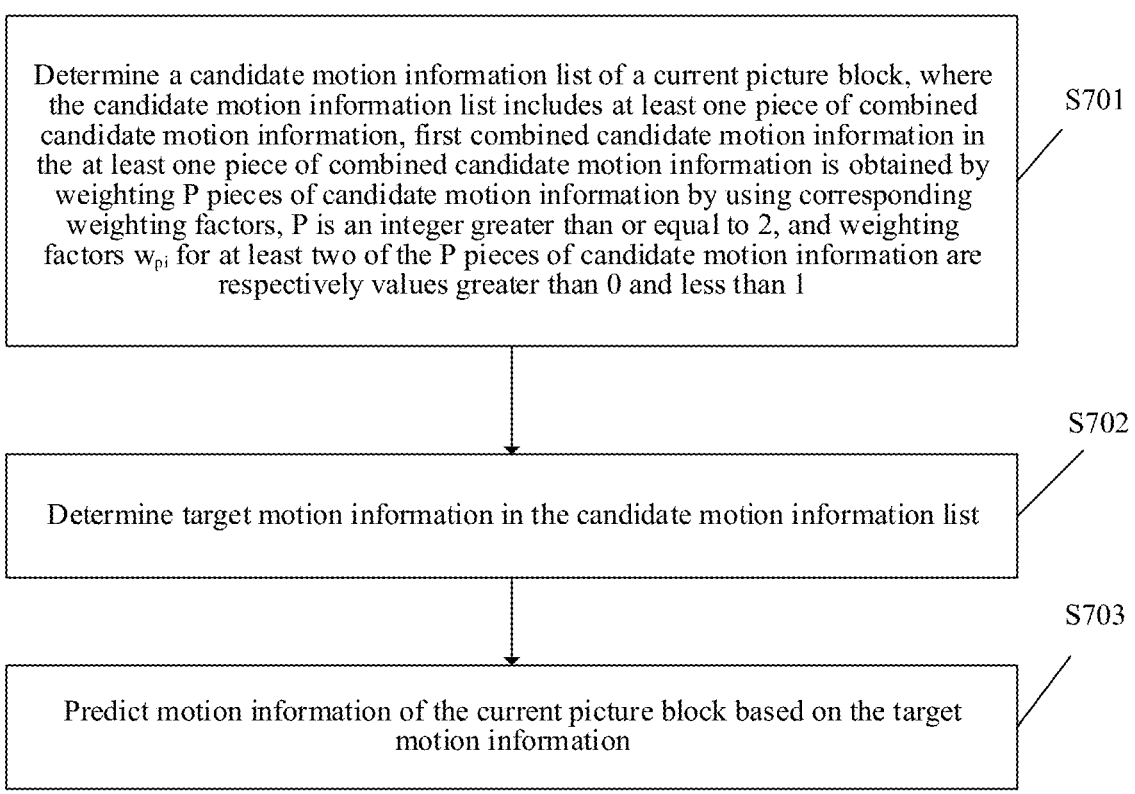
FIG. 7 is a flowchart of a method for predicting motion information of a picture block according to an embodiment of this application.

FIG. 7 is an example flowchart of a method for predicting motion information of a picture block according to an embodiment of this application. The method is used for intra prediction or inter prediction. The method may be performed by a video encoder (for example, the video encoder 20), a video decoder (for example, the video decoder 30), or an electronic device (for example, a device 1500) having a video encoding and decoding function. The method may include the following steps.

S701: Determine/construct a candidate motion information list of a current picture block, where the candidate motion information list includes at least one piece of combined candidate motion information, first combined candidate motion information in the at least one piece of combined candidate motion information is obtained by weighting P pieces of candidate motion information (which may also be referred to as P groups of candidate predictive motion information) by using corresponding weighting factors, P is an integer greater than or equal to 2, weighting factors $w_{pi}$ for at least two of the P pieces of candidate motion information are respectively values greater than 0 and less than 1, and a sum of the weighting factors for the P pieces of candidate motion information is 1.

S702: Determine target motion information in the candidate motion information list.

S703: Predict motion information of the current picture block based on the target motion information.

It should be noted that, in this embodiment of this application, the P pieces of candidate motion information on which weighting processing is performed (or weighting is to be performed) may be P pieces of original candidate motion information that are previously obtained, or P pieces of non-original candidate motion information that are previously obtained, or P pieces of candidate motion information that are previously obtained and that include original candidate motion information and non-original candidate motion information, or P pieces of candidate motion information that have been placed in the candidate motion information list, or P pieces of candidate motion information that are before being placed in the candidate motion information list. This is not limited in this embodiment of this application. The following uses an example for description with reference to FIG. 12, and details are not described herein again.

In some feasible implementations, the at least one piece of combined candidate motion information further includes second combined candidate motion information, the second combined candidate motion information is obtained by weighting M pieces of candidate motion information by using corresponding weighting factors, M is an integer greater than or equal to 2, weighting factors $w_{mi}$ for at least two of the M pieces of candidate motion information are respectively values greater than 0 and less than 1, at least one of the P pieces of candidate motion information is different from at least one of the M pieces of candidate motion information, and a sum of the weighting factors for the M pieces of candidate motion information is 1.

In an example, if there are four original merge candidates, there are six combinations of the combined candidate motion information (referred to as a combined weighted merge candidate below) provided in this application. The six combinations are described as follows:

Merge_idx0[6]={0, 0, 1, 0, 1, 2}; and
Merge_idx1[6]={1, 2, 2, 3, 3, 3}.

0, 1, 2, and 3 indicate index numbers of the original merge candidates in the candidate motion information list (candidate list). For example, 0 indicates a candidate at an index position 0 in the candidate list. Correspondingly, a first combination is a combination of a candidate motion vector corresponding to the merge index number 0 and a candidate motion vector corresponding to the merge index number 1, to be specific, a combined weighted merge candidate is obtained by weighting the candidate motion vector corresponding to the merge index number 0 and the candidate motion vector corresponding to the merge index number 1. A second combination is a combination of the candidate motion vector corresponding to the merge index number 0 and a candidate motion vector corresponding to the merge index number 2, to be specific, another combined weighted predictive merge candidate is obtained by weighting the candidate motion vector corresponding to the merge index number 0 and the candidate motion vector corresponding to the merge index number 2. The other four combined weighted predictive merge candidates are not listed herein.

In some feasible implementations, the first combined candidate motion information includes: weighted values of $P_1$ candidate motion vectors that are in the P pieces of candidate motion information and that correspond to a first reference list, and/or weighted values of $P_2$ candidate motion vectors that are in the P pieces of candidate motion information and that correspond to a second reference list, where $1<P_1 \leq P$, $1<P_2 \leq P$, $P_1$ or $P_2$ is an integer greater than or equal to 2, weighting factors $w_{pi}$ for at least two of $P_1$ or $P_2$ candidate motion vectors are respectively values greater than 0 and less than 1, a sum of weighting factors for the $P_1$ candidate motion vectors is 1, and a sum of weighting factors for the $P_2$ candidate motion vectors is 1

The second combined candidate motion information includes: weighted values of $M_1$ candidate motion vectors that are in the M pieces of candidate motion information and that correspond to the first reference list, and/or weighted values of $M_2$ candidate motion vectors that are in the M pieces of candidate motion information and that correspond to the second reference list, where $1<M_1 \leq M$, $1<M_2 \leq M$, $M_1$ or $M_2$ is an integer greater than or equal to 2, weighting factors $w_{mi}$ for at least two of $M_1$ or $M_2$ candidate motion vectors are respectively values greater than 0 and less than 1, a sum of weighting factors for the $M_1$ candidate motion vectors is 1, and a sum of weighting factors for the $M_2$ candidate motion vectors is 1

In some feasible implementations, the P pieces of candidate motion information include first candidate motion information corresponding to a first index identifier and second candidate motion information corresponding to a second index identifier, the first index identifier (also referred to as a first index value) is less than the second index identifier (also referred to as a second index value), and correspondingly a weighting factor for the first candidate motion information is greater than or equal to a weighting factor for the second candidate motion information. For example, for the first combination mentioned above, namely, the combination of the merge index numbers 0 and 1, weighting factors (weights) for motion vectors of the corresponding merge candidates are {⅔, ⅓}. If the weighting factors for all the P pieces of candidate motion information are the same, and the sum of the weighting factors for the P pieces of candidate motion information is 1, that the P pieces of candidate motion information are weighted to obtain the first combined candidate motion information may be understood as that an average value of the P pieces of candidate motion information is calculated to obtain the first combined candidate motion information.

In some feasible implementations, the M pieces of candidate motion information include third candidate motion information corresponding to a third index identifier and fourth candidate motion information corresponding to a fourth index identifier, the third index identifier is less than the fourth index identifier, and correspondingly a weighting factor for the third candidate motion information is greater than or equal to a weighting factor for the fourth candidate motion information. If the weighting factors for all the M pieces of candidate motion information are the same, and the sum of the weighting factors for the M pieces of candidate motion information is 1, that the M pieces of candidate motion information are weighted to obtain the second combined candidate motion information may be understood as that an average value of the M pieces of candidate motion information is calculated to obtain the second combined candidate motion information.

In various embodiments of this application, the P pieces of candidate motion information used for weighting processing have a plurality of forms. For example, the P pieces of candidate motion information are P pieces of original candidate motion information; or the P pieces of candidate motion information are (P−X) pieces of original candidate motion information and X pieces of non-original candidate motion information, where X is a positive integer less than or equal to P.

In various embodiments of this application, the M pieces of candidate motion information used for weighting processing have a plurality of forms. For example, the M pieces of candidate motion information are M pieces of original candidate motion information; or the M pieces of candidate motion information are (M−Y) pieces of original candidate motion information and Y pieces of non-original candidate motion information, where Y is a positive integer less than or equal to M.

In various embodiments of this application, the original candidate motion information includes motion information of one or more space domain reference blocks of the current picture block, motion information of one or more time domain reference blocks of the current picture block, and/or motion information of one or more inter-view reference blocks of the current picture block; and the non-original candidate motion information includes scaled candidate motion information, the first combined candidate motion information, the second combined candidate motion information, combined bi-predictive candidate motion information, and/or zero motion information, where each scaled candidate motion information includes a motion vector that points to a first target reference frame and that is in the first reference list, and/or a motion vector that points to a second target reference frame and that is in the second reference list.

Figure 8A:
FIG. 8A is an example schematic diagram of adding combined candidate motion information to a merge mode candidate list according to an embodiment of this application.

FIG. 8A is an example schematic diagram of adding combined candidate information to a merge mode candidate list according to an embodiment of this application. Three candidates whose Merge_idx are 0, 1, and 2 are original merge candidate motion information, and three candidates whose Merge_idx is 3, 4, and 5 are added combined merge candidate motion information (referred to as combined average merge candidates below) provided in this application.

For each reference list (L0 or L1), an average value of motion vectors of two original merge candidates in a reference list is a motion vector of the combined average merge candidate in the reference list. If the two original merge candidates have only one motion vector in the reference list, the motion vector is the motion vector of the combined average merge candidate in the reference list. Otherwise, an average value of the two motion vectors needs to be calculated.

FIG. 8B is another example schematic diagram of adding combined candidate motion information to a merge mode candidate list according to an embodiment of this application. Three candidates whose Merge_idx are 0, 1, and 2 are original merge candidate motion information, and three candidates whose Merge_idx is 3, 4, and 5 are added combined merge candidate motion information (referred to as combined average merge candidates below) provided in this application. Different from FIG. 8A, before averaging is performed, scaling processing is first performed on motion vectors mvL0_A of some original merge candidates (for example, mvL0_A, ref0') in a reference list (for example, L0), to obtain a motion vector (mvL0_A') that points to a target reference frame (for example, ref0).

Figure 9:
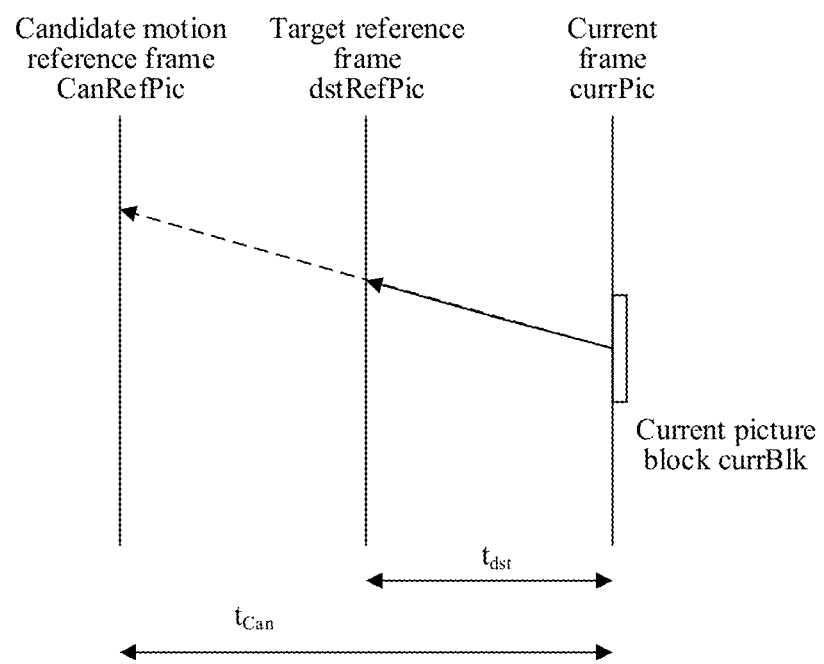
FIG. 9 is an example schematic diagram of scaling processing according to an embodiment of this application.

Referring to FIG. 9, the scaled candidate motion information is obtained by using the following method:

determining the first target reference frame (for example, ref0) that is of the current picture block and that corresponds to the first reference list (for example, L0) and/or the second target reference frame (for example, L1) that is of the current picture block and that corresponds to the second reference list (for example, ref1), where the first target reference frame is a reference frame that corresponds to the first reference list and that is of most frequently used candidate motion information in the candidate motion information list, or a reference frame that corresponds to the first reference list and that is of candidate motion information having a smallest index identifier in the candidate motion information list; alternatively, the second target reference frame is a reference frame that corresponds to the second reference list and that is of most frequently used candidate motion information in the candidate motion information list, or a reference frame that corresponds to the second reference list and that is of candidate motion information having a smallest index identifier in the candidate motion information list;

determining whether a reference picture that is included in particular candidate motion information (for example, the candidate motion information whose index position is 0 in FIG. 8B) and that corresponds to the first reference list is the same as the first target reference frame, and/or whether a reference picture that is included in particular candidate motion information and that corresponds to the second reference list is the same as the second target reference frame; and if the reference picture that is included in the candidate motion information and that corresponds to the first reference list is different from the first target reference frame, scaling, based on a time domain distance or an inter-view distance, the motion vector (for example, mvL0_A in FIG. 8B) that is included in the candidate motion information and that corresponds to the first reference picture list, to obtain the motion vector (for example, mvL0_A' in FIG. 8B) that points to the first target reference frame; and/or if the reference picture that is included in the candidate motion information and that corresponds to the second reference list is different from the second target reference frame, scaling, based on a time domain distance or an inter-view distance, the motion vector (for example, mvL1_A in FIG. 8B) that is included in the candidate motion information and that corresponds to the second reference picture list, to obtain the motion vector (for example, FIG. 8B mvL1_A') that points to the second target reference frame, so that the scaled candidate motion information (for example, mvL0_A', ref0; mvL1_A', ref1 in FIG. 8B) is obtained.

The candidate motion information mentioned herein may be one of the P pieces of candidate motion information or the M pieces of candidate motion information mentioned above. This is not limited in this application.

As shown in FIG. 9, if to-be-scaled candidate motion information is motion information in a time domain direction, scaling processing based on a time domain distance may be described as follows:

$$MV_{dst} = t_{dst} * MV_{Can} / t_{Can}$$

$$t_{dst} = currPicPOC - dstRefPicPOC$$

$$t_{Can} = currPicPOC - CanRefPicPOC$$

$MV_{dst}$ represents a scaled motion vector, $MV_{Can}$ represents a motion vector included in the to-be-scaled candidate motion information, $t_{dst}$ represents a picture order count (picture order count, POC) distance between a current frame and a target reference frame, and $t_{Can}$ represents a POC distance between the current frame and a reference frame corresponding to a reference frame index included in the candidate motion information.

Referring to FIG. 9, if to-be-scaled candidate motion information is motion information in an inter-view direction, scaling processing based on an inter-view distance may be described as follows:

$$MV_{dst} = t_{dst} * MV_{Can} / t_{Can}$$

$$t_{dst} = currPicVOI - dstRefPicVOI$$

$$t_{Can} = currPicVOI - CanRefPicVOI$$

$MV_{dst}$ represents a scaled motion vector, $MV_{Can}$ represents a motion vector included in the to-be-scaled candidate motion information, $t_{dst}$ represents a view order index (view order index, VOI) distance between a current frame and a target reference frame, and $t_{Can}$ represents a VOI distance between the current frame and a reference frame corresponding to a reference frame index included in the candidate motion information.

Figures 10, 11:
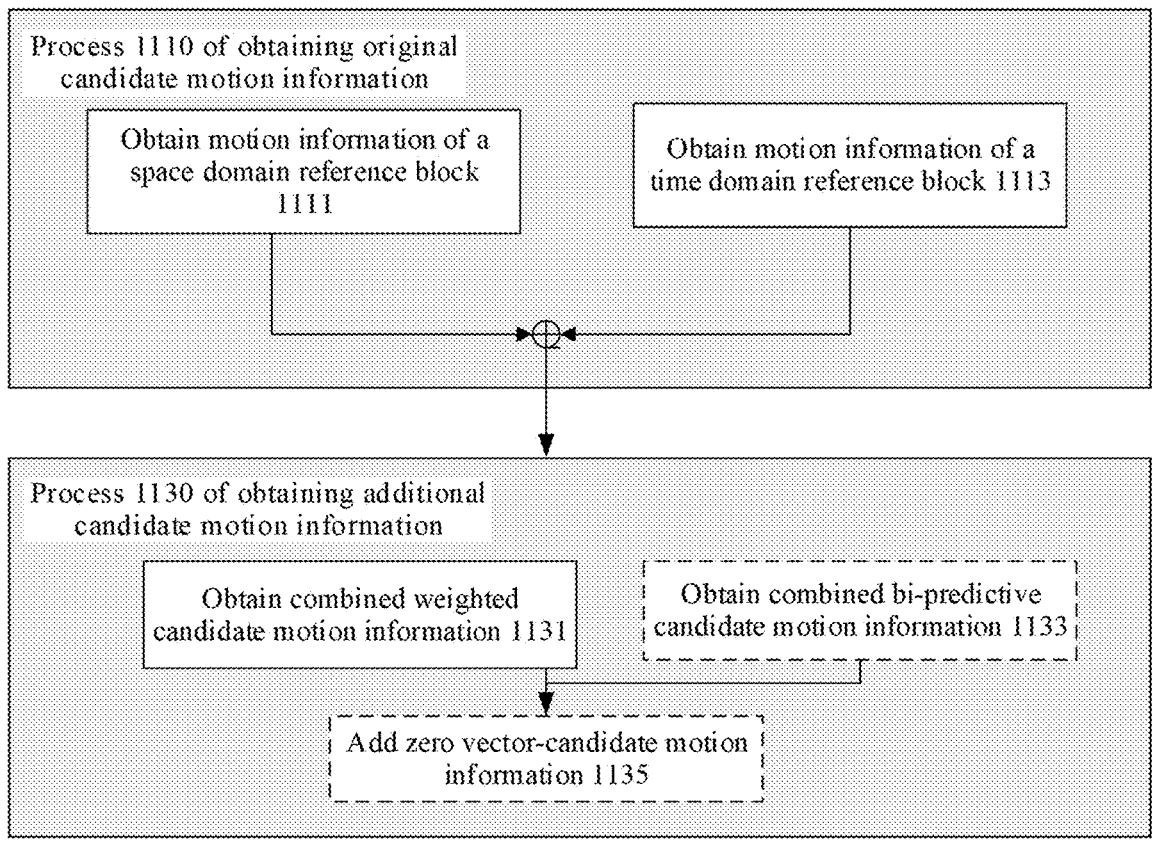
FIG. 10 is an example schematic diagram of adding combined candidate motion information to an AMVP mode candidate list according to an embodiment of this application.
FIG. 11 is an example flowchart of constructing a candidate predictive motion vector list according to an embodiment of this application.

FIG. 10 is an example schematic diagram of adding combined candidate motion information to an AMVP mode candidate list according to an embodiment of this application. Specifically, a reference frame index Ref of a reference list L0 is used as an example for description. It is assumed that a maximum quantity of candidates in the AMVP candidate list is 4. If original candidate motion information does not fill the AMVP candidate list, the combined candidate motion information provided in this application may be added after the original candidate motion information. If the AMVP candidate list is still not filled, a zero motion vector is added. Two candidates whose Merge_idx are 0 and 1 are original AMVP candidate motion information, and a candidate whose Merge_idx is 2 is added combined AMVP candidate motion information (also referred to as a combined average AMVP candidate) provided in this application, and a candidate whose Merge_idx is 3 is an added zero motion vector.

It can be learned that in the method for predicting motion information of a picture block in this embodiment of this application, one or more pieces of combined candidate motion information can be constructed by weighting a plurality of pieces of candidate motion information, so that more candidate motion information used for reference can be found as much as possible, thereby enriching candidate motion information, and reducing or avoiding, to some extent, padding of the candidate motion information list with zero vector candidate motion information. This improves motion vector prediction accuracy to some extent, thereby improving encoding and decoding performance.

FIG. 11 is an example flowchart of a method for constructing a merge candidate list according to an embodiment of this application. As shown in FIG. 11, the combined candidate motion information (also referred to as combined weight merge candidate or combined average merge candidate) provided in this application may be placed after all original candidate motion information or some original candidate motion information, to replace or be compatible with a combined bi-predictive merge candidate motion vector (combined bi-predictive merge candidate) or a zero motion vector, or serve as another additional candidate predictive motion vector other than an original candidate predictive motion vector. A process 1100 may be performed by the video encoder 20 or the video decoder 30, and for example, may be performed by an inter prediction unit of the video encoder 20 or an inter prediction unit of the video decoder 30. In the video encoder 20, for example, the inter prediction unit may include a motion estimation unit 42 and a motion compensation unit 44. In the video decoder 30, for example, the inter prediction unit may include a motion compensation unit 82. The inter prediction unit may generate a candidate motion information list for a PU. The candidate motion information list may include one or more pieces of original candidate motion information and one or more pieces of additional candidate motion information derived from the original candidate motion information. In other words, the process 1100 may include a process 1110 for obtaining the original candidate motion information and a process 1130 for obtaining the additional candidate motion information. The process 1100 is described as a series of steps or operations. It should be understood that the process 1100 may be performed in various orders and/or at the same time, which is not limited to an execution sequence shown in FIG. 11. It is assumed that a video encoder or a video decoder is being used for a video data stream having a plurality of video frames, to perform the process 1100 including the following steps, to construct a candidate motion information list of a current picture block of a current video frame.

Step 1111: Detect one or more space domain reference blocks of the current picture block in a first preset order, to obtain Q pieces of original candidate motion information in a candidate list of a to-be-processed picture block (or obtain Q pieces of original candidate motion information used to construct a candidate list of a to-be-processed picture block), where Q is an integer greater than or equal to 0.

It should be understood that the detection herein may include an "available" check process mentioned elsewhere in this specification, or the detection herein may include an "available" check process and a pruning (for example, redundancy removal) process mentioned elsewhere in this specification. Details are not described again.

Referring to FIG. 6A and FIG. 6B, the one or more space domain reference blocks of the current picture block include: one or more space domain reference blocks that are in a picture in which the current picture block is located and that are adjacent to the current picture block, and/or one or more space domain reference blocks that are in a picture in which the current picture block is located and that are not adjacent to the current picture block. As shown in FIG. 6A, the one or more space domain reference blocks that are in the picture in which the current picture block is located and that are adjacent to the current picture block may include a fourth space domain adjacent block A0 located on the lower left side of the current picture block, a first space domain adjacent block A1 located on the left side of the current picture block, a third space domain adjacent block B0 located on the upper right side of the current picture block, a second space domain adjacent block B1 located on the upper side of the current picture block, or a fifth space domain adjacent block B2 located on the upper left side of the current picture block. As shown in FIG. 6B, the one or more space domain reference blocks that are in the picture in which the current picture block is located and that are not adjacent to the to-be-processed picture block may include a first space domain non-adjacent picture block, a second space domain non-adjacent picture block, a third space domain non-adjacent picture block, and the like.

In an implementation, in step 1111, whether the first space domain adjacent block A1, the second space domain adjacent block B1, the third space domain adjacent block B0, the fourth space domain adjacent block A0, and the fifth space domain adjacent block B2 are available is sequentially detected, to obtain motion information of Q1 determined motion vector picture blocks in the first space domain adjacent block A1, the second space domain adjacent block B1, the third space domain adjacent block B0, the fourth space domain adjacent block A0, and the fifth space domain adjacent block B2, where Q1 is an integer greater than or equal to 0; and adding, to the candidate list, Q groups of motion information in the motion information of the Q1 determined motion vector picture blocks that is obtained through detection as candidate motion information, where Q1 is greater than or equal to Q.

A detection condition of the fifth space domain adjacent block B2 includes: When any one of the first space domain adjacent block A1, the second space domain adjacent block B1, the third space domain adjacent block B0, and the fourth space domain adjacent block A0 is unavailable, the fifth space domain adjacent block B2 is detected.

Step 1113: Detect one or more time domain reference blocks of the current picture block in a second preset order (for example, 6 to 7 in the figure), to obtain S pieces of original candidate motion information in the candidate list of the to-be-processed picture block (or obtain S pieces of original candidate motion information used to construct the candidate list of the to-be-processed picture block), where S is an integer greater than or equal to 0.

Referring to FIG. 6A, the one or more time domain reference blocks of the current picture block may be understood as a picture block in a co-located block of the current picture block or a space domain adjacent block of a co-located block of the current picture block. For example, the time domain reference block may include a lower-right space domain adjacent block H of a co-located block (co-located block) of the current picture block, an upper-left middle block of the co-located block, or a lower-right middle block Ctr of the co-located block. The co-located block is a picture block that is in a reference picture and whose size, shape, and coordinates are the same as those of the current picture block, or the co-located block is a picture block that is in the reference picture, that deviates from a specified position of the current picture block by an offset, and whose size and shape are the same as those of the current picture block.

Step 1131: When a quantity of pieces of candidate motion information in the candidate list of the to-be-processed picture block is less than a target quantity, obtain T pieces of combined candidate motion information, where first combined candidate motion information in the T combined candidate motion information is obtained by weighting, by using corresponding weighting factors, P pieces candidate motion information that are previously obtained, P is an integer greater than or equal to 2, weighting factors $w_{pi}$ for at least two of the P pieces of candidate motion information are respectively values greater than 0 and less than 1, and a sum of the weighting factors for the P pieces of candidate motion information is 1, so that the T pieces of newly constructed combined candidate motion information in the candidate list of the current picture block are obtained, where T is an integer greater than or equal to 1. Preferably, the weighting factor $w_{pi}$ for each of the P pieces of candidate motion information may be a value greater than 0 and less than 1.

The target quantity is a preset maximum quantity of pieces of candidate motion information in the candidate list of the current picture block; or the target quantity is a quantity of pieces of candidate motion information determined by using an index identifier obtained by parsing a bitstream.

It should be understood that the P pieces of candidate motion information may be P pieces of original candidate motion information obtained in, for example, the process 1110. Alternatively, the P pieces of candidate motion information may be (P-X) pieces of original candidate motion information and X pieces of non-original candidate motion information (for example, previously obtained combined candidate motion information), where X is a positive integer less than or equal to P.

Optionally, in this embodiment of the present invention, the method may further include:

Step 1133: When a quantity of pieces of candidate motion information in the candidate list of the to-be-processed picture block is less than a target quantity, combine two groups of unidirectional predictive type-original candidate motion information that are included in the candidate list, to obtain combined bi-predictive candidate motion information in the candidate list of the to-be-processed picture block.

It should be noted that step 1133 may be performed before step 1131, or may be performed after step 1131. This is not limited in this application.

Figure 12:
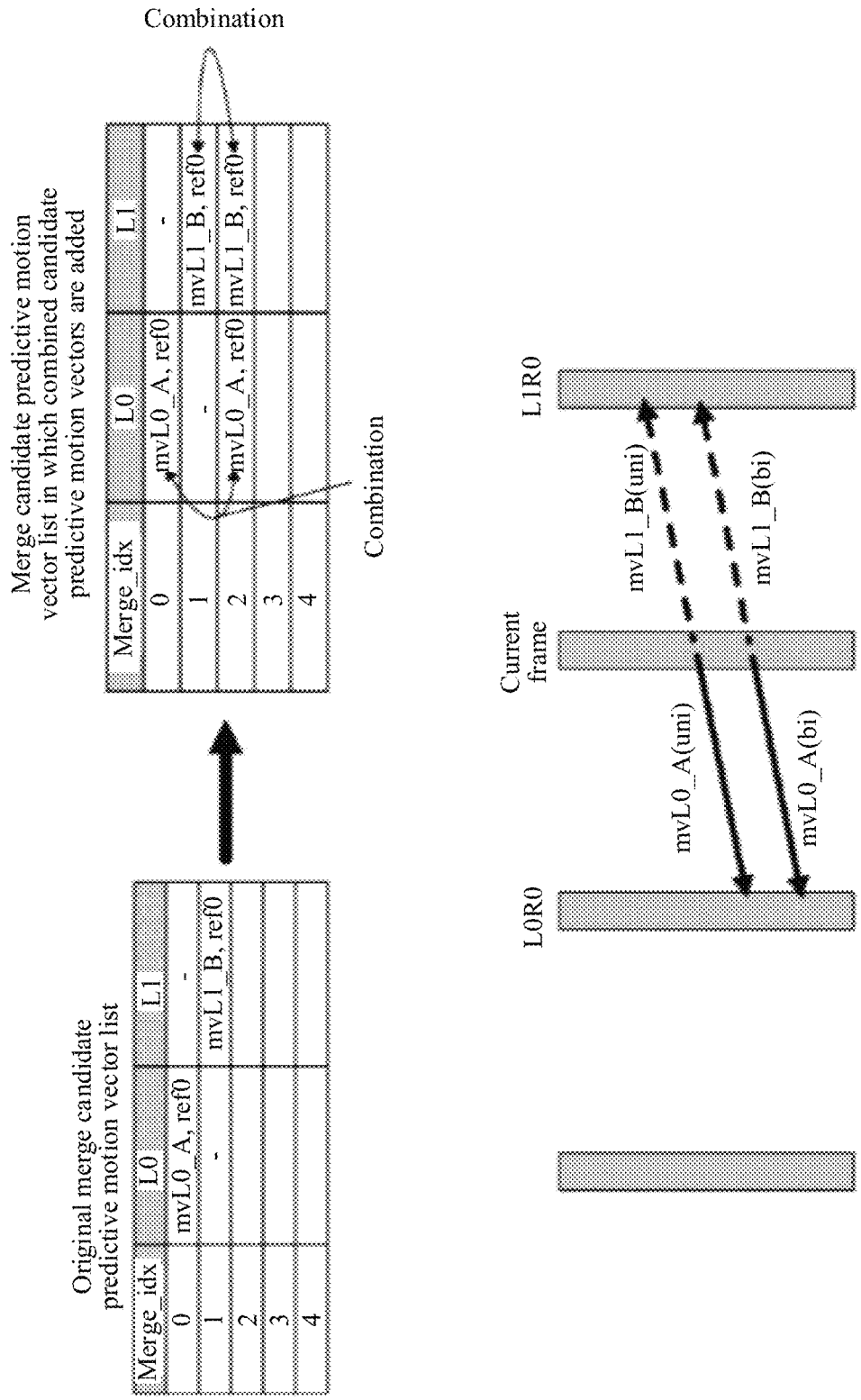
FIG. 12 is an example schematic diagram of adding combined bi-predictive candidate motion information to a merge mode candidate list according to an embodiment of this application.

FIG. 12 is an example schematic diagram of adding combined bi-predictive candidate motion information (combined bi-predictive merge candidate) to a merge mode candidate list according to an embodiment of this application. Specifically, two of original candidates (which have mvL0 and refIdxL0 or mvL1 and refIdxL1) may be used to generate a combined bi-predictive merge candidate. In FIG. 12, the two candidates are included in an original merge candidate list. A predictive type of one candidate is list 0 unidirectional predictive, and a predictive type of the other candidate is list 1 unidirectional predictive. In this feasible implementation, mvL0_A and ref0 are taken from a list 0, and mvL1_B and ref0 are taken from a list 1. Then a bidirectional predictive merge candidate (which has mvL0_A and ref0 in the list 0 and mvL1_B and ref0 in the list 1) may be generated, and whether the bidirectional predictive merge candidate is different from a candidate that has been included in the candidate list is checked. If the bidirectional predictive merge candidate is different from the candidate that has been included in the candidate list, the video decoder may include the bidirectional predictive merge candidate in the candidate list.

Optionally, in some possible implementations, in this embodiment of the present invention, the method may further include:

Step 1135: When the quantity of pieces of candidate motion information in the candidate list of the to-be-processed picture block is still less than the target quantity, for example, if additional candidates generated in the foregoing manner are still insufficient, the video encoder or video decoder may further insert a zero motion vector as candidate motion information to generate an additional or extra candidate.

Figure 13:
FIG. 13 is an example schematic diagram of adding a zero motion vector to a merge mode candidate list according to an embodiment of this application.

FIG. 13 is an example schematic diagram of adding a zero motion vector to a merge mode candidate predictive motion vector list according to an embodiment of this application. A zero-vector merge candidate predictive motion vector may be generated by combining a zero vector and a reference index that can be referenced. If a zero-vector candidate predictive motion vector is not repeated, the zero-vector candidate predictive motion vector may be added to a merge candidate predictive motion vector list.

It should be understood that the candidate list may be used in the foregoing merge mode or another predictive mode for obtaining a predictive motion vector of the to-be-processed picture block, and may be used at an encoder side, or may be used at a decoder side in consistency with a corresponding encoder side. For example, a quantity of candidates in the candidate list is also a preset maximum quantity, and is consistent at an encoder side and a decoder side. A specific quantity is not limited. In this case, for an operation at the decoder side, refer to the operation at the encoder side. Details are not described herein again.

It can be learned that in this embodiment, not only more original candidate motion information (for example, a motion vector of a space domain non-adjacent picture block is used as candidate motion information in the candidate list of the to-be-processed block) may be expanded, but also more additional candidate motion information may be expanded, to obtain more available candidate motion information used to construct the candidate list, thereby avoiding or reducing, to a maximum extent, manually addition of a zero vector to make the quantity of candidates in the candidate list satisfy the target quantity (for example, the preset maximum quantity of pieces of candidate motion information in the candidate list, or the quantity of pieces of candidate motion information determined by using the index identifier obtained by parsing the bitstream), thereby improving encoding performance.

Figure 14:
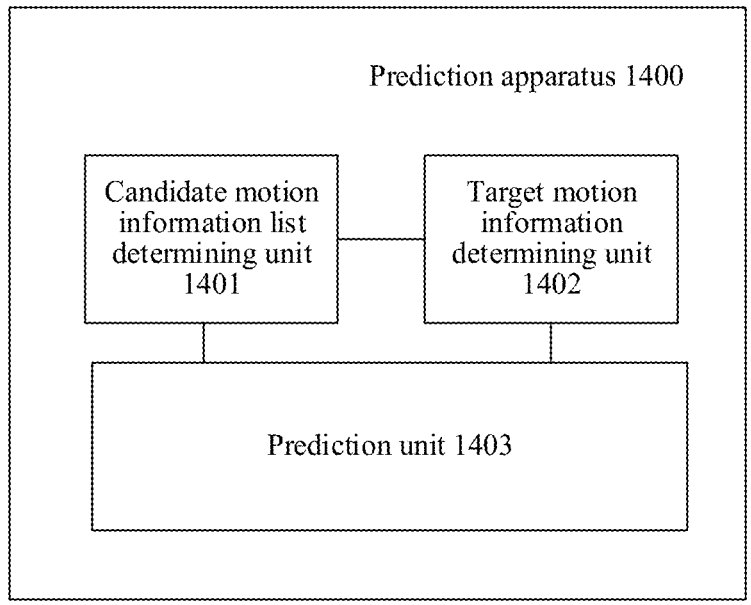
FIG. 14 is a schematic block diagram of an apparatus for predicting motion information of a picture block according to an embodiment of this application.

FIG. 14 is a schematic block diagram of an apparatus 1400 for predicting motion information of a picture block according to an embodiment of this application. It should be noted that the prediction apparatus 1400 is applicable to both intra or inter prediction for decoding a video picture and intra or inter prediction for encoding a video picture. It should be understood that, the prediction apparatus 1400 herein may correspond to the intra prediction unit 46 or the motion estimation unit 42 in FIG. 2, or may correspond to the intra prediction unit 84 or the motion compensation unit 82 in FIG. 3. The prediction apparatus 1400 may include:

a candidate motion information list determining unit 1401, configured to determine a candidate motion information list of a current picture block, where the candidate motion information list includes at least one piece of combined candidate motion information, first combined candidate motion information in the at least one piece of combined candidate motion information is obtained by weighting P pieces of candidate motion information by using corresponding weighting factors, P is an integer greater than or equal to 2, weighting factors $w_{pi}$ for at least two of the P pieces of candidate motion information are respectively values greater than 0 and less than 1, a sum of the weighting factors for the P pieces of candidate motion information is 1, and preferably, the weighting factor $w_{pi}$ for each of the P pieces of candidate motion information may be a value greater than 0 and less than 1;

a target motion information determining unit 1402, configured to determine target motion information in the candidate motion information list; and a prediction unit 1403, configured to predict motion information of the current picture block based on the target motion information.

In a feasible implementation, the at least one piece of combined candidate motion information further includes second combined candidate motion information, the second combined candidate motion information is obtained by weighting M pieces of candidate motion information by using corresponding weighting factors, M is an integer greater than or equal to 2, weighting factors $w_{mi}$ for at least two of the M pieces of candidate motion information are respectively values greater than 0 and less than 1, at least one of the P pieces of candidate motion information is different from at least one of the M pieces of candidate motion information, and a sum of the weighting factors for the M pieces of candidate motion information is 1.

In a feasible implementation, the first combined candidate motion information includes: weighted values of $P_1$ candidate motion vectors that are in the P pieces of candidate motion information and that correspond to a first reference list, and/or weighted values of $P_2$ candidate motion vectors that are in the P pieces of candidate motion information and that correspond to a second reference list, where $1<P_1 \leq P$, $1<P_2 \leq P$, $P_1$ or $P_2$ is an integer greater than or equal to 2, and weighting factors $w_{pi}$ for at least two of $P_1$ or $P_2$ candidate motion vectors are respectively values greater than 0 and less than 1. It should be understood that a sum of weighting factors for the $P_1$ candidate motion vectors is 1, and a sum of weighting factors for the $P_2$ candidate motion vectors is 1.

The second combined candidate motion information includes: weighted values of $M_1$ candidate motion vectors that are in the M pieces of candidate motion information and that correspond to the first reference list, and/or weighted values of $M_2$ candidate motion vectors that are in the M pieces of candidate motion information and that correspond to the second reference list, where $1<M_1 \leq M$, $1<M_2 \leq M$, $M_1$ or $M_2$ is an integer greater than or equal to 2, and weighting factors $w_{mi}$ for at least two of $M_1$ or $M_2$ candidate motion vectors are respectively values greater than 0 and less than 1. It should be understood that a sum of weighting factors for the $M_1$ candidate motion vectors is 1, and a sum of weighting factors for the $M_2$ candidate motion vectors is 1.

In a feasible implementation, the P pieces of candidate motion information include first candidate motion information corresponding to a first index identifier and second candidate motion information corresponding to a second index identifier, the first index identifier is less than the second index identifier, and correspondingly a weighting factor for the first candidate motion information is greater than or equal to a weighting factor for the second candidate motion information.

The M pieces of candidate motion information include third candidate motion information corresponding to a third index identifier and fourth candidate motion information corresponding to a fourth index identifier, the third index identifier is less than the fourth index identifier, and correspondingly a weighting factor for the third candidate motion information is greater than or equal to a weighting factor for the fourth candidate motion information.

In a feasible implementation, the P pieces of candidate motion information are P pieces of original candidate motion information; or the P pieces of candidate motion information are (P−X) pieces of original candidate motion information and X pieces of non-original candidate motion information, where X is a positive integer less than or equal to P.

The M pieces of candidate motion information are M pieces of original candidate motion information; or the M pieces of candidate motion information are (M−Y) pieces of original candidate motion information and Y pieces of non-original candidate motion information, where Y is a positive integer less than or equal to M.

The original candidate motion information includes motion information of one or more space domain reference blocks of the current picture block, motion information of one or more time domain reference blocks of the current picture block, and/or motion information of one or more inter-view reference blocks of the current picture block; and the non-original candidate motion information includes scaled candidate motion information, the first combined candidate motion information, the second combined candidate motion information, combined bi-predictive candidate motion information, and/or zero motion information, where each scaled candidate motion information includes a motion vector that points to a first target reference frame and that is in the first reference list, and/or a motion vector that points to a second target reference frame and that is in the second reference list.

In a feasible implementation, the scaled candidate motion information is obtained by the candidate motion information list determining unit 1401 by using the following steps:

determining the first target reference frame that is of the current picture block and that corresponds to the first reference list and/or the second target reference frame that is of the current picture block and that corresponds to the second reference list;

determining whether a reference picture that is included in particular candidate motion information and that corresponds to the first reference list is the same as the first target reference frame, and/or whether a reference picture that is included in particular candidate motion information and that corresponds to the second reference list is the same as the second target reference frame; and if the reference picture that is included in the candidate motion information and that corresponds to the first reference list is different from the first target reference frame, scaling, based on a time domain distance or an inter-view distance, a motion vector that is included in the candidate motion information and that corresponds to the first reference picture list, to obtain the motion vector that points to the first target reference frame; and/or if the reference picture that is included in the candidate motion information and that corresponds to the second reference list is different from the second target reference frame, scaling, based on a time domain distance or an inter-view distance, a motion vector that is included in the candidate motion information and that corresponds to the second reference picture list, to obtain the motion vector that points to the second target reference frame.

The first target reference frame is a reference frame that corresponds to the first reference list and that is of most frequently used candidate motion information in the candidate motion information list, or a reference frame that corresponds to the first reference list and that is of candidate motion information having a smallest index identifier in the candidate motion information list; alternatively, the second target reference frame is a reference frame that corresponds to the second reference list and that is of most frequently used candidate motion information in the candidate motion information list, or a reference frame that corresponds to the second reference list and that is of candidate motion information having a smallest index identifier in the candidate motion information list.

In a feasible implementation, for example, for a merge mode, the prediction unit is specifically configured to use the target motion information as the motion information of the current picture block.

In another feasible implementation, for example, for an AMVP mode, the motion information includes a motion vector prediction, and the prediction unit is specifically configured to: parse a bitstream to obtain a motion vector prediction difference of the current picture block; and use a sum of the motion vector prediction in the target motion information and the motion vector prediction difference as a motion vector of the current picture block.

When the apparatus is configured to encode the current picture block, the target motion information determining unit is specifically configured to determine the target motion information in the candidate motion information list, where a rate-distortion cost for encoding the current picture block by using the target motion information is the minimum; or when the apparatus is configured to decode the current picture block, the target motion information determining unit is specifically configured to determine, in the candidate motion information list, target motion information indicated by a fifth index identifier, where the fifth index identifier is used to indicate the target motion information in the candidate motion information list.

It should be noted that the candidate motion information list includes one or more types of candidate motion information, for example, one or more of time domain motion information (also referred to as motion information in a time domain direction), inter-view motion information (also referred to as motion information in an inter-view direction), and/or intra motion information.

For the HEVC, the candidate motion information herein is motion information in a time domain direction, in other words, the motion vector points to reference frames of a same viewpoint at different moments.

For the 3D-HEVC (3D extension of the HEVC), the candidate motion information may not only refer to motion information in a time domain direction, but also refer to motion information in an inter-view direction, in other words, the motion vector points to reference frames of different viewpoints at a same moment/different moments.

For the HEVC SCC (HEVC screen content coding extensions, HEVC Screen Content Coding Extensions), the candidate motion information may not only refer to motion information in a time domain direction, but also refer to intra motion information, in other words, the motion vector points to a current reconstructed frame.

Therefore, a candidate motion information list in a merge/skip/AMVP mode may include motion information in a time domain direction, motion information in an inter-view direction, or intra motion information. Specifically, a merge/skip list may include a plurality of types of motion information (time domain/inter-view/intra). However, an AMVP list usually includes only one type of motion information.

It can be learned that in the prediction apparatus in this embodiment of this application, at least one piece of combined candidate motion information can be constructed by weighting a plurality of pieces of candidate motion information, so that more candidate motion information used for reference can be found as much as possible, thereby enriching candidate motion information, and reducing or avoiding, to some extent, padding of the candidate motion information list with zero vector candidate motion information. This improves motion vector prediction accuracy to some extent, thereby improving encoding and decoding performance.

Figure 15:
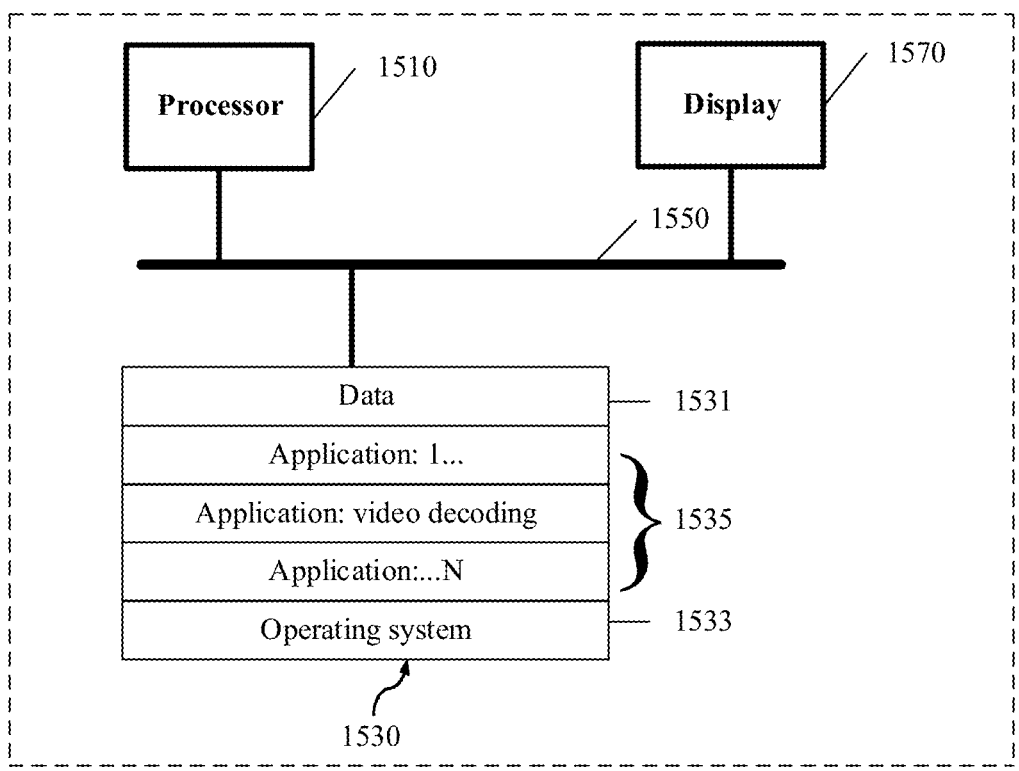
FIG. 15 is a schematic block diagram of an encoding device or a decoding device according to an embodiment of this application.

FIG. 15 is a schematic block diagram of an implementation of an encoding device or a decoding device (referred to as a decoding device 1500 for short) according to an embodiment of this application. The decoding device 1500 may include a processor 1510, a memory 1530, and a bus system 1550. The processor and the memory are connected to each other by using the bus system. The memory is configured to store an instruction. The processor is configured to execute the instruction stored in the memory. A memory of the encoding device stores program code, and a processor may invoke the program code stored in the memory, to perform various video coding or decoding methods described in this application, particularly video coding or decoding methods in various inter prediction modes or intra prediction modes, and motion information prediction methods in various inter prediction modes or intra prediction modes. Details are not described again herein to avoid repetition.

In this embodiment of this application, the processor 1510 may be a central processing unit (Central Processing Unit, "CPU" for short), or the processor 1510 may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, the processor may be any conventional processor, or the like.

The memory 1530 may include a read-only memory (ROM) device or a random access memory (RAM) device. Any other proper type of storage device may also be used as the memory 1530. The memory 1530 may include code and data 1531 that are accessed by the processor 1510 by using the bus 1550. The memory 1530 may further include an operating system 1533 and an application program 1535. The application program 1535 includes at least one program that allows the processor 1510 to perform the video coding or decoding method described in this application (particularly the method for predicting motion information of a picture block described in this application). For example, the application program 1535 may include applications 1 to N, and further includes a video coding or decoding application (referred to as a video decoding application for short) that performs the video coding or decoding method described in this application.

In addition to a data bus, the bus system 1550 may further include a power bus, a control bus, a status signal bus, and the like. However, for clear description, the buses are all marked as the bus system 1550 in the figure.

Optionally, the decoding device 1500 may further include one or more output devices, for example, a display 1570. In an example, the display 1570 may be a touch display or a touchscreen that combines a display and a touch unit that operably senses touch input. The display 1570 may be connected to the processor 1510 by using the bus 1550.

FIG. 16 shows encoding and decoding performance gains brought by the solution in this embodiment of this application in a random access RA configuration and a low-delay LP configuration. The solution in this embodiment of this application helps improve prediction accuracy of motion information (for example, a motion vector) of a picture block, and save a bit rate when video quality is the same, thereby improving encoding and decoding performance.

A person skilled in the art can understand that, the functions described with reference to various illustrative logical blocks, modules, and algorithm steps disclosed and described in this specification can be implemented by hardware, software, firmware, or any combination thereof. If the functions are implemented by software, the functions described with reference to the various illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or a communications medium including any medium that facilitates transfer of a computer program from one place to another (for example, according to a communications protocol). In this manner, the computer-readable medium usually may correspond to (1) a non-transitory tangible computer-readable storage medium or (2) a communications medium such as a signal or a carrier. The data storage medium may be any available medium that can be accessed by one or more computers or one or more processors to retrieve instructions, code, and/or data structures for implementing the technologies described in this application. A computer program product may include the computer-readable medium.

By way of example, and not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly termed a computer-readable medium. For example, if an instruction is transmitted from a website, server, or another remote source through a coaxial cable, an optical fiber, a twisted pair, a digital subscriber line (DSL), or wireless technologies such as infrared, radio, and microwave, the coaxial cable, optical fiber, twisted pair, DSL, or wireless technologies such as infrared, radio, and microwave are included in the definition of medium. However, it should be understood that the computer-readable storage medium and the data storage medium do not include connections, carriers, signals, or other transitory media, but actually means non-transitory tangible storage media. Disks and discs used in this specification include a compact disc (CD), a laser disc, an optical disc, a digital versatile disc (DVD), and a Blu-ray disc. The disks usually reproduce data magnetically, while the discs reproduce data optically with lasers. Combinations of the foregoing should also be included in the scope of computer-readable media.

A corresponding function may be performed by one or more processors such as one or more digital signal processors (DSP), general purpose microprocessors, application-specific integrated circuits (ASIC), field-programmable gate arrays (FPGA), or other equivalent integrated or discrete logic circuits. Therefore, the term "processor" used in this specification may refer to any of the foregoing structures or any other structure suitable for implementing the technologies described in this specification. In addition, in some aspects, the functions described with reference to the various illustrative logical blocks, modules, and steps described in this specification may be provided within dedicated hardware and/or software modules configured for encoding and decoding, or may be incorporated into a combined codec. In addition, the technologies may be fully implemented in one or more circuits or logic elements. In an example, various illustrative logical blocks, units, and modules in the video encoder 20 and the video decoder 30 can be understood as corresponding circuit devices or logic elements.

The technologies of this application may be implemented in various apparatuses or devices, including a wireless handset, an integrated circuit (IC), or a group of ICs (for example, a chip set). Various components, modules, or units described in this application are intended to emphasize a function aspect of an apparatus configured to perform the disclosed technology, but do not necessarily need to be implemented by different hardware units. Actually, as described above, various units may be combined, in combination with proper software and/or firmware, into hardware units of a codec, or be provided by interoperable hardware units (including one or more processors described above).

The foregoing descriptions are merely examples of specific implementations of this application, but are not intended to limit the protection scope of this application. Any variation or replacement readily figured out by a person skilled in the art within the technical scope disclosed in this application may be made, all shall fall within the protection scope of this application. Therefore, the protection scope of this application shall be subject to the protection scope of the claims.

What is claimed is:

1. A method for inter prediction of a current picture block, comprising:
   determining a merge candidate motion information list of the current picture block, wherein the merge candidate motion information list comprises a combined average merge candidate and a motion vector of the combined average merge candidate is based on an average value of candidate motion vectors of P motion information candidates in the merge candidate motion information list, and wherein P is an integer greater than or equal to 2;
   determining, in the merge candidate motion information list, target motion information corresponding to a candidate index identifier;
   predicting motion information of the current picture block based on the target motion information; and
   encoding or decoding the current picture block based on the motion information of the current picture block,
   wherein the combined average merge candidate comprises an average value of $P_1$ candidate motion vectors that are in the P motion information candidates and that correspond to a first reference list (L0), or
   wherein the combined average merge candidate comprises an average value of $P_2$ candidate motion vectors that are in the P motion information candidates and that correspond to a second reference list (L1), or
   wherein the combined average merge candidate comprises an average value of $P_1$ candidate motion vectors that are in the P motion information candidates and that correspond to the first reference list (L0), and an average value of $P_2$ candidate motion vectors that are in the P motion information candidates and that correspond to the second reference list (L1), and
   wherein $1<P_1 \leq P$, $1<P_2 \leq P$, and $P_1$ or $P_2$ is an integer greater than or equal to 2.

2. The method according to claim 1, wherein the P motion information candidates comprise a first motion information candidate corresponding to a first index identifier and a second motion information candidate corresponding to a second index identifier;
   wherein the first motion information candidate comprises:
   a motion vector corresponding to a first reference list (L0) and a reference picture index (ref0) corresponding to the first reference list (L0), or
   wherein the first motion information candidate comprises:
   a motion vector corresponding to a second reference list (L1) and a reference picture index (ref1) corresponding to the second reference list (L1), or wherein the first motion information candidate comprises:
a motion vector corresponding to the first reference list (L0) and a reference picture index (ref0) corresponding to the first reference list (L0), and a motion vector corresponding to the second reference list (L1) and a reference picture index (ref1) corresponding to the second reference list (L1);
and
wherein the second motion information candidate comprises:
a motion vector corresponding to the first reference list (L0) and a reference picture index (ref0) corresponding to the first reference list (L0), or
wherein the second motion information candidate comprises:
a motion vector corresponding to the second reference list (L1) and a reference picture index (ref1) corresponding to the second reference list (L1), or
wherein the second motion information candidate comprises:
a motion vector corresponding to the first reference list (L0) and a reference picture index (ref0) corresponding to the first reference list (L0), and a motion vector corresponding to the second reference list (L1) and a reference picture index (ref1) corresponding to the second reference list (L1).

3. The method according to claim 2, wherein the combined average merge candidate comprises a first average motion vector corresponding to the first reference list (L0), or
wherein the combined average merge candidate comprises a second average motion vector corresponding to the second reference list (L1), or
wherein the combined average merge candidate comprises the first average motion vector corresponding to the first reference list (L0), and the second average motion vector corresponding to the second reference list (L1);
wherein the first average motion vector that is in the combined average merge candidate and that corresponds to the first reference list (L0) is an average value of
the motion vector that is in the first motion information candidate corresponding to the first index identifier and that corresponds to the first reference list (L0) and
the motion vector that is in the second motion information candidate corresponding to the second index identifier and that corresponds to the first reference list (L0);
and
wherein the second average motion vector that is in the combined average merge candidate and that corresponds to the second reference list (L1) is an average value of
the motion vector that is in the first motion information candidate corresponding to the first index identifier and that corresponds to the second reference list (L1) and
the motion vector that is in the second motion information candidate corresponding to the second index identifier and that corresponds to the second reference list (L1).

4. The method according to claim 3, wherein the combined average merge candidate further comprises at least one of a first reference picture index (ref0) corresponding to the first reference list (L0), or a second reference picture index (ref1) corresponding to the second reference list (L1),
wherein the first reference picture index (ref0) that is in the combined average merge candidate and that corresponds to the first reference list (L0) is a reference picture index (ref0) that is in the first motion information candidate corresponding to the first index identifier and that corresponds to the first reference list (L0), and
wherein the second reference picture index (ref1) that is in the combined average merge candidate and that corresponds to the second reference list (L1) is a reference picture index (ref1) that is in the first motion information candidate corresponding to the first index identifier and that corresponds to the second reference list (L1).

5. The method according to claim 2, wherein a position of the first motion information candidate in the merge candidate motion information list is indicated or indexed by the first index identifier, and a position of the second motion information candidate in the merge candidate motion information list is indicated or indexed by the second index identifier.

6. The method according to claim 2, wherein the first index identifier is less than the second index identifier.

7. The method according to claim 2, wherein the first index identifier is equal 0, and the second index identifier is equal to 1.

8. A video coding apparatus, comprising:
a memory containing instructions; and
a processor in communication with the memory and upon execution of the instructions, is configured to:
determine a merge candidate motion information list of the current picture block, wherein the merge candidate motion information list comprises a combined average merge candidate, and a motion vector of the combined average merge candidate is based on an average value of candidate motion vectors of P motion information candidates in the merge candidate motion information list, and wherein P is an integer greater than or equal to 2;
determine, in the merge candidate motion information list, target motion information corresponding to a candidate index identifier;
predict motion information of the current picture block based on the target motion information; and
encoding or decoding the current picture block based on the motion information of the current picture block,
wherein the combined average merge candidate comprises an average value of $P_1$ candidate motion vectors that are in the P motion information candidates and that correspond to a first reference list (L0), or
wherein the combined average merge candidate comprises an average value of $P_2$ candidate motion vectors that are in the P motion information candidates and that correspond to a second reference list (L1), or
wherein the combined average merge candidate comprises an average value of $P_1$ candidate motion vectors that are in the P motion information candidates and that correspond to the first reference list, and an average value of $P_2$ candidate motion vectors that are in the P motion information candidates and that correspond to the second reference list (L1), and
wherein $1<P_1 \le P$, $1<P_2 \le P$, and $P_1$ or $P_2$ is an integer greater than or equal to 2.

9. The apparatus according to claim 8, wherein the P motion information candidates comprise a first motion information candidate corresponding to a first index identifier and a second motion information candidate corresponding to a second index identifier;

wherein the first motion information candidate comprises:
a motion vector corresponding to a first reference list (L0) and a reference picture index (ref0) corresponding to the first reference list (L0), or wherein the first motion information candidate comprises:
a motion vector corresponding to a second reference list (L1) and a reference picture index (ref1) corresponding to the second reference list (L1), or wherein the first motion information candidate comprises:
a motion vector corresponding to the first reference list (L0) and a reference picture index (ref0) corresponding to the first reference list (L0), and a motion vector corresponding to the second reference list (L1) and a reference picture index (ref1) corresponding to the second reference list (L1), and wherein the second motion information candidate comprises:
a motion vector corresponding to the first reference list (L0) and a reference picture index (ref0) corresponding to the first reference list (L0); or wherein the second motion information candidate comprises:
a motion vector corresponding to the second reference list (L1) and a reference picture index (ref1) corresponding to the second reference list (L1); or wherein the second motion information candidate comprises:
a motion vector corresponding to the first reference list (L0) and a reference picture index (ref0) corresponding to the first reference list (L0), and a motion vector corresponding to the second reference list (L1) and a reference picture index (ref1) corresponding to the second reference list (L1).

10. The apparatus according to claim 9,
herein the combined average merge candidate comprises a first average motion vector corresponding to the first reference list (L0), or wherein the combined average merge candidate comprises a second average motion vector corresponding to the second reference list (L1), or wherein the combined average merge candidate comprises the first average motion vector corresponding to the first reference list (L0), and the second average motion vector corresponding to the second reference list (L1);

herein the first average motion vector that is in the combined average merge candidate and that corresponds to the first reference list (L0) is an average value of the motion vector that is in the first motion information candidate corresponding to the first index identifier and that corresponds to the first reference list (L0) and the motion vector that is in the second motion information candidate corresponding to the second index identifier and that corresponds to the first reference list (L0); and wherein the second average motion vector that is in the combined average merge candidate and that corresponds to the second reference list (L1) is an average value of the motion vector that is in the first motion information candidate corresponding to the first index identifier and that corresponds to the second reference list (L1) and the motion vector that is in the second motion information candidate corresponding to the second index identifier and that corresponds to the second reference list (L1).

11. The apparatus according to claim 10, wherein the combined average merge candidate further comprises at least one of a first reference picture index (ref0) corresponding to the first reference list (L0), or a second reference picture index (ref1) corresponding to the second reference list (L1), herein the first reference picture index (ref0) that is in the combined average merge candidate and that corresponds to the first reference list (L0) is a reference picture index (ref0) that is in the first motion information candidate corresponding to the first index identifier and that corresponds to the first reference list (L0), and wherein the second reference picture index (ref1) that is in the combined average merge candidate and that corresponds to the second reference list (L1) is a reference picture index (ref1) that is in the first motion information candidate corresponding to the first index identifier and that corresponds to the second reference list (L1).

12. The apparatus according to claim 9, wherein a position of the first motion information candidate in the merge candidate motion information list is indicated or indexed by the first index identifier, and a position of the second motion information candidate in the merge candidate motion information list is indicated or indexed by the second index identifier.

13. The apparatus according to claim 9, wherein the first index identifier is less than the second index identifier.

14. The apparatus according to claim 9, wherein the first index identifier is equal 0, and the second index identifier is equal to 1.

15. A non-transitory computer-readable media storing computer instructions, that when executed by one or more processors, cause the one or more processors to perform the steps of:
determining a merge candidate motion information list of the current picture block, wherein the merge candidate motion information list comprises a combined average merge candidate and a motion vector of the combined average merge candidate is based on an average value of candidate motion vectors of P motion information candidates in the merge candidate motion information list, and wherein P is an integer greater than or equal to 2;

determining, in the merge candidate motion information list, target motion information corresponding to a candidate index identifier; and predicting motion information of the current picture block based on the target motion information; and encoding or decoding the current picture block based on the motion information of the current picture block, wherein the combined average merge candidate comprises an average value of $P_1$ candidate motion vectors that are in the P motion information candidates and that correspond to a first reference list (L0), or wherein the combined average merge candidate comprises an average value of $P_2$ candidate motion vectors that are in the P motion information candidates and that correspond to a second reference list (L1), or wherein the combined average merge candidate comprises an average value of $P_1$ candidate motion vectors that are in the P motion information candidates and that correspond to the first reference list (L0), and an average value of $P_2$ candidate motion vectors that are in the P motion information candidates and that correspond to the second reference list (L1), and wherein $1<P_1 \leq P$, $1<P_2 \leq P$, and $P_1$ or $P_2$ is an integer greater than or equal to 2.

16. The non-transitory computer-readable media according to claim 15, wherein the P motion information candidates comprise a first motion information candidate corresponding to a first index identifier and a second motion information candidate corresponding to a second index identifier;

wherein the first motion information candidate comprises:
a motion vector corresponding to a first reference list (L0) and a reference picture index (ref0) corresponding to the first reference list (L0), or wherein the first motion information candidate comprises:
a motion vector corresponding to a second reference list (L1) and a reference picture index (ref1) corresponding to the second reference list (L1), or wherein the first motion information candidate comprises:
a motion vector corresponding to the first reference list (L0) and a reference picture index (ref0) corresponding to the first reference list (L0), and a motion vector corresponding to the second reference list (L1) and a reference picture index (ref1) corresponding to the second reference list (L1); and wherein the second motion information candidate comprises:
a motion vector corresponding to the first reference list (L0) and a reference picture index (ref0) corresponding to the first reference list (L0), or wherein the second motion information candidate comprises:
a motion vector corresponding to the second reference list (L1) and a reference picture index (ref1) corresponding to the second reference list (L1), or wherein the second motion information candidate comprises:
a motion vector corresponding to the first reference list (L0) and a reference picture index (ref0) corresponding to the first reference list (L0), and a motion vector corresponding to the second reference list (L1) and a reference picture index (ref1) corresponding to the second reference list (L1).

17. The non-transitory computer-readable media according to claim 16, wherein the combined average merge candidate comprises a first average motion vector corresponding to the first reference list (L0), or wherein the combined average merge candidate comprises a second average motion vector corresponding to the second reference list (L1), or wherein the combined average merge candidate comprises the first average motion vector corresponding to the first reference list (L0), and the second average motion vector corresponding to the second reference list (L1);

wherein the first average motion vector that is in the combined average merge candidate and that corresponds to the first reference list (L0) is an average value of the motion vector that is in the first motion information candidate corresponding to the first index identifier and that corresponds to the first reference list (L0) and the motion vector that is in the second motion information candidate corresponding to the second index identifier and that corresponds to the first reference list (L0);

and wherein the second average motion vector that is in the combined average merge candidate and that corresponds to the second reference list (L1) is an average value of the motion vector that is in the first motion information candidate corresponding to the first index identifier and that corresponds to the second reference list (L1) and the motion vector that is in the second motion information candidate corresponding to the second index identifier and that corresponds to the second reference list (L1).

18. The non-transitory computer-readable media according to claim 17, wherein the combined average merge candidate further comprises at least one of a first reference picture index (ref0) corresponding to the first reference list (L0), or a second reference picture index (ref1) corresponding to the second reference list (L1), wherein the first reference picture index (ref0) that is in the combined average merge candidate and that corresponds to the first reference list (L0) is a reference picture index (ref0) that is in the first motion information candidate corresponding to the first index identifier and that corresponds to the first reference list (L0), and wherein the second reference picture index (ref1) that is in the combined average merge candidate and that corresponds to the second reference list (L1) is a reference picture index (ref1) that is in the first motion information candidate corresponding to the first index identifier and that corresponds to the second reference list (L1).

19. The non-transitory computer-readable media according to claim 16, wherein a position of the first motion information candidate in the merge candidate motion information list is indicated or indexed by the first index identifier, and a position of the second motion information candidate in the merge candidate motion information list is indicated or indexed by the second index identifier.

20. The non-transitory computer-readable media according to claim 16, wherein the first index identifier is less than the second index identifier.

21. The non-transitory computer-readable media according to claim 16, wherein the first index identifier is equal 0, and the second index identifier is equal to 1.

* * * * *